(12) United States Patent
Jung et al.

(10) Patent No.: US 10,687,166 B2
(45) Date of Patent: Jun. 16, 2020

(54) OBTAINING USER ASSISTANCE

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 12/592,071

(22) Filed: Nov. 18, 2009

(65) Prior Publication Data

US 2010/0218095 A1 Aug. 26, 2010

Related U.S. Application Data

(63) Continuation-in-part of application No. 12/592,073, filed on Nov. 18, 2009, now abandoned, and a continuation-in-part of application No. 11/037,825, filed on Jan. 18, 2005, now Pat. No. 7,664,736, and a continuation-in-part of application No. 11/037,828, filed on Jan. 18, 2005, now Pat. No. 9,038,899, and a continuation-in-part of application No. 11/037,827, filed on Jan. 18, 2005, now Pat. No. 7,798,401, and a continuation-in-part of application No. 11/000,687, filed on Dec. 1, 2004, now abandoned, and a continuation-in-part of application No. 11/000,736, filed on Dec. 1, 2004, now Pat. No. 10,514,816, and a continuation-in-part of application No. 10/978,243, (Continued)

(51) Int. Cl.
| | |
|---|---|
| *H04W 4/021* | (2018.01) |
| *G06Q 10/06* | (2012.01) |
| *H04L 29/08* | (2006.01) |

(52) U.S. Cl.
CPC ............ *H04W 4/021* (2013.01); *G06Q 10/06* (2013.01); *H04L 67/125* (2013.01); *H04L 67/18* (2013.01)

(58) Field of Classification Search
CPC ...... G06F 9/4446; G06F 3/048; G06F 3/0481; G06F 3/0482; H04W 4/021; H04L 67/125; H04L 67/18; G06Q 10/06
USPC .................................................. 715/705, 708
See application file for complete search history.

(56) References Cited

U.S. PATENT DOCUMENTS

| | | | |
|---|---|---|---|
| 4,007,469 A | 2/1977 | Land et al. | |
| 4,922,443 A | 5/1990 | Coetsier et al. | |

(Continued)

FOREIGN PATENT DOCUMENTS

| | | |
|---|---|---|
| EP | 2 708 850 A1 | 3/2014 |
| GB | 2 501 075 A | 10/2013 |

(Continued)

OTHER PUBLICATIONS

Japanese State Intellectual Property Office, Office Action; App. No. 2007-538180 (Based on PCT Patent Application No. PCT/US05/038495);dated May 31, 2011; pp. 1-2 (Translation not available).

(Continued)

*Primary Examiner* — Amy Ng
*Assistant Examiner* — William Wong
(74) *Attorney, Agent, or Firm* — Winston & Strawn LLP

(57) ABSTRACT

An apparatus, device, method, computer program product, and system that searches a plurality of end user assistances respectively corresponding to a plurality of items for an end user assistance correlating with a user-selected item.

18 Claims, 36 Drawing Sheets

Related U.S. Application Data filed on Oct. 29, 2004, now Pat. No. 9,098,826, and a continuation-in-part of application No. 10/974,561, filed on Oct. 27, 2004, now Pat. No. 8,341,522, and a continuation-in-part of application No. 10/974,476, filed on Oct. 26, 2004, now Pat. No. 9,747,579, and a continuation-in-part of application No. 10/974,555, filed on Oct. 26, 2004, now abandoned, and a continuation-in-part of application No. 10/955,966, filed on Sep. 30, 2004, now abandoned.

(56) References Cited

U.S. PATENT DOCUMENTS

| | | |
|---|---|---|
| 5,023,934 A | 6/1991 | Wheeless |
| 5,146,557 A | 9/1992 | Yamrom et al. |
| 5,179,653 A | 1/1993 | Fuller |
| 5,222,127 A | 6/1993 | Fukui |
| 5,247,575 A | 9/1993 | Sprague et al. |
| 5,282,061 A | 1/1994 | Farrell |
| 5,287,102 A | 2/1994 | McKiel, Jr. |
| 5,287,448 A | 2/1994 | Nicol et al. |
| 5,303,393 A | 4/1994 | Noreen et al. |
| 5,311,434 A * | 5/1994 | Tamai .......... 701/210 |
| 5,388,251 A | 2/1995 | Makino et al. |
| 5,404,295 A * | 4/1995 | Katz et al. .......... 715/231 |
| 5,410,326 A | 4/1995 | Goldstein |
| 5,442,759 A | 8/1995 | Chiang et al. |
| 5,452,222 A | 9/1995 | Gray et al. |
| 5,475,835 A | 12/1995 | Hickey |
| 5,524,140 A | 6/1996 | Klausner et al. |
| 5,561,705 A | 10/1996 | Allard et al. |
| 5,568,536 A | 10/1996 | Tiller et al. |
| 5,572,576 A | 11/1996 | Klausner et al. |
| 5,612,669 A | 3/1997 | Allen et al. |
| 5,648,897 A | 7/1997 | Johnson et al. |
| 5,654,688 A | 8/1997 | Allen et al. |
| 5,663,704 A | 9/1997 | Allen et al. |
| 5,729,191 A | 3/1998 | Allen et al. |
| 5,802,467 A | 9/1998 | Salazar et al. |
| 5,802,492 A | 9/1998 | DeLorme et al. |
| 5,805,672 A | 9/1998 | Barkat et al. |
| 5,812,977 A | 9/1998 | Douglas |
| 5,818,329 A | 10/1998 | Allen |
| 5,825,355 A | 10/1998 | Palmer et al. |
| 5,877,757 A | 3/1999 | Baldwin et al. |
| 5,887,171 A | 3/1999 | Tada et al. |
| 5,890,905 A | 4/1999 | Bergman |
| 5,898,400 A | 4/1999 | Jones et al. |
| 5,910,800 A | 6/1999 | Shields et al. |
| 5,920,697 A | 7/1999 | Masters et al. |
| 5,923,325 A | 7/1999 | Barber et al. |
| 5,933,139 A | 8/1999 | Feigner et al. |
| 5,936,611 A | 8/1999 | Yoshida |
| 5,938,721 A | 8/1999 | Dussell et al. |
| 5,940,007 A | 8/1999 | Brinkmeyer et al. |
| 5,965,858 A | 10/1999 | Suzuki et al. |
| 5,982,277 A | 11/1999 | Flick |
| 5,985,858 A | 11/1999 | Miyata et al. |
| 5,991,739 A | 11/1999 | Cupps et al. |
| 6,005,299 A | 12/1999 | Hengst |
| 6,005,613 A | 12/1999 | Endsley et al. |
| 6,021,403 A | 2/2000 | Horvitz et al. |
| 6,068,485 A | 5/2000 | Linebarger et al. |
| 6,083,104 A | 7/2000 | Choi |
| 6,107,938 A | 8/2000 | Du et al. |
| 6,112,181 A | 8/2000 | Shear et al. |
| 6,130,606 A | 10/2000 | Flick |
| 6,160,926 A | 12/2000 | Dow et al. |
| 6,167,255 A | 12/2000 | Kennedy, III et al. |
| 6,169,902 B1 | 1/2001 | Kawamoto |
| 6,182,006 B1 | 1/2001 | Meek |
| 6,184,780 B1 | 2/2001 | Allen et al. |
| 6,230,170 B1 | 5/2001 | Zellweger et al. |
| 6,253,058 B1 | 6/2001 | Murasaki et al. |
| 6,256,378 B1 | 7/2001 | Iggulden et al. |
| 6,259,362 B1 | 7/2001 | Lin |
| 6,259,409 B1 | 7/2001 | Fulton et al. |
| 6,271,835 B1 | 8/2001 | Hoeksma |
| 6,308,120 B1 | 10/2001 | Good |
| 6,321,158 B1 | 11/2001 | DeLorme et al. |
| 6,344,793 B1 | 2/2002 | Geck et al. |
| 6,366,198 B1 | 4/2002 | Allen et al. |
| 6,377,825 B1 | 4/2002 | Kennedy et al. |
| 6,385,541 B1 * | 5/2002 | Blumberg et al. .......... 701/213 |
| 6,462,660 B1 | 10/2002 | Cannon et al. |
| 6,463,343 B1 * | 10/2002 | Emens et al. .......... 700/83 |
| 6,466,899 B1 | 10/2002 | Yano et al. |
| 6,480,098 B2 | 11/2002 | Flick |
| 6,490,493 B1 * | 12/2002 | Dharnipragada .......... 700/97 |
| 6,526,355 B1 | 2/2003 | Ni et al. |
| 6,542,163 B2 | 4/2003 | Gorbet et al. |
| 6,542,814 B2 | 4/2003 | Polidi et al. |
| 6,556,899 B1 | 4/2003 | Harvey et al. |
| 6,577,304 B1 | 6/2003 | Yablonski et al. |
| 6,584,496 B1 | 6/2003 | Ludtke |
| 6,608,650 B1 | 8/2003 | Torres et al. |
| 6,611,739 B1 | 8/2003 | Harvey et al. |
| 6,628,233 B2 | 9/2003 | Knockeart et al. |
| 6,639,550 B2 | 10/2003 | Knockeart et al. |
| 6,647,328 B2 | 11/2003 | Walker |
| 6,650,902 B1 * | 11/2003 | Richton .......... 455/456.3 |
| 6,651,053 B1 | 11/2003 | Rothschild |
| 6,664,924 B2 | 12/2003 | Knockeart et al. |
| 6,680,694 B1 | 1/2004 | Knockeart et al. |
| 6,681,174 B1 | 1/2004 | Harvey et al. |
| 6,707,421 B1 | 3/2004 | Drury et al. |
| 6,711,474 B1 | 3/2004 | Treyz et al. |
| 6,727,830 B2 | 4/2004 | Lui et al. |
| 6,784,832 B2 | 8/2004 | Knockeart et al. |
| 6,788,313 B1 | 9/2004 | Heil |
| 6,795,011 B1 | 9/2004 | Berthoud et al. |
| 6,799,205 B2 | 9/2004 | Ludtke |
| 6,812,888 B2 | 11/2004 | Drury et al. |
| 6,816,881 B1 | 11/2004 | Mohindra et al. |
| 6,819,986 B2 | 11/2004 | Hong et al. |
| 6,823,188 B1 | 11/2004 | Stern |
| 6,829,668 B2 | 12/2004 | Keskar et al. |
| 6,832,092 B1 | 12/2004 | Suarez et al. |
| 6,845,486 B2 | 1/2005 | Yamada et al. |
| 6,873,840 B1 | 3/2005 | Von Alten |
| 6,874,037 B1 | 3/2005 | Abram et al. |
| 6,879,828 B2 | 4/2005 | Virtanen et al. |
| 6,882,712 B1 | 4/2005 | Iggulden et al. |
| 6,892,936 B2 | 5/2005 | Riggert et al. |
| 6,904,565 B1 | 6/2005 | Lentz |
| 6,909,398 B2 | 6/2005 | Knockeart et al. |
| 6,919,792 B1 | 7/2005 | Battini et al. |
| 6,920,612 B2 | 7/2005 | Makinen |
| 6,967,576 B2 | 11/2005 | Hayes et al. |
| 6,968,272 B2 | 11/2005 | Knockeart et al. |
| 6,970,783 B2 | 11/2005 | Knockeart et al. |
| 6,980,092 B2 | 12/2005 | Turnbull et al. |
| 7,023,379 B2 | 4/2006 | Turnbull |
| 7,036,076 B2 | 4/2006 | Anwar |
| 7,043,691 B1 | 5/2006 | Kwon et al. |
| 7,055,737 B1 | 6/2006 | Tobin et al. |
| 7,065,348 B1 | 6/2006 | Aoki |
| 7,068,163 B2 | 6/2006 | Sari et al. |
| 7,082,365 B2 | 7/2006 | Sheha et al. |
| 7,103,556 B2 | 9/2006 | Del Rey et al. |
| 7,107,081 B1 | 9/2006 | Fujisaki |
| 7,129,927 B2 | 10/2006 | Mattsson |
| 7,135,962 B2 | 11/2006 | Durbin et al. |
| 7,142,096 B2 | 11/2006 | Eisenman |
| 7,155,674 B2 | 12/2006 | Breen et al. |
| 7,158,006 B2 | 1/2007 | Lee et al. |
| 7,200,801 B2 | 4/2007 | Agassi et al. |
| 7,202,783 B2 | 4/2007 | Want et al. |
| 7,212,827 B1 | 5/2007 | Veschl |
| 7,212,976 B2 | 5/2007 | Scheer |
| 7,224,262 B2 | 5/2007 | Simon et al. |
| 7,231,496 B2 | 6/2007 | Curtis |
| 7,240,067 B2 | 7/2007 | Timmons |

(56) References Cited

U.S. PATENT DOCUMENTS

| | | |
|---|---|---|
| 7,245,258 B2 | 7/2007 | Velhal et al. |
| 7,248,937 B1 | 7/2007 | Brown et al. |
| 7,254,779 B1 | 8/2007 | Rezvani et al. |
| 7,259,357 B2 | 8/2007 | Walker |
| 7,277,884 B2 | 10/2007 | Vadai et al. |
| 7,286,857 B1 | 10/2007 | Walker et al. |
| 7,293,034 B2 | 11/2007 | Paya et al. |
| 7,300,287 B2 | 11/2007 | Dowdell et al. |
| 7,312,712 B1 | 12/2007 | Worrall |
| 7,324,966 B2 | 1/2008 | Scheer |
| 7,327,226 B2 | 2/2008 | Turnbull et al. |
| 7,332,998 B2 | 2/2008 | Beehler et al. |
| 7,346,015 B2 * | 3/2008 | Shipman .............. H04L 45/26 370/310 |
| 7,376,912 B2 | 5/2008 | Hurewitz et al. |
| 7,446,655 B2 | 11/2008 | Jha et al. |
| 7,457,628 B2 * | 11/2008 | Blumberg et al. ......... 455/456.1 |
| 7,490,763 B2 | 2/2009 | Keohane et al. |
| 7,548,697 B2 | 6/2009 | Hudson et al. |
| 7,643,913 B2 | 1/2010 | Taki et al. |
| 7,664,736 B2 | 2/2010 | Jung et al. |
| 7,684,321 B2 | 3/2010 | Muirhead et al. |
| 7,694,881 B2 | 4/2010 | Jung et al. |
| 7,715,795 B2 | 5/2010 | Pirzada et al. |
| 7,725,077 B2 | 5/2010 | Jung et al. |
| 7,798,401 B2 | 9/2010 | Jung et al. |
| 7,840,427 B2 | 11/2010 | O'Sullivan |
| 7,876,706 B2 | 1/2011 | Ekl et al. |
| 7,899,468 B2 | 3/2011 | Lohtia et al. |
| 7,900,153 B2 | 3/2011 | Damodaran et al. |
| 7,904,352 B2 | 3/2011 | Carruthers |
| 7,922,086 B2 | 4/2011 | Jung et al. |
| 7,957,871 B1 | 6/2011 | Echeruo |
| 8,009,121 B1 | 8/2011 | Stuart et al. |
| 8,046,004 B2 | 10/2011 | Tsuchiya |
| 8,126,400 B2 | 2/2012 | Jung et al. |
| 8,170,899 B2 | 5/2012 | Chorley et al. |
| 8,180,293 B2 | 5/2012 | Jung et al. |
| 8,271,876 B2 | 9/2012 | Brugler et al. |
| 8,282,003 B2 | 10/2012 | Jung et al. |
| 8,284,034 B2 | 10/2012 | Stewart et al. |
| 8,358,976 B2 | 1/2013 | Jung et al. |
| 8,406,791 B1 | 3/2013 | Daily et al. |
| 8,504,090 B2 | 8/2013 | Klein et al. |
| 8,538,331 B2 | 9/2013 | Jung et al. |
| 8,626,366 B2 | 1/2014 | Noffsinger et al. |
| 8,660,498 B2 | 2/2014 | Gurney et al. |
| 8,688,532 B2 | 4/2014 | Khunger et al. |
| 8,704,675 B2 | 4/2014 | Jung et al. |
| 8,712,857 B1 | 4/2014 | Adornato et al. |
| 8,762,839 B2 | 6/2014 | Jung et al. |
| 8,775,070 B1 | 7/2014 | Bhatia |
| 8,831,677 B2 | 9/2014 | Villa-Real |
| 8,918,284 B2 | 12/2014 | Tokashiki |
| 9,038,899 B2 | 5/2015 | Jung et al. |
| 9,307,577 B2 | 4/2016 | Jung et al. |
| 9,483,744 B2 | 11/2016 | Lord et al. |
| 9,488,484 B2 | 11/2016 | Lord et al. |
| 9,552,559 B2 | 1/2017 | Lord et al. |
| 9,569,740 B2 | 2/2017 | Lord et al. |
| 9,594,791 B2 | 3/2017 | Bell et al. |
| 9,599,481 B2 | 3/2017 | Lord et al. |
| 9,600,158 B2 | 3/2017 | Temkin et al. |
| 9,621,701 B2 | 4/2017 | Jung et al. |
| 9,671,239 B2 | 6/2017 | Lord et al. |
| 9,689,694 B2 | 6/2017 | Lord et al. |
| 9,715,667 B2 | 7/2017 | Lord et al. |
| 9,736,652 B2 | 8/2017 | Su et al. |
| 9,767,423 B2 | 9/2017 | Lord et al. |
| 9,875,116 B2 | 1/2018 | Khalid et al. |
| 9,886,671 B2 | 2/2018 | Lord et al. |
| 9,939,279 B2 | 4/2018 | Pan et al. |
| 9,946,978 B2 | 4/2018 | Francis |
| 9,959,512 B2 | 5/2018 | Camp et al. |
| 9,977,702 B2 | 5/2018 | Bell et al. |
| 10,255,301 B2 | 4/2019 | Bell et al. |
| 2001/0025558 A1 | 10/2001 | Ishida |
| 2001/0049277 A1 | 12/2001 | Meyer et al. |
| 2001/0050611 A1 | 12/2001 | Achterholt |
| 2001/0052858 A1 | 12/2001 | Vincent et al. |
| 2001/0055976 A1 | 12/2001 | Crouch et al. |
| 2002/0002552 A1 | 1/2002 | Schultz et al. |
| 2002/0004703 A1 | 1/2002 | Gaspard |
| 2002/0007225 A1 | 1/2002 | Costello et al. |
| 2002/0019881 A1 | 2/2002 | Bokhari et al. |
| 2002/0021288 A1 | 2/2002 | Schug |
| 2002/0022961 A1 * | 2/2002 | Sepanaho .............. G06Q 30/02 705/1.1 |
| 2002/0023144 A1 | 2/2002 | Linyard et al. |
| 2002/0032497 A1 | 3/2002 | Jorgenson et al. |
| 2002/0032510 A1 | 3/2002 | Turnbull et al. |
| 2002/0038348 A1 | 3/2002 | Malone et al. |
| 2002/0038384 A1 | 3/2002 | Kahn et al. |
| 2002/0062280 A1 | 5/2002 | Zachariassen et al. |
| 2002/0069030 A1 | 6/2002 | Xydis |
| 2002/0072347 A1 | 6/2002 | Dunko et al. |
| 2002/0075243 A1 | 6/2002 | Newton |
| 2002/0083025 A1 * | 6/2002 | Robarts et al. .................. 706/12 |
| 2002/0084893 A1 | 7/2002 | Eisenman |
| 2002/0087279 A1 | 7/2002 | Hall |
| 2002/0105550 A1 | 8/2002 | Biebesheimer et al. |
| 2002/0105582 A1 | 8/2002 | Ikeda |
| 2002/0107610 A1 | 8/2002 | Kaehler et al. |
| 2002/0120459 A1 | 8/2002 | Dick et al. |
| 2002/0123880 A1 | 9/2002 | Brown |
| 2002/0130765 A1 | 9/2002 | Flick |
| 2002/0133545 A1 | 9/2002 | Fano et al. |
| 2002/0137505 A1 | 9/2002 | Eiche et al. |
| 2002/0152173 A1 | 10/2002 | Rudd |
| 2002/0164997 A1 | 11/2002 | Parry |
| 2002/0186144 A1 | 12/2002 | Meunier |
| 2003/0016238 A1 | 1/2003 | Sullivan et al. |
| 2003/0018428 A1 | 1/2003 | Knockeart et al. |
| 2003/0018742 A1 | 1/2003 | Imago |
| 2003/0020759 A1 | 1/2003 | Cancilla et al. |
| 2003/0022701 A1 | 1/2003 | Gupta |
| 2003/0024975 A1 * | 2/2003 | Rajasekharan ..... G06F 16/9554 235/375 |
| 2003/0032426 A1 | 2/2003 | Gilbert et al. |
| 2003/0034998 A1 * | 2/2003 | Kodosky ............ G05B 19/0426 715/736 |
| 2003/0035075 A1 | 2/2003 | Butler et al. |
| 2003/0040944 A1 | 2/2003 | Hileman |
| 2003/0043178 A1 | 3/2003 | Gusler et al. |
| 2003/0048288 A1 | 3/2003 | Drif et al. |
| 2003/0055542 A1 | 3/2003 | Knockeart et al. |
| 2003/0055553 A1 | 3/2003 | Knockeart et al. |
| 2003/0055555 A1 | 3/2003 | Knockeart et al. |
| 2003/0058266 A1 | 3/2003 | Dunlap et al. |
| 2003/0058267 A1 | 3/2003 | Warren |
| 2003/0064805 A1 | 4/2003 | Wells |
| 2003/0067541 A1 | 4/2003 | Joao |
| 2003/0069673 A1 | 4/2003 | Hong et al. |
| 2003/0098876 A1 | 5/2003 | Makinen |
| 2003/0100964 A1 | 5/2003 | Kluge et al. |
| 2003/0101178 A1 | 5/2003 | Miyata et al. |
| 2003/0110035 A1 | 6/2003 | Thong et al. |
| 2003/0123446 A1 | 7/2003 | Muirhead et al. |
| 2003/0125057 A1 | 7/2003 | Pesola |
| 2003/0125963 A1 | 7/2003 | Haken |
| 2003/0132854 A1 | 7/2003 | Swan et al. |
| 2003/0160824 A1 | 8/2003 | Szumla |
| 2003/0186734 A1 | 10/2003 | LeMay et al. |
| 2003/0191820 A1 | 10/2003 | Ludtke |
| 2003/0192947 A1 | 10/2003 | Toedtli |
| 2003/0193404 A1 | 10/2003 | Joao |
| 2003/0206102 A1 | 11/2003 | Joao |
| 2003/0218629 A1 | 11/2003 | Terashima et al. |
| 2003/0222897 A1 | 12/2003 | Moore et al. |
| 2003/0227392 A1 | 12/2003 | Ebert et al. |
| 2004/0034651 A1 | 2/2004 | Gupta et al. |
| 2004/0049324 A1 | 3/2004 | Walker |
| 2004/0049336 A1 | 3/2004 | Knockeart et al. |
| 2004/0049337 A1 | 3/2004 | Knockeart et al. |

(56) References Cited

U.S. PATENT DOCUMENTS

| | | |
|---|---|---|
| 2004/0056797 A1 | 3/2004 | Knockeart et al. |
| 2004/0064245 A1 | 4/2004 | Knockeart et al. |
| 2004/0064248 A1 | 4/2004 | Holze et al. |
| 2004/0066330 A1 | 4/2004 | Knockeart et al. |
| 2004/0067773 A1* | 4/2004 | Rachabathuni et al. ...... 455/560 |
| 2004/0076444 A1 | 4/2004 | Badovinac et al. |
| 2004/0078721 A1 | 4/2004 | Williams |
| 2004/0088228 A1 | 5/2004 | Mercer et al. |
| 2004/0088696 A1 | 5/2004 | Kawano et al. |
| 2004/0090451 A1 | 5/2004 | Lay et al. |
| 2004/0093102 A1 | 5/2004 | Liiri et al. |
| 2004/0095480 A1 | 5/2004 | Battles et al. |
| 2004/0103153 A1 | 5/2004 | Chang et al. |
| 2004/0104842 A1 | 6/2004 | Drury et al. |
| 2004/0107043 A1 | 6/2004 | de Silva |
| 2004/0107144 A1 | 6/2004 | Short |
| 2004/0111273 A1 | 6/2004 | Sakagami et al. |
| 2004/0117131 A1 | 6/2004 | Peters et al. |
| 2004/0117634 A1 | 6/2004 | Letterer et al. |
| 2004/0121764 A1 | 6/2004 | Rivero |
| 2004/0128613 A1 | 7/2004 | Sinisi |
| 2004/0136574 A1 | 7/2004 | Kozakaya et al. |
| 2004/0139180 A1 | 7/2004 | White et al. |
| 2004/0162896 A1 | 8/2004 | Cen et al. |
| 2004/0174434 A1 | 9/2004 | Walker et al. |
| 2004/0179545 A1 | 9/2004 | Erola et al. |
| 2004/0183676 A1 | 9/2004 | Eisenman |
| 2004/0185863 A1 | 9/2004 | Ogami |
| 2004/0196179 A1 | 10/2004 | Turnbull |
| 2004/0201633 A1 | 10/2004 | Barsness et al. |
| 2004/0201867 A1 | 10/2004 | Katano |
| 2004/0203381 A1 | 10/2004 | Cahn et al. |
| 2004/0204129 A1 | 10/2004 | Payne et al. |
| 2004/0205191 A1 | 10/2004 | Smith et al. |
| 2004/0242224 A1 | 12/2004 | Janik et al. |
| 2004/0260407 A1* | 12/2004 | Wimsatt ............... 700/19 |
| 2004/0260470 A1* | 12/2004 | Rast ............... G06Q 10/06 701/300 |
| 2005/0006478 A1 | 1/2005 | Patel |
| 2005/0021225 A1 | 1/2005 | Kantarjiev et al. |
| 2005/0055287 A1 | 3/2005 | Schmidtberg et al. |
| 2005/0060436 A1 | 3/2005 | Kienhoefer |
| 2005/0064814 A1 | 3/2005 | Matsuo et al. |
| 2005/0073388 A1 | 4/2005 | Lee et al. |
| 2005/0076302 A1 | 4/2005 | Okamoto |
| 2005/0080879 A1 | 4/2005 | Kim et al. |
| 2005/0080902 A1* | 4/2005 | Parupudi ............. G06F 17/3087 709/226 |
| 2005/0081152 A1 | 4/2005 | Commarford et al. |
| 2005/0088280 A1 | 4/2005 | Beehler et al. |
| 2005/0108044 A1 | 5/2005 | Koster |
| 2005/0136903 A1 | 6/2005 | Kashima et al. |
| 2005/0154985 A1 | 7/2005 | Burkhart et al. |
| 2005/0160270 A1 | 7/2005 | Goldberg et al. |
| 2005/0168071 A1 | 8/2005 | Durbin et al. |
| 2005/0203752 A1 | 9/2005 | Shinada |
| 2005/0219223 A1 | 10/2005 | Kotzin et al. |
| 2005/0228869 A1 | 10/2005 | Imago |
| 2005/0262062 A1 | 11/2005 | Xia |
| 2005/0268234 A1 | 12/2005 | Rossi et al. |
| 2006/0026304 A1 | 2/2006 | Price |
| 2006/0028428 A1 | 2/2006 | Dai et al. |
| 2006/0031517 A1* | 2/2006 | Gossweiler, III ....... H04L 67/04 709/227 |
| 2006/0055805 A1 | 3/2006 | Stockton et al. |
| 2006/0061458 A1 | 3/2006 | Simon et al. |
| 2006/0073815 A1 | 4/2006 | Pines et al. |
| 2006/0076398 A1 | 4/2006 | Jung et al. |
| 2006/0080188 A1 | 4/2006 | Jung et al. |
| 2006/0081695 A1 | 4/2006 | Jung et al. |
| 2006/0085177 A1 | 4/2006 | Toyama et al. |
| 2006/0086781 A1 | 4/2006 | Jung et al. |
| 2006/0090132 A1 | 4/2006 | Jung et al. |
| 2006/0092033 A1 | 5/2006 | Hoff et al. |
| 2006/0097855 A1 | 5/2006 | Turnbull et al. |
| 2006/0100912 A1 | 5/2006 | Kumar et al. |
| 2006/0115802 A1 | 6/2006 | Reynolds |
| 2006/0116979 A1 | 6/2006 | Jung et al. |
| 2006/0117001 A1 | 6/2006 | Jung et al. |
| 2006/0157550 A1 | 7/2006 | Jung et al. |
| 2006/0164239 A1 | 7/2006 | Loda |
| 2006/0170687 A1 | 8/2006 | Nakamura et al. |
| 2006/0173816 A1 | 8/2006 | Jung et al. |
| 2006/0190428 A1 | 8/2006 | Jung et al. |
| 2006/0206817 A1 | 9/2006 | Jung et al. |
| 2006/0214813 A1 | 9/2006 | Witkowski et al. |
| 2006/0224961 A1 | 10/2006 | Omi et al. |
| 2006/0226949 A1 | 10/2006 | Reene |
| 2006/0232377 A1 | 10/2006 | Witkowski |
| 2006/0261931 A1 | 11/2006 | Cheng |
| 2007/0005233 A1 | 1/2007 | Pinkus et al. |
| 2007/0008189 A1 | 1/2007 | Amari et al. |
| 2007/0027595 A1 | 2/2007 | Nou |
| 2007/0027903 A1 | 2/2007 | Evans et al. |
| 2007/0032225 A1 | 2/2007 | Konicek et al. |
| 2007/0033414 A1 | 2/2007 | Dunko |
| 2007/0038529 A1 | 2/2007 | Jung et al. |
| 2007/0040013 A1 | 2/2007 | Jung et al. |
| 2007/0064644 A1 | 3/2007 | Dowling et al. |
| 2007/0149216 A1 | 6/2007 | Misikangas |
| 2007/0152798 A1 | 7/2007 | Witkowski |
| 2007/0176736 A1 | 8/2007 | Chuey et al. |
| 2007/0197172 A1 | 8/2007 | Witkowski et al. |
| 2007/0201381 A1 | 8/2007 | Ekl et al. |
| 2007/0201382 A1 | 8/2007 | Ekl et al. |
| 2007/0204021 A1 | 8/2007 | Ekl et al. |
| 2007/0224937 A1 | 9/2007 | Jung et al. |
| 2007/0224938 A1 | 9/2007 | Jung et al. |
| 2007/0270159 A1 | 11/2007 | Lohtia et al. |
| 2008/0027590 A1 | 1/2008 | Phillips et al. |
| 2008/0061967 A1 | 3/2008 | Corrado |
| 2008/0063400 A1 | 3/2008 | Hudson et al. |
| 2008/0065274 A1 | 3/2008 | Taki et al. |
| 2008/0068205 A1 | 3/2008 | Witkowski |
| 2008/0086241 A1 | 4/2008 | Phillips et al. |
| 2008/0091309 A1 | 4/2008 | Walker |
| 2008/0103640 A1 | 5/2008 | Watanabe et al. |
| 2008/0103655 A1 | 5/2008 | Turnbull et al. |
| 2008/0129449 A1 | 6/2008 | Beehler et al. |
| 2008/0143686 A1 | 6/2008 | Yeh et al. |
| 2008/0164972 A1 | 7/2008 | Taki et al. |
| 2008/0183376 A1 | 7/2008 | Knockeart et al. |
| 2008/0195428 A1 | 8/2008 | O'Sullivan |
| 2008/0229198 A1 | 9/2008 | Jung et al. |
| 2008/0266254 A1 | 10/2008 | Robbins et al. |
| 2008/0309451 A1 | 12/2008 | Zellweger et al. |
| 2009/0005963 A1 | 1/2009 | Jarvinen |
| 2009/0037033 A1 | 2/2009 | Phillips et al. |
| 2009/0207021 A1 | 8/2009 | Naccache |
| 2009/0216600 A1 | 8/2009 | Hill |
| 2009/0248587 A1 | 10/2009 | Van Buskirk |
| 2009/0280829 A1 | 11/2009 | Feuerstein |
| 2010/0005153 A1* | 1/2010 | Tsao ............... 709/219 |
| 2010/0146390 A1 | 6/2010 | Jung et al. |
| 2010/0207812 A1 | 8/2010 | Demirdjian et al. |
| 2010/0218095 A1 | 8/2010 | Jung et al. |
| 2010/0223162 A1 | 9/2010 | Jung et al. |
| 2010/0253507 A1 | 10/2010 | Jung et al. |
| 2010/0255785 A1 | 10/2010 | Jung et al. |
| 2010/0280748 A1 | 11/2010 | Mundinger et al. |
| 2010/0280853 A1 | 11/2010 | Petralia et al. |
| 2010/0280884 A1 | 11/2010 | Levine et al. |
| 2010/0309011 A1 | 12/2010 | Jung et al. |
| 2010/0323715 A1 | 12/2010 | Winters |
| 2010/0332131 A1 | 12/2010 | Horvitz et al. |
| 2011/0059693 A1 | 3/2011 | O'Sullivan |
| 2011/0145089 A1 | 6/2011 | Khunger et al. |
| 2011/0224893 A1 | 9/2011 | Scofield et al. |
| 2011/0237287 A1 | 9/2011 | Klein et al. |
| 2011/0246059 A1 | 10/2011 | Tokashiki |
| 2011/0257883 A1 | 10/2011 | Kuznetsov |
| 2011/0288762 A1 | 11/2011 | Kuznetsov |
| 2012/0041675 A1 | 2/2012 | Juliver et al. |
| 2012/0109721 A1 | 5/2012 | Cebon et al. |

(56) References Cited

U.S. PATENT DOCUMENTS

| | | |
|---|---|---|
| 2012/0112696 A1 | 5/2012 | Ikeda et al. |
| 2012/0182144 A1 | 7/2012 | Richardson et al. |
| 2012/0253654 A1 | 10/2012 | Sun et al. |
| 2012/0303745 A1 | 11/2012 | Lo et al. |
| 2013/0054139 A1 | 2/2013 | Bodin et al. |
| 2013/0095757 A1 | 4/2013 | Abdelsamie et al. |
| 2013/0131909 A1 | 5/2013 | Cooper et al. |
| 2013/0158861 A1 | 6/2013 | Lerenc |
| 2013/0158869 A1 | 6/2013 | Lerenc |
| 2013/0226365 A1 | 8/2013 | Brozovich |
| 2013/0237156 A1 | 9/2013 | Jung et al. |
| 2013/0237273 A1 | 9/2013 | Klein et al. |
| 2013/0244713 A1 | 9/2013 | Klein et al. |
| 2013/0244714 A1 | 9/2013 | Klein et al. |
| 2013/0310101 A1 | 11/2013 | Klein et al. |
| 2013/0344859 A1 | 12/2013 | Abramson et al. |
| 2014/0012498 A1 | 1/2014 | Gustafson et al. |
| 2014/0094998 A1 | 4/2014 | Cooper et al. |
| 2014/0171013 A1 | 6/2014 | Varoglu et al. |
| 2014/0173511 A1 | 6/2014 | Lehmann et al. |
| 2014/0342670 A1 | 11/2014 | Kang et al. |
| 2014/0355428 A1 | 12/2014 | Smith et al. |
| 2015/0006005 A1 | 1/2015 | Yu et al. |
| 2015/0006072 A1 | 1/2015 | Goldberg et al. |
| 2015/0019132 A1 | 1/2015 | Gusikhin et al. |
| 2015/0025932 A1 | 1/2015 | Ross et al. |
| 2015/0081362 A1 | 3/2015 | Chadwick et al. |
| 2015/0094093 A1 | 4/2015 | Pierce et al. |
| 2015/0141043 A1 | 5/2015 | Abramson et al. |
| 2015/0149937 A1 | 5/2015 | Khalid et al. |
| 2015/0161564 A1 | 6/2015 | Sweeney et al. |
| 2015/0278759 A1 | 10/2015 | Harris et al. |
| 2015/0294431 A1 | 10/2015 | Fiorucci et al. |
| 2015/0312404 A1 | 10/2015 | Abramson et al. |
| 2015/0317100 A1 | 11/2015 | Shimohata et al. |
| 2015/0319574 A1 | 11/2015 | Wachter et al. |
| 2015/0323333 A1 | 11/2015 | Lord et al. |
| 2015/0323336 A1 | 11/2015 | Lord et al. |
| 2015/0324717 A1 | 11/2015 | Lord et al. |
| 2015/0324729 A1 | 11/2015 | Lord et al. |
| 2015/0324735 A1 | 11/2015 | Lord et al. |
| 2015/0324944 A1 | 11/2015 | Lord et al. |
| 2015/0324945 A1 | 11/2015 | Lord et al. |
| 2015/0325128 A1 | 11/2015 | Lord et al. |
| 2016/0034845 A1 | 2/2016 | Hiyama et al. |
| 2016/0202079 A1 | 7/2016 | Konig et al. |
| 2017/0223164 A1 | 8/2017 | Jung et al. |
| 2019/0113973 A1 | 4/2019 | Coleman |

FOREIGN PATENT DOCUMENTS

| | | |
|---|---|---|
| JP | 6-224832 A | 8/1994 |
| JP | 2002-123349 | 4/2002 |
| JP | 2003-030207 | 1/2003 |
| JP | 2003-084954 | 3/2003 |
| JP | 2003114897 | 4/2003 |
| JP | 2003-128253 A | 5/2003 |
| JP | 2003-228451 | 8/2003 |
| JP | 2012-215921 A | 11/2012 |
| KR | 10-2007-0049336 A | 5/2007 |
| KR | 10-2010-0053717 A | 5/2010 |
| KR | 10-2013-0040430 A | 4/2013 |
| KR | 10-2013-0051265 A | 5/2013 |
| KR | 10-2014-0041665 A | 4/2014 |

OTHER PUBLICATIONS

U.S. Appl. No. 12/798,451, Jung et al.
U.S. Appl. No. 12/592,073, Jung et al.
U.S. Appl. No. 12/660,240, Jung et al.
U.S. Appl. No. 12/660,245, Jung et al.
Japanese State Intellectual Property Office, Notice of Rejection; App. No. 2007-538180 (Based on PCT Patent Application No. PCT/US05/038495); dated May 31, 2011; pp. 1-2 (machine translation).
European Patent Office, Supplementary European Search Report, Pursuant to Rule 62 EPC; App. No. EP 05824191;dated Sep. 15, 2010; pp. 1-5.
Excerpt from the Cambridge Dictionary Online; bearing a date of 2009; printed on Oct. 23, 2009; pp. 1-2; Cambridge University Press; located at http://dictionary.cambridge.org/define.asp?key=62453&dict=CALD; (as provided by examiner).
PCT International Search Report; International App. No. PCT/US05/38495; dated Jul. 9, 2008; pp. 1-2.
PCT International Search Report; International App. No. PCT/US05/38839; dated Jul. 7, 2008; pp. 1-3.
Heywood, Drew; "Drew Heywood's Windows 2000 Network Services"; bearing a date of Feb. 28, 2001; pp. 1-17; Sam's; located at http://proquest.safaribooksonline.com/print?xmlid=0672317419/ch011ev1sec4; printed on Mar. 13, 2008.
Alexander, Keith; Gilliam, Tig; Gramling, Kathy; Grubelic, Chris; Kleinberger, Herb; Leng, Stephen; Moogimane, Dhaval; Sheedy, Chris; "IBM Business Consulting Services—Applying Auto-ID to Reduce Losses Associated with Shrink", Auto-ID Center Massachusetts Institute of Technology; bearing dates of Nov. 1, 2002, Feb. 1, 2003, Jun. 2002 and Nov. 2002; pp. 1-56; Auto-ID Center IBM-AutoID-BC-003; located at: http://quintessenz.org/rfid.docs/www.autoidcenter.org/publishedresearch/ibm-autoid-bc-003.pdf; printed on Feb. 3, 2005.
"Capabilities"; Profit Logic; pp. 1-2; located at: http://www.profitlogic.com/capabilities.htm; printed on Feb. 3, 2005.
Emigh, Jacqueline; "IBM Unleashes New RFID Middleware"; eWeek Enterprise News & Reviews—Attention Health Care Technology Experts; bearing dates of Dec. 16, 2004 and 2005; pp. 1-2; located at: http://www.eweek.com/print_article2/0,2533,a=141068,00.asp; printed on Feb. 3, 2005.
"EPC RFID-based Inventory Management Solution Delivers Faster. Better Goods Logistics"; Solution Architects; bearing a date of 2003; pp. 1-15; located at: www.intel.com/business/bss/solutions/blueprints/pdf/30034101.pdf; printed on Jan. 10, 2005.
"Get real time warehouse management with Cadence WMS."; Cadre Cadence Warehouse Management System Software; pp. 1; located at: http://www.cadretech.com/warehouse_mgmt.html; printed on Jan. 10, 2005.
"IBM RFID solution for asset tracking and inventory management"; pp. 1-3; located at: http://www-1.ibm.com/industries/wireless/doc/content/solution/1025230104.html; printed on Feb. 3, 2005.
"IBM RFID solution for asset tracking and inventory management"; pp. 1-3; located at: http://www-1.ibm.com/industries/wireless/doc/content/solution/1025230204.html; printed on Feb. 3, 2005.
Kuchinskas, Susan; "IBM in Major RFID Expansion"; Jupiterimages; Sep. 27, 2004; pp. 1-2; located at: http://www.internetnews.com/wireless/print.php/3412991; printed on Feb. 3, 2005.
Kuchinskas, Susan; "IBM Takes on Flood of RFID Data"; Jupiterimages; Jul. 19, 2004; pp. 1-3; located at: http://www.internetnews.com/ent-news/print.php/3382621; printed on Feb. 3, 2005.
"Nordstrom: Inventory Management Transformation"; Accenture.com; bearing a date of 1995-2005; pp. 1-2; located at:http://www.accenture.com/xd/xd.asp?it=industries%5Cproducts%5Cretair/05Ccase%5Creta_nordstrom.xml; printed on Feb. 3, 2005.
"Solutions"; Profit Logic; pp. 1-2; located at: http://www.profitlogic.com/solutions.htm; printed on Feb. 3, 2005.
The EPCglobal Network(TM): Overview of Design, Benefits, & Security; EPCglobal Inc.; Sep. 24, 2004; pp. 1-11; located at: http://www.epcglobalinc.org/news/position_papers.html; printed on Feb. 3, 2005.
The State Intellectual Property Office of the People's Republic of China, Office Action; App. No. 2005-80044439.3; dated Oct. 19, 2011; 6 pages (translation not available).
Chinese State Intellectual Property Office, Decision of Final Rejection, App. No. 2005/800444393 (Based on PCT Patent Application No. PCT/US2005/038495);dated Oct. 13, 2010; pp. 1-13.
"Electronic Device"; Wikipedia; created on Jun. 29, 2015; printed on Jun. 8, 2015; pp. 1-2; located at: http://www.thefreedictionary.com/electronic+device.

(56) References Cited

OTHER PUBLICATIONS

"Input Device"; Wikipedia; bearing a date of Jun. 6, 2015; printed on Jun. 8, 2015; pp. 1-4; located at: http://en.wikipedia.org/wiki/Input_device.
Amey et al., "'Real-Time' Ridesharing—The Opportunities and Challenges of Utilizing Mobile Phone Technology to Improve Rideshare Services," Paper submitted to the 2011 Transportation Research Board Annual Meeting, Aug. 1, 2010, pp. 1-17.
Boufraied, "A Diagnostic Approach for Advanced Tracking of Commercial Vehicles With Time Window Constraints," IEEE Transactions on Intelligent Transportation Systems, 2013, vol. 14, No. 3, pp. 1470-1479.
Dillenburg et al., "The Intelligent Travel Assistant," IEEE 5$^{th}$ International Conference on Intelligent Transportation Systems, Sep. 3-6, 2002, pp. 691-696.
Duchon et al., "Distributed Cooperative on-Demand Transportation," 2011 IEEE 73$^{rd}$ Vehicular Technology Conference, pp. 1-5.
Fougères et al., "A Push Service for Carpooling," 2012 IEEE International Conference on Green Computing and Communications, Conference on Internet of Things, and Conference on Cyber, Physical and Social Computing, pp. 685-691.
Garofalaki et al., "Transport Services within the IoT Ecosystem using Localisation Parameters," 2016 IEEE International Symposium on Signal Processing and Information Technology, pp. 1-6.
Guc et al., "Real-time, Scalable Route Planning Using a Stream-Processing Infrastructure," 13$^{th}$ International IEEE Conference on Intelligent Transportation Systems, Sep. 19-22, 2010, pp. 986-991.
Lalos et al., "A Framework for Dynamic Car and Taxi Pools with the Use of Positioning Systems," IEEE Computer Society; Computation World: Future Computing, Service Computation, Cognitive, Adaptive, Content, Patterns, 2009, pp. 385-391.
Megalingam et al., "Automated Wireless Carpooling System for an Eco-Friendly Travel," 3$^{rd}$ International Conference on Electronics Computer Technology, IEEE 2011, pp. 325-329.
Morenz et al., "An Estimation-based Automatic Vehicle Location System for Public Transport Vehicles," Proceedings of the 11$^{th}$ International IEEE, Conference on Intelligent Transportation Systems, Oct. 12-15, 2008, pp. 850-856.
Shahzada et al., "Dynamic Vehicle Navigation: An A* Algorithm Based Approach Using Traffic and Road Information," 2011 IEEE International Conference on Computer Applications and Industrial Electronics, pp. 514-518.
Shengguang et al., "Internet of Things for Special Materials Transportation Vehicles," 2013 IEEE International Conference on Green Computing and Communications and IEEE Internet of Things and IEEE Cyber, Physical and Social Computing, pp. 1891-1894.
Vaughn-Nichols, "Will Mobile Computing's Future Be Location, Location, Location?," Computer, 42(2):14-17, Mar. 2009, IEEE Explore.
"Applications: eCash on the Move at Volkswagen," iButton Applications, Dallas Semiconductor MAXIM, dated 2006; pp. 1-2; printed on Feb. 27, 2006; located at http://www.maxim-ic.com/products/ibutton/applications/index.cfm?Action=DD&id=21; Maxim Integrated Products.
"Applications: Mass Transit in Istanbul, Turkey," and "Parking in Argentina," iButton Applications, Dallas Semiconductor MAXIM; dated 2006, pp. 1-3, printed on Feb. 27, 2006; located at: http://www.maxim-ic.com/products/ibutton/applications/index.cfm?Action=DD&id=8; Maxim Integrated Products.
Cameron et al., "Knuckletop Computing: The Java Ring," pp. 1-4; located at: http://java.sun.com/features/1998/03/rings.html.
"Cellport Announces First Universal, Hands-Free Cell Phone System for Cars," Intelligent Transportation Society of America; dated Jul. 16, 2001, pp. 1-2, printed on Feb. 24, 2006; located at: http://www.itsa.org/itsnews.nsf/key/5FAA?OpenDocument.

"City of Caen, France, to demonstrate simplicity of Near Field Communication (NFC) technology," dated Oct. 18, 2005; pp. 1-3, printed on Mar. 20, 2006; located at: http://www.semiconductors.philips.com/news/content/file_1193.html; Koninklijke Philips Electronics N.V.
"Ecma welcomes ISO/IEC adoption of NFC Standard for short range wireless communication," Ecma International; dated Dec. 8, 2003; pp. 1-3; printed on Feb. 24, 2006; located at: http://www.ecma-international.org/news/Ecma-340-NFCIP-1.htm.
Kiser, "Newall Electronics Introduces Wearable DRO Technology," Industrial Product News Online; pp. 1-2; printed on Feb. 24, 2006; located at: http://www.ipnews.com/archives/dro/jan02/newall%5Felect.htm.
Lewis, "Put on your human-machine interface," Design News; dated Aug. 20, 2001 and 1997-2006; pp. 1-4; printed on Feb. 24, 2006; located at: http//designnews.com/article/CA150040.html; Reed Business Information.
"Near Field Communication: Encyclopedia," What You Need to Know About; dated 2006; pp. 1-3; printed on Mar. 3, 2006; located at: http://experts.about.com/e/n/ne/Near_Field_Communication.htm; About, Inc.
"Near Field Communication," Wikipedia; dated Feb. 17, 2006; pp. 1-2; printed on Feb. 24, 2006; located at: http://en.wikipedia.org/wiki/Near_Field_Communication.
"Near Field Communication, White Paper," dated 2005; pp. 1-9; located at: http://www.ecma-international.org/activities/Communications/tc32-tg19-2005-012.pdf; ECMA International.
"Near field communication set for full-scale trial," dated Oct. 20, 2005, pp. 1-3; printed on Mar. 20, 2006; located at: http://www.electronicstalk.com/news/phi/phi328.html; Pro-Talk Ltd, UK.
"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center," dated Feb. 7, 2006, pp. 1-4; printed on Mar. 20, 2006; located at: http://home.Businesswire.com/portal/site/google/index.jsp?ndmView=news_view&newsId=20060207005492&newsLang=en; BusinessWire.
"Secure Website Logon and Transactions," iButton Applications; dated 2004; pp. 1-2; printed on Mar. 3, 2006; located at: http://72.14.207.104/search?q=cache:4JM396tN_ToJ:db.maxim-ic.com/ibutton/applications/index.cfm; Maxim/Dallas Semiconductor Corp.
Swedberg, "Developing RFID-Enabled Phones," RFID Journal; dated Jul. 9, 2004 and 2002-2006; pp. 1-3; printed on Mar. 20, 2006; located at: http://www.rfidjournal.com/article/articleview/2020/1/1/; RFID Journal, LLC.
Thomson, "Industry giants tout touch computing," Computing, dated Mar. 19, 2004 and 1995-2006; pp. 1-2; printed on Feb. 24, 2006; located at: http://www.computing.co.uk/vnunet/news/2124597/industry-giants-tout-touch-computing; vnu business publications.
"About Near Field Communication," undated; pp. 1-2; NFC-Forum; located at: http://www.nfc-forum.org/aboutnfc/.
Oswald, "blinkx Looks to Make Search Automatic," BetaNews; dated Mar. 7, 2006 and 1998-2006, pp. 1-6; printed on Mar. 22, 2006; BetaNews, Inc.; located at: http://www.betanews.com/article/blinkx_Looks_to_Make_Search_Automatic/1141754474.
"Welcome," NFC-Forum; dated 2005; pp. 1-2; printed on May 31, 2006; located at: http://www.nfc-forum.org/home; NFC Forum.
Beckett, The bay area transportation study, 1968, IEEE, p. 435-445 {Year: 1968}.
Lyons, The role of information in decision making with regard to travel, 2006, IEEE, pp. 199-212 (Year: 2006).
Laios et al., A Framework for Dynamic Car and Taxi Pools with the Use of Positioning System, 2009, IEEE, p. 385-391 (Year: 2009).
Miles et al., The potential application of artificial intelligence in transport, 2006, IEEE, p. 183 (Year: 2006).

\* cited by examiner

402 A computer-readable medium.

404 A computer program for executing on a computing device a computer process, the computer process comprising:
a) receiving a signal indicative of an item having a presence within a geographic locale;
b) identifying the item in response to the signal indicative of an item; and
c) obtaining an end user assistance corresponding to the item.

FIG. 18

562 A computer-readable medium.

564 A computer program for executing on a computing device a computer process, the computer process comprising:
 a) receiving a signal indicative of an aspect of an item having a presence within a geographic locale;
 b) identifying the item in response to the signal indicative of an aspect of an item having a presence within a geographic locale;
 c) obtaining an end user assistance corresponding to the aspect of the item; and
 d) save the end user assistance corresponding to the aspect of the item.

568 Detecting a presence of the item within a geographic locale.

570 Generating the signal indicative of the aspect of an item.

572 Requesting the end user assistance corresponding to aspect of the item.

574 Providing the end user assistance corresponding to the aspect of the item.

872 A computer-readable medium.

874 A computer program product encoding a computer program for executing on a computer system a computer process, the computer process comprising:
   a) receiving an input corresponding to a user-selected item from a plurality of items, each item of the plurality of items having a prior presence within a geographic locale; and
   b) searching a plurality of end user assistances respectively corresponding to the plurality of items for an end user assistance correlating with the user-selected item, each end user assistance of the plurality of end user assistances respectively having been obtained in response to the prior presence within a geographic locale of the corresponding item.

876 c) providing the end user assistance correlating with the user-selected item.

1002 A computer-readable medium.

1004 A computer program product encoding a computer program for executing on a computer system a computer process, the computer process comprising:
 a) saving a plurality of end user assistances respectively corresponding to a plurality of items each having at least one aspect, each end user assistance of the plurality of end user assistances respectively having been obtained in response to an automatic identification of each corresponding item of the plurality of items during a presence of the corresponding item within a geographic locale;
 b) receiving an input corresponding to a user-selected aspect of an item of the plurality of items; and
 c) searching the saved plurality of end user assistances for an end user assistance correlating to the user-selected aspect of an item.

1006 d) providing the end user assistance correlating with the user-selected aspect of the item.

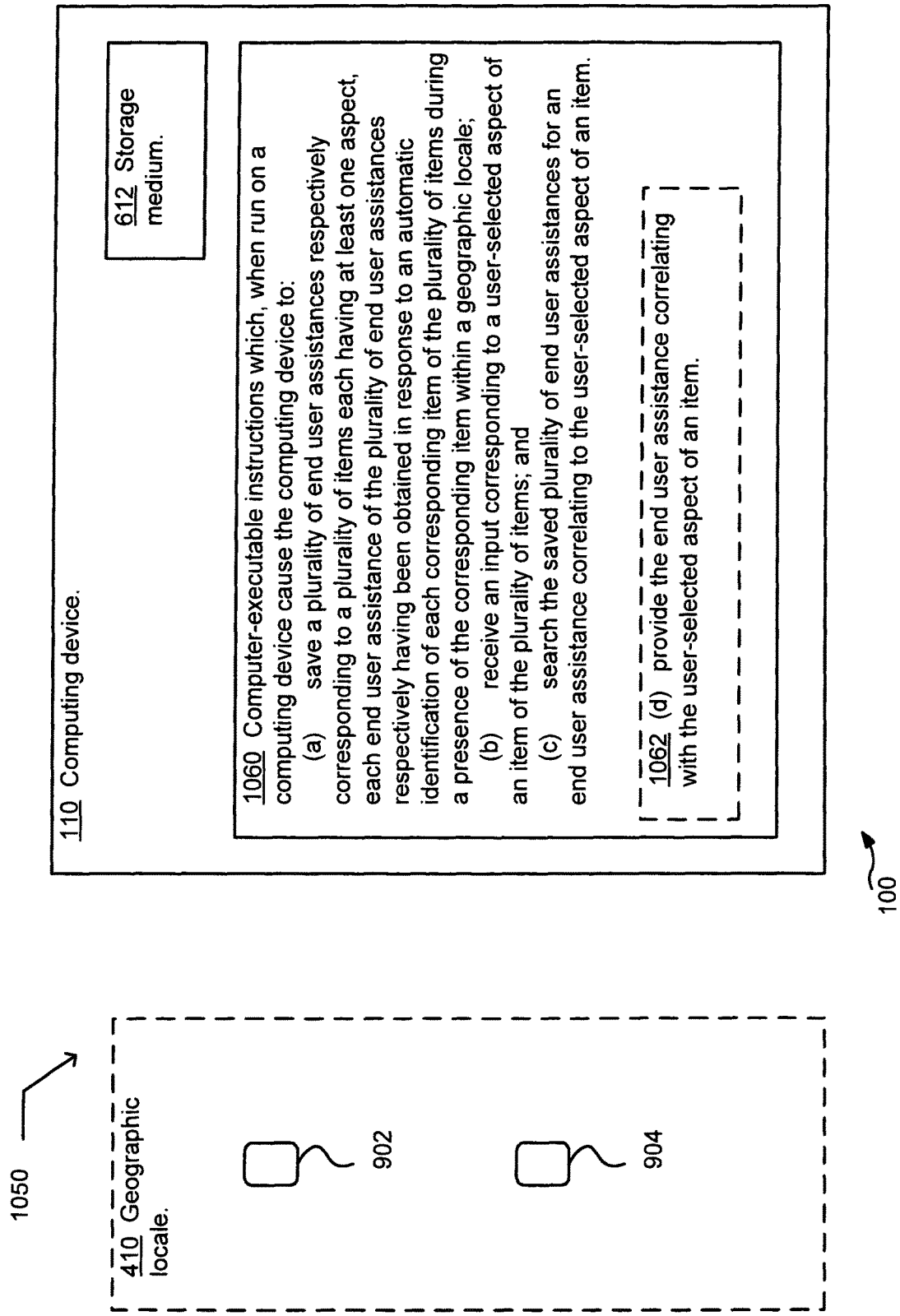

OBTAINING USER ASSISTANCE

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending U.S. patent application entitled PROVIDING ASSISTANCE, naming Edward K. Y. Jung, Royce A. Levien, Mark A. Malamud, and John D. Rinaldo, Jr., as inventors, filed Sep. 30, 2004, Ser. No. 10/955,966.

2. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,476.

3. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 26, 2004, Ser. No. 10/974,555.

4. For purposes of the USPTO extra-statutory requirements, the present application constitutes a continuation in part of currently co-pending U.S. patent application entitled ENHANCED CONTEXTUAL USER ASSISTANCE, naming Edward K. Y. Jung, Royce A. Levien, Mark A. Malamud, and John D. Rinaldo, Jr., as inventors, filed Oct. 27, 2004, Ser. No. 10/974,561.

5. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Oct. 29, 2004, Ser. No. 10/978,243.

6. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,687.

7. For purposes of the USPTO extra-statutory requirements, the present application constitutes a continuation in part of currently co-pending U.S. patent application entitled ENHANCED USER ASSISTANCE, naming Edward K. Y. Jung, Royce A. Levien, Mark A. Malamud, and John D. Rinaldo, Jr., as inventors, filed Dec. 1, 2004, Ser. No. 11/000,736.

8. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,828.

9. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,827.

10. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Jan. 18, 2005, Ser. No. 11/037,825.

11. For purposes of the USPTO extra-statutory requirements, the present application constitutes a continuation in part of currently co-pending U.S. patent application entitled OBTAINING USER ASSISTANCE, naming Edward K. Y. Jung, Royce A. Levien, Mark A. Malamud, and John D. Rinaldo, Jr., as inventors, filed Nov. 19, 2009, Ser. No. 12/592,073.

The above applications are specifically incorporated herein by reference in their entirety for all that they disclose and teach. In an event of any conflict between the instant application and an application incorporated by reference, the instant application controls.

SUMMARY

An embodiment provides a method. The method includes receiving an input corresponding to a user-selected item from a plurality of items, each item of the plurality of items respectively having a prior presence within a geographic locale. The method also includes searching a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. The method may further include providing the end user assistance correlating with the user selected item. In addition to the foregoing, other method embodiments are described in the claims, drawings, and text forming a part of the present application.

Another embodiment provides a computer program product. The computer program product encodes a computer program for executing on a computer system a computer process. The computer process includes receiving an input corresponding to a user-selected item from a plurality of items, each item of the plurality of items respectively having a prior presence within a geographic locale. The computer process further includes searching a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. The computer process may include providing the end user assistance correlating with the user-selected item. In addition to the foregoing, other computer program product embodiments are described in the claims, drawings, and text forming a part of the present application.

A further embodiment provides a system. The system includes a computing device and instructions. The instructions when executed on the computing device cause the computing device to receive an input corresponding to a user-selected item from a plurality of items. Each item of the plurality of items respectively having a prior presence within a geographic locale. The instructions further cause the computing device to search a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. Instructions may further cause the computing device to provide the end user assistance correlating with the user-selected item. In addition to the foregoing, other system embodiments are described in the claims, drawings, and text forming a part of the present application.

An embodiment provides a method. The method includes saving a plurality of end user assistances respectively corresponding to a plurality of items each having at least one aspect. Each end user assistance of the plurality of end user assistances respectively having been obtained in response to an identification of each corresponding item of the plurality of items during a presence within a geographic locale of the corresponding item. The method further includes receiving an input corresponding to a user-selected aspect of an item of the plurality of items, and searching the saved plurality of end user assistances for an end user assistance correlating to the user-selected aspect of an item. The identification of each corresponding item may include an automatic identification of each corresponding item. The automatic identification of each corresponding item of the plurality of items may include generating a signal indicative of the corresponding item in response to a presence of the corresponding item within the geographic locale, and identifying the corresponding item in response to the signal indicative of the corresponding item. The method may further include providing the end user assistance correlating with the user-selected aspect of an item. In addition to the foregoing, other method embodiments are described in the claims, drawings, and text forming a part of the present application.

Another embodiment provides a computer program product. The computer program product encodes a computer program for executing a computer process on a computer system. The computer process includes saving a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The computer process also includes receiving an input corresponding to a user-selected aspect of an item of the plurality of items, and searching the saved plurality of end user assistances for an end user assistance correlating to the user-selected aspect of an item. The computer program product may further include providing the end user assistance correlating to the user-selected aspect of the item. In addition to the foregoing, other computer program product embodiments are described in the claims, drawings, and text forming a part of the present application.

A further embodiment provides a system. The system includes a computing device having a storage medium, and instructions. The instructions when run on the computing device cause the computing device to save a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The instructions further cause the computing device to receive an input corresponding to a user-selected aspect of an item of the plurality of items, and to search the saved plurality of end user assistances for an end user assistance correlating to the user-selected aspect of an item. In addition to the foregoing, other system embodiments are described in the claims, drawings, and text forming a part of the present application.

An embodiment provides a system. The system includes a storage module operable to save a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The system includes a user interaction module operable to receive an input corresponding to a user-selected aspect of an item of the plurality of items. The system further includes a locator module operable to search the saved plurality of end user assistances for an end user assistance correlating to the user-selected aspect of an item. In addition to the foregoing, other system embodiments are described in the claims, drawings, and text forming a part of the present application.

Another embodiment provides a method. The method includes providing an input-selection to a user interface associated with a computing device, the provided input-selection corresponding to an aspect of an item of a plurality of items. Each item of the plurality of items respectively having a prior presence within a geographic locale. The method includes waiting while the computing device searches a plurality of end user assistances respectively corresponding to the plurality of items for an end user assistance correlating with the user-selected aspect of an item. Each end user assistance of the plurality of user assistances respectively having been obtained in response to the prior presence within a geographic locale by the corresponding item. The method further includes receiving an end user assistance correlating to the input-selection. In addition to the foregoing, other method embodiments are described in the claims, drawings, and text forming a part of the present application.

A further embodiment provides a method. The method includes receiving an input corresponding to a user-selected item from a plurality of items, each item of the plurality of items respectively having a prior presence within a geographic locale. The method also includes searching a plurality of user assistances respectively corresponding to the plurality of items for a user assistance correlating with the user-selected item. Each user assistance of the plurality of user assistances respectively having been obtained in response to the prior presence within a geographic locale of the corresponding item. The method may further include providing the user assistance correlating with the user selected item. In addition to the foregoing, other method embodiments are described in the claims, drawings, and text forming a part of the present application.

In addition to the foregoing, various other embodiments are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 11 illustrates a partial view of an exemplary computer program product that includes a computer program for executing a computer process on a computing device;

FIG. 18 illustrates a partial view of an exemplary computer program product that includes a computer program for executing a computer process on a computing device;

FIG. 26 illustrates a partial view of an exemplary computer program product that includes a computer program for executing a computer process on a computing device;

FIG. 32 illustrates a partial view of an exemplary computer program product that includes a computer program for executing a computer process on a computing device;

FIG. 33 illustrates an exemplary system in which embodiments may be implemented;

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Features, functionality, and options of computing devices, such as personal computers, have rapidly advanced and evolved as technology provides increased processor speed, storage capacity, and connectivity. Computing technology has moved beyond the personal computer and into everyday items and devices, providing embedded technology and connectivity. Almost any thing or item, from buildings to clothing, from telephones to tools, from appliances to cars, from homes to the human body, from personal information devices to a common a coffee mug, may have an embedded electronic device that includes a computing device. The embedded electronic device typically improves performance and capacity of a basic functionality of the item, and may connect the item with a network of other items or the Internet. These items with embedded electronic devices may be described using a variety of names, which may not have a bright line distinction between them. Commonly used names include a limited resource-computing device, limited capacity computing device, ubiquitous computing device, pervasive computing device, digital appliance, and Internet appliance. Additionally, rapid advances have been made in interconnectability and interoperability of computing devices and other devices at a consumer level, such as handheld devices and cell phones, and at system and a large system level. These advances are intended to provide a user with many benefits.

Realization of these benefits may require that a user read and re-read manuals for their items. However, a user may experience difficulty obtaining, maintaining, updating, and simply keeping track of all the manuals for the items present and/or used in and around their premises, such as their home and/or business premises. Additionally, manuals are sometimes lost, misplaced, or unavailable. A user may benefit from a method, system, and computer program product that automatically identifies and obtains manuals for items having a presence within a user's geographic locale, such as their home and or/business. A user may also benefit by being able to search the obtained manuals for an assistance related to a selected item of the items having a presence within the geographic locale.

Figure 1:
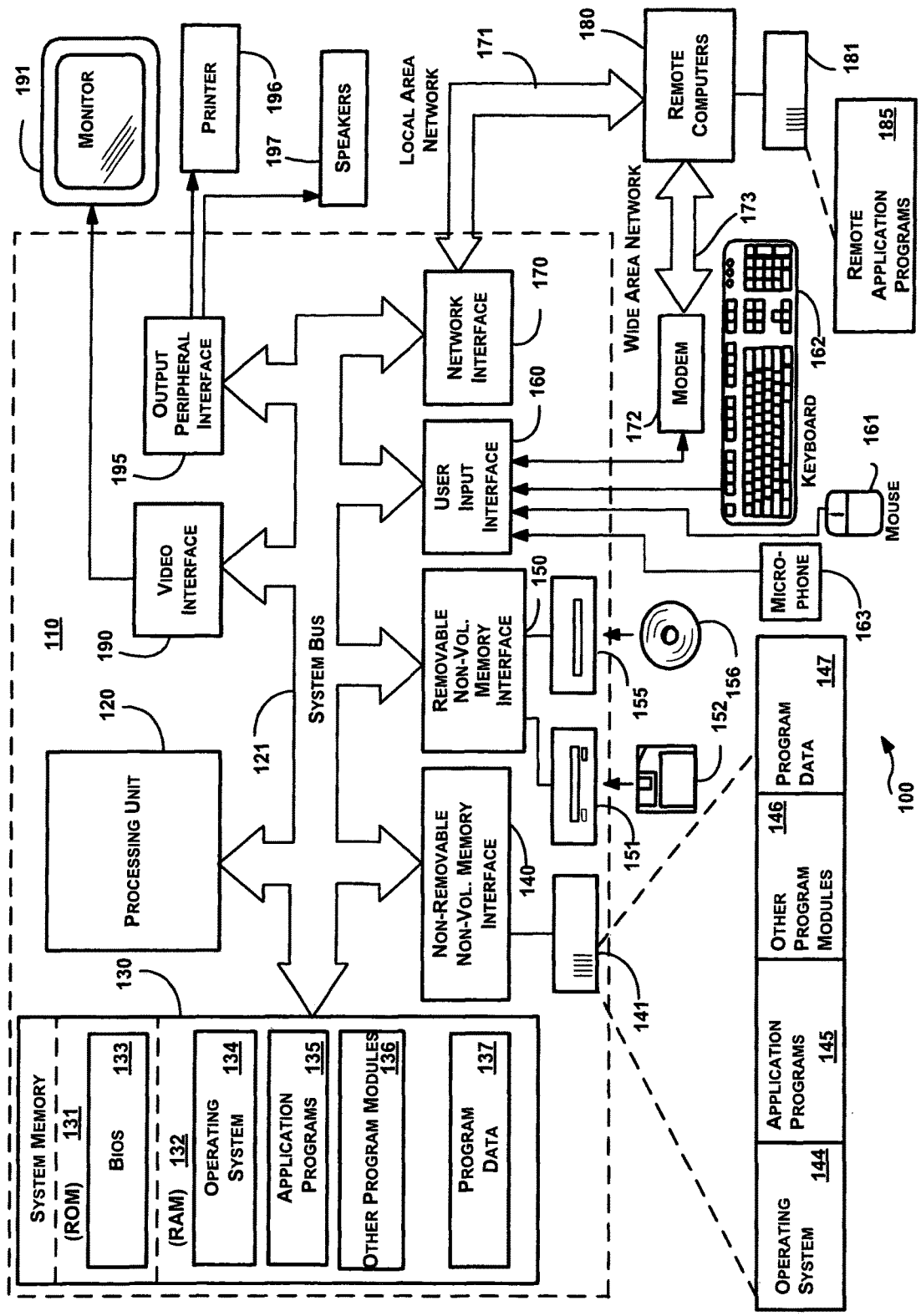
FIG. 1 illustrates an exemplary system in which embodiments may be implemented, including a general-purpose computing device.

FIG. 1 and the following discussion are intended to provide a brief, general description of an environment in which embodiments may be implemented. FIG. 1 illustrates an exemplary electronic device that may correspond in whole or part to a general-purpose computing device, and is shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such a computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 1 illustrates an example of a suitable environment on which embodiments may be implemented. The computing system environment 100 of FIG. 1 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, hand-held or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following include a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 2:
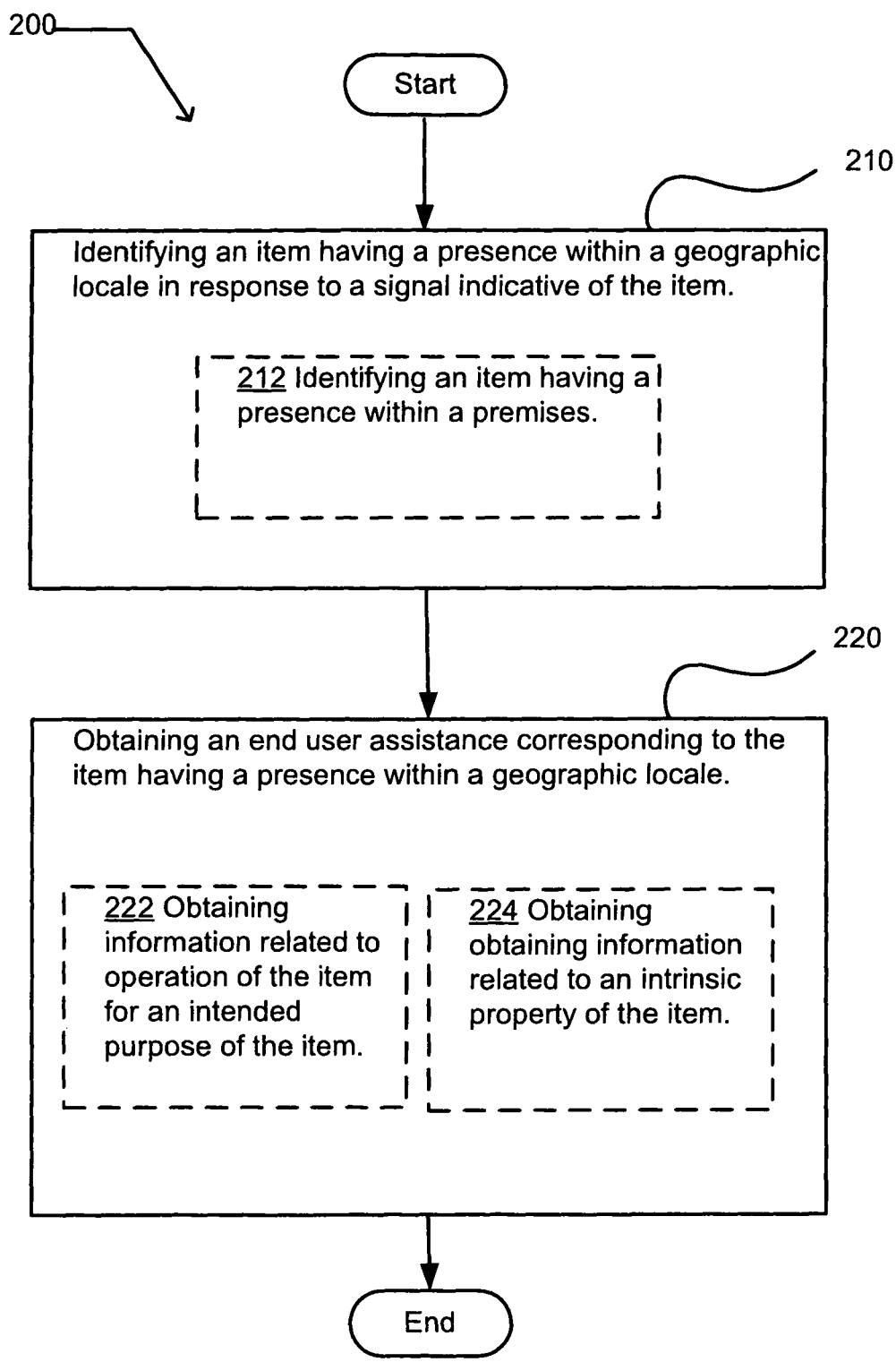
FIG. 2 illustrates an operational flow representing exemplary operations that obtain an assistance corresponding to an item having a presence within a geographic locale.

FIG. 2 illustrates an operational flow 200 representing exemplary operations that obtain an assistance corresponding to an item having a presence within a geographic locale. After a start operation, the operational flow 200 moves to a recognition operation 210 where an item having a presence within a geographic locale is identified in response to a signal indicative of the item. At help operation 220, an end user assistance is obtained corresponding to the item having a presence within a geographic locale. In an embodiment, an end user includes one for whom the item is designed and/or produced, as opposed to those involved creating, manufacturing, transporting, promoting, and/or marketing the item. An end user may include a person, an entity, and/or a government. In another embodiment, an end user includes a consumer of the item. In a further embodiment, an end user assistance may include any type of assistance for an end user. For example, an end user assistance may include an assistance for use by a user, and/or an assistance in operation of the item. In another embodiment, an end user assistance for use by the item may include, for example, an upgrade to a firmware or program present in the item, and responding to a recall notice. A response to a recall notice may include, for example, ordering a replacement part in response to the recall notice.

In an alternative embodiment, the recognition operation 210 may include the operation 212, wherein an item having a presence within a premises is identified in response to a signal indicative of the item. In a further alternative embodiment, the help operation 220 may include the operation 222, wherein information is obtained related to operation of the item for an intended purpose of the item. An alternative embodiment of the help operation 220 may include the operation 224, wherein information is obtained related to an intrinsic property of the item having a presence within a geographic locale. The operational flow 200 then moves to an end operation.

As used herein, in an embodiment, an item may include any object or device capable of having any type of identifiable presence within a geographic locale. For example and without limitation, in certain embodiments an item may include one or more of the following: an electronic device; an appliance; a computing device, such as a personal computer and a server; a limited resource computing device; a pervasive computing device; PDA; a cell phone; a Blackberry appliance; a vehicle, such as a car, boat, and/or aircraft; an X-Box; a home gateway; a set-top box; a point-of-sale terminal; a camera; a TiVo; and an automated teller machine. In other embodiments, an item may be incorporated within another item. In other embodiments, an item may not include a computing device.

Figure 3:
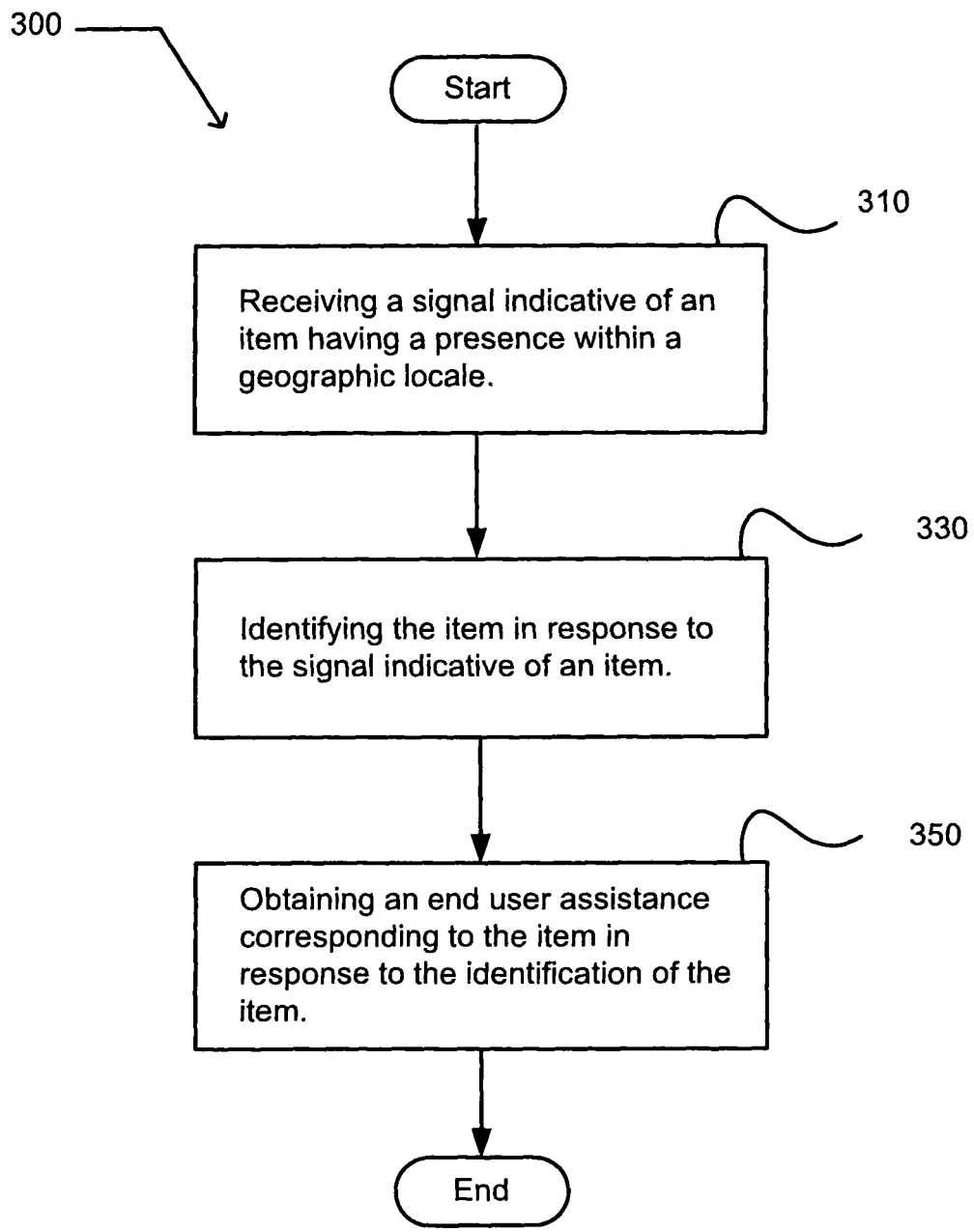
FIG. 3 illustrates another operational flow representing exemplary operations that obtain an assistance corresponding to an item having presence within a geographic locale.

FIG. 3 illustrates an operational flow 300 representing exemplary operations that obtain an assistance corresponding to an item having presence within a geographic locale. After a start operation, the operational flow 300 moves to a reception operation 310. At the operation 310, a signal indicative of an item having a presence within a geographic locale is received. At a recognition operation 330, the item having a presence within a geographic locale is identified in response to the signal indicative of an item. At a help operation 350, an end user assistance is obtained corresponding to the item having a presence within a geographic locale in response to the identification of the item. The operational flow 300 then moves to an end operation.

Figure 4:
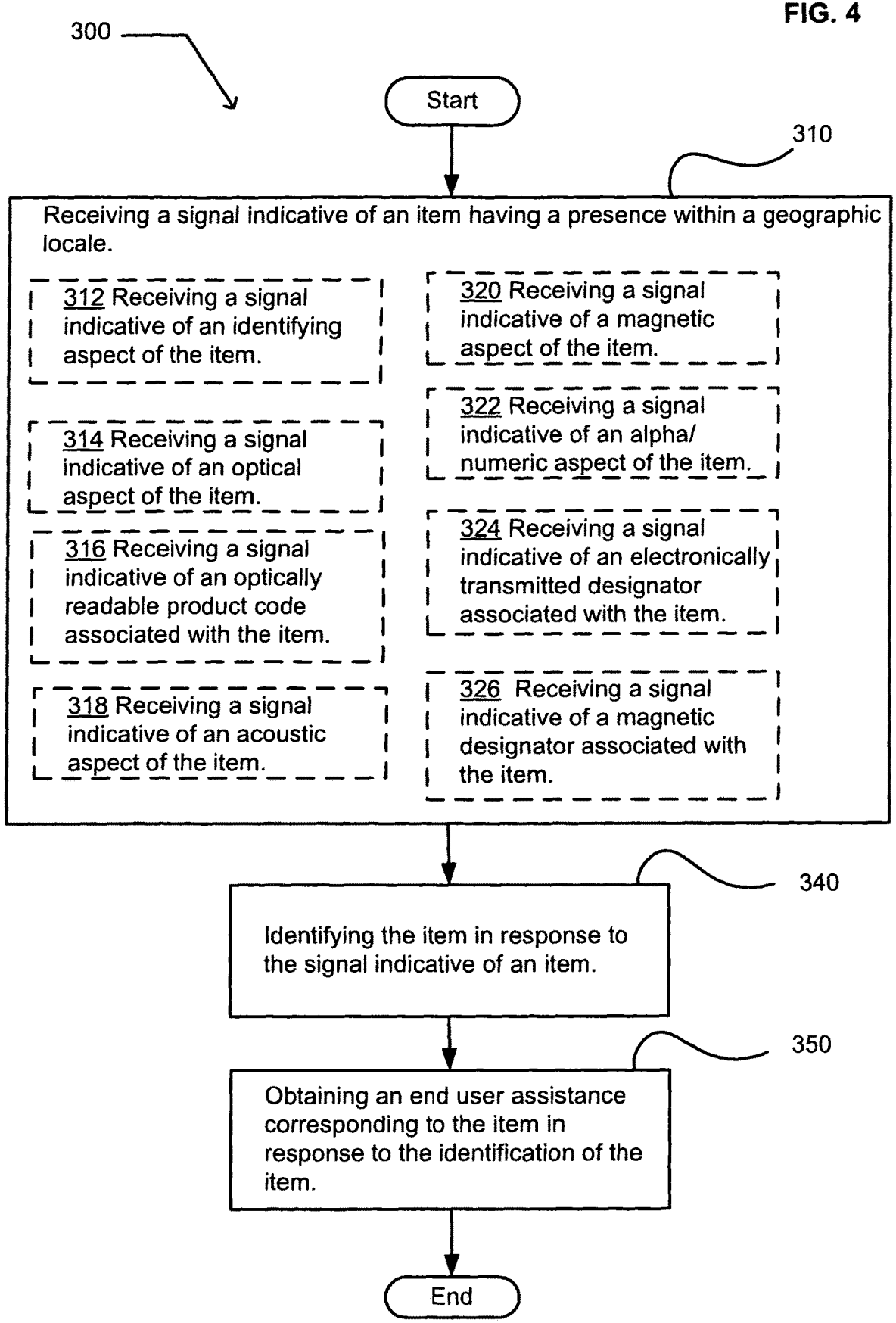
FIG. 4 illustrates an alternative embodiment of the exemplary operational flow of FIG. 3.

FIG. 4 illustrates an alternative embodiment of the exemplary operational flow 300 of FIG. 2. FIG. 4 illustrates an embodiment where the reception operation 310 may include at least one additional operation. Additional operations may include operation 312, operation 314, operation 316, operation 318, operation 320, operation 322, operation 324, and operation 326. At the operation 312, a signal indicative of an identifying aspect of the item is received. An identifying aspect of the item may include any aspect or aspects useful in identifying the item. For example, an identifying aspect of an item may include a profile, a shape, or other of distinguishable aspect of the item. In addition and without limitation, an identifying aspect of the item may include a visual signature the item, an acoustic signature the item, an electromagnetic signature of the item, and/or a magnetic signature of the item. At the operation 314, a signal indicative of an optical aspect of the item is received. An optical aspect of the item may include any optical aspect or aspects useful in identifying the item. For example, an optical aspect may include a known shape, for example a robot, a ship, and a car. At the operation 316, a signal indicative of an optically readable product code associated with the item is received. An optically readable product code associated with the item may include any optically readable product code useful in identifying the item. For example, an optically readable product code may include a bar code reflecting a vehicle identification number, and/or a SKU number.

At the operation 318, a signal indicative of an acoustic aspect of the item is received. An acoustic aspect of the item may include any acoustic aspect or aspects useful identifying the item. For example, an acoustic aspect may include a sound of a motorcycle, such as a Harley Davidson motorcycle. At the operation 320, a signal indicative of a magnetic aspect of the item is received. A magnetic aspect of the item may include a presence or absence of a magnetic characteristic of the item. At the operation 322, a signal indicative of an alpha/numeric aspect of the item is received. An alpha/numeric aspect of the item may include any alpha/numeric aspect useful in identifying the item. For example, an alpha/numeric aspect may include a trademark, such as "Ford" on a vehicle, "Dell" on a computing device. An alpha/numeric aspect may include a model number, and publicly viewable characters on a license plate or an aircraft registration number. At the operation 324, a signal indicative of an electronically transmitted designator associated with the item is received. The electronically transmitted designator may include any designator useful in identifying the item, such as a signal transmitted by an RFID device. At operation 326, a signal indicative of a magnetic designator associated with the item is received. The magnetic designator associated with the item may be any magnetic designator useful identifying the item, such as a scanable magnetic strip incorporated into a card or the item.

Figure 5:
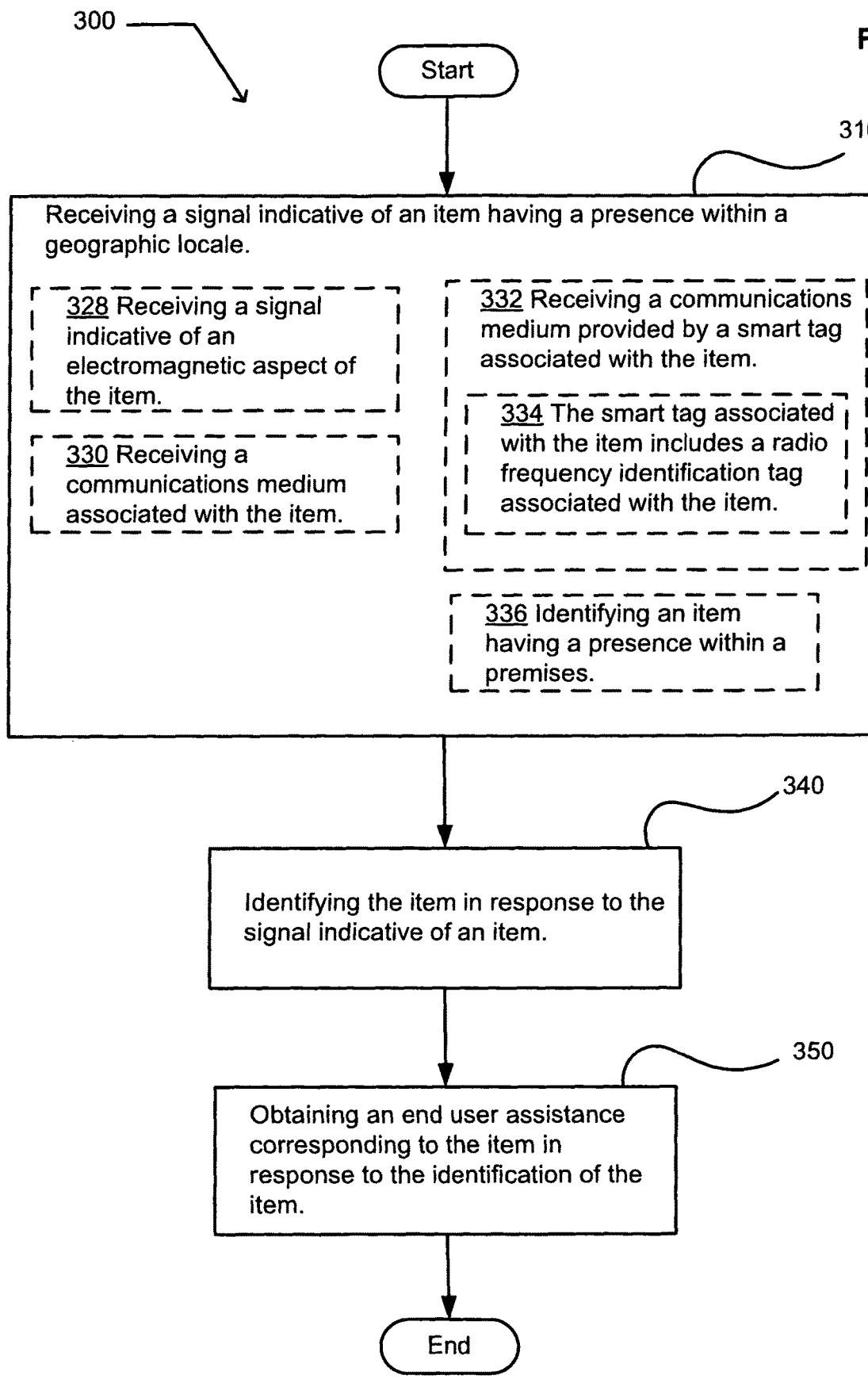
FIG. 5 illustrates another alternative embodiment of the exemplary operational flow of FIG. 3.

FIG. 5 illustrates an alternative embodiment of the exemplary operational flow 300 of FIG. 2. FIG. 5 illustrates an embodiment where the reception operation 310 may include at least one additional operation. The additional operations may include operation 328, operation 330, operation 332, operation 334, and operation 336. At operation 328, a signal indicative of an electromagnetic aspect of the item is received. The electromagnetic aspect may be any aspect of the item useful in identifying the item, such as an electromagnetic signature of the item. At operation 330, a communications medium associated the item is received. The communications medium associated with or associatable with the item may be any communications medium associatable and useful in identifying the item. At operation 332, a communications medium provided by a smart tag associated with the item is received. In a further alternative embodiment, the operation 332 may include operation 334 wherein the smart tag associated with the item includes a radio frequency identification tag associated with the item. the identifying an item having a presence within a geographic locale includes identifying an item having a presence within a premises.

Figure 6:
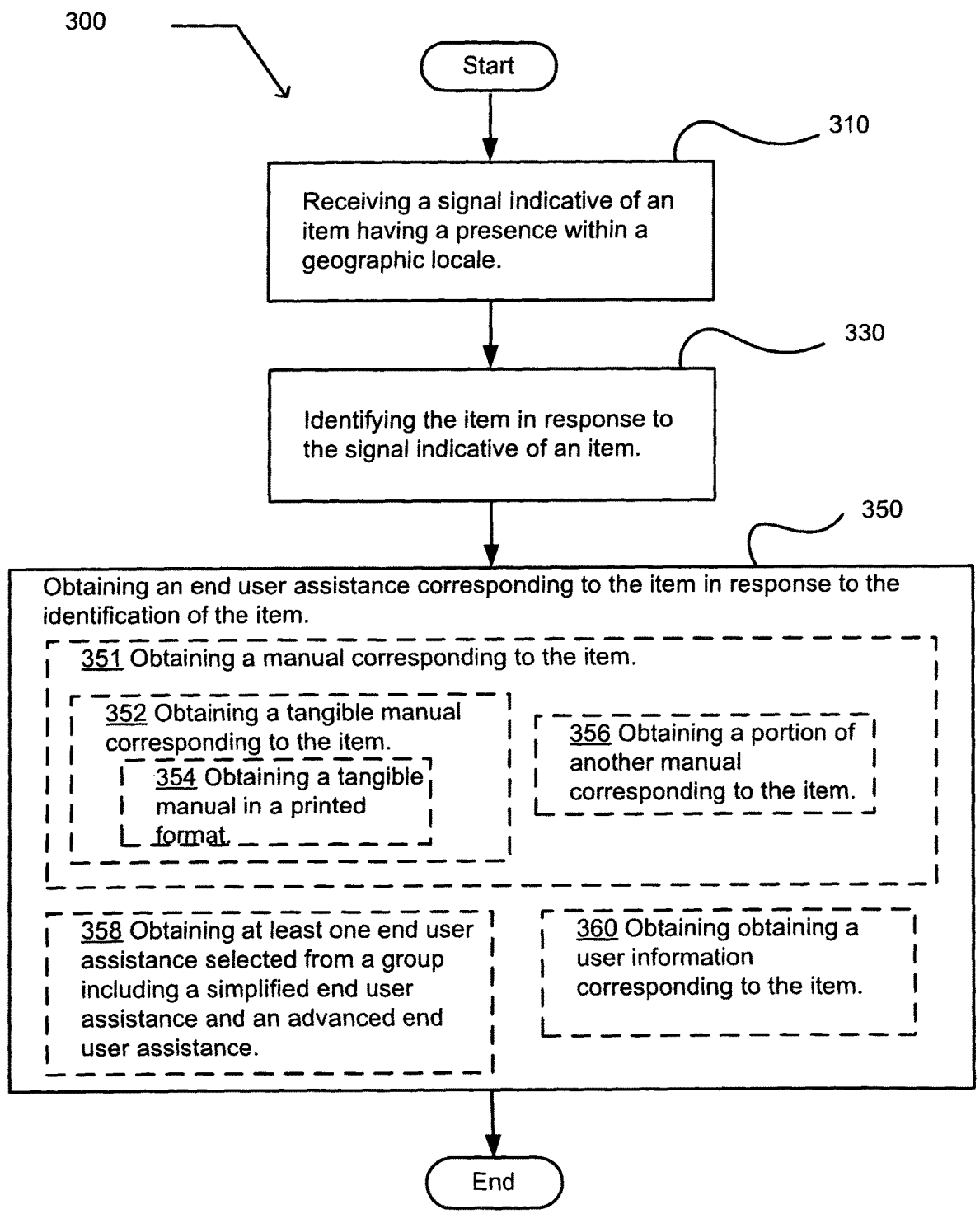
FIG. 6 illustrates a further alternative embodiment of the exemplary operational flow of FIG. 3.

FIG. 6 illustrates an alternative embodiment of the exemplary operational flow 300 of FIG. 2. FIG. 6 illustrates an embodiment where the reception operation 350 may include at least one additional operation. Additional operations may include operation 351, operation 358, and operation 360. At operation 351, a manual corresponding to the item is obtained. Operation 351 may include additional operations, such as operation 352, and operation 356. At operation 352, a tangible manual corresponding to the item is obtained. Operation 352 may include an additional operation 354, wherein a tangible manual in a printed format is obtained. In other alternative embodiments, operation 351 may include obtaining an intangible manual, and the intangible manual may include a manual having a digital format. At operation 356, the obtaining a manual may include a portion of another manual corresponding to the item. At operation 358, at least one end user assistance is obtained by selecting from a group including a simplified user assistance and an advanced user assistance. At operation 360, the obtaining an end user assistance corresponding to the item includes obtaining a user information corresponding to the item.

Figure 7:
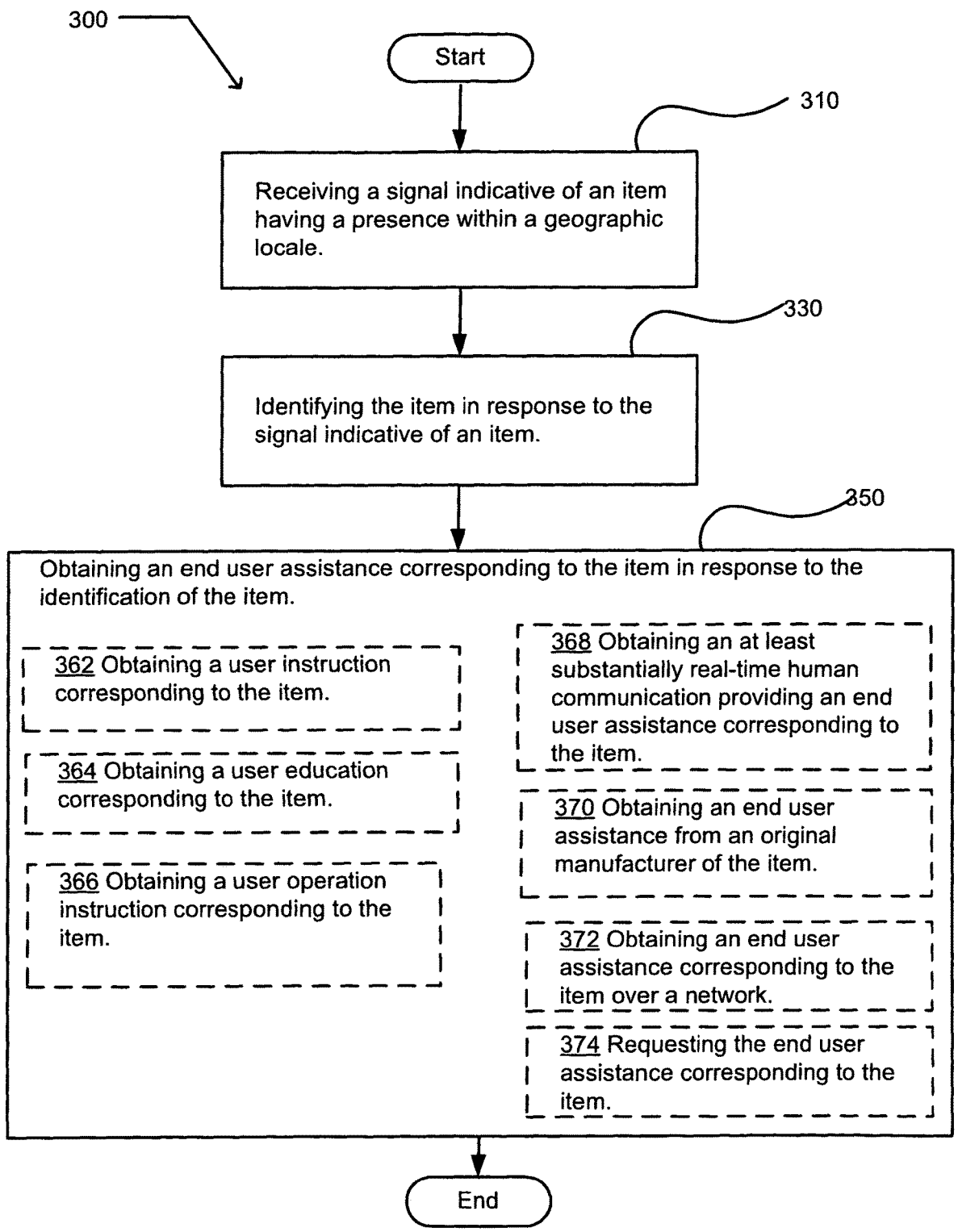
FIG. 7 illustrates yet another alternative embodiment of the exemplary operational flow of FIG. 3.

FIG. 7 illustrates an alternative embodiment of the exemplary operational flow 300 of FIG. 2. FIG. 7 illustrates an embodiment where the reception operation 350 may include at least one additional operation. Additional operations may include operation 362, operation 364, operation 366, operation 368, operation 370, operation 372, and operation 374. At operation 362, a user instruction corresponding to the item is obtained. At operation 364, a user education corresponding to the item is obtained. At operation 366, a user operation instruction corresponding to the item is obtained. At operation 368, an at least substantially real-time human communication is obtained a providing an end user assistance corresponding to the item. At operation 370, an end user assistance is obtained from an original manufacturer of the item. At operation 372, an end user assistance corresponding to the item is delivered over a network. In another alternative embodiment, an end user assistance corresponding to the item is delivered by a mail service, such as the U.S. Post Office or a private mail service. At operation 374, the obtaining an end user assistance corresponding to the item includes requesting the end user assistance corresponding to the item.

Figure 8:
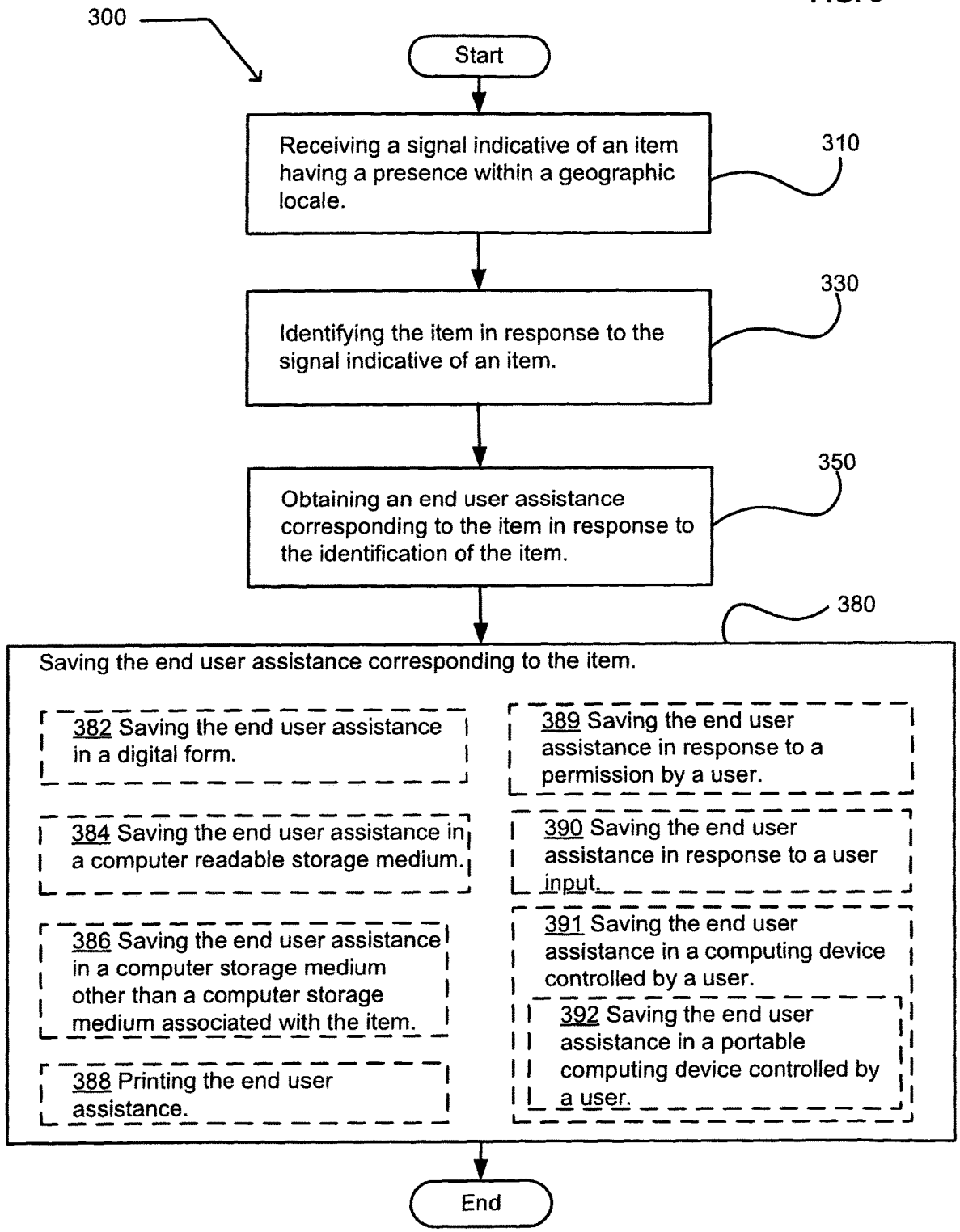
FIG. 8 illustrates an alternative embodiment of the exemplary operational flow of FIG. 3 that includes a retention operation.

FIG. 8 illustrates an alternative embodiment of the exemplary operational flow 300 of FIG. 2 that includes a retention operation 380. At operation 380, the end user assistance corresponding to the item is saved. An alternative embodiment of the operation 380 may include at least one additional operation. Additional operations may include operation 382, operation 384, operation 386, operation 388, operation 389, operation 390, an operation 391. At the operation 382, the end user assistance is saved in a digital form. At operation 384, the end user assistance is saved on a computer readable storage medium. At operation 386, the end user assistance is saved on a computer storage medium other than a computer storage medium associated with the item. At operation 388, the end user assistance is printed. At operation 389, the end user assistance is saved in response to a permission by a user. At operation 390, the end user assistance is saved in response to a user input. At operation 391, the end user assistance is saved in a computing device controlled by a user. An alternative embodiment of the operation 391 includes operation 392, wherein the end user assistance is saved in a portable computing device controlled by the user.

Figure 9:
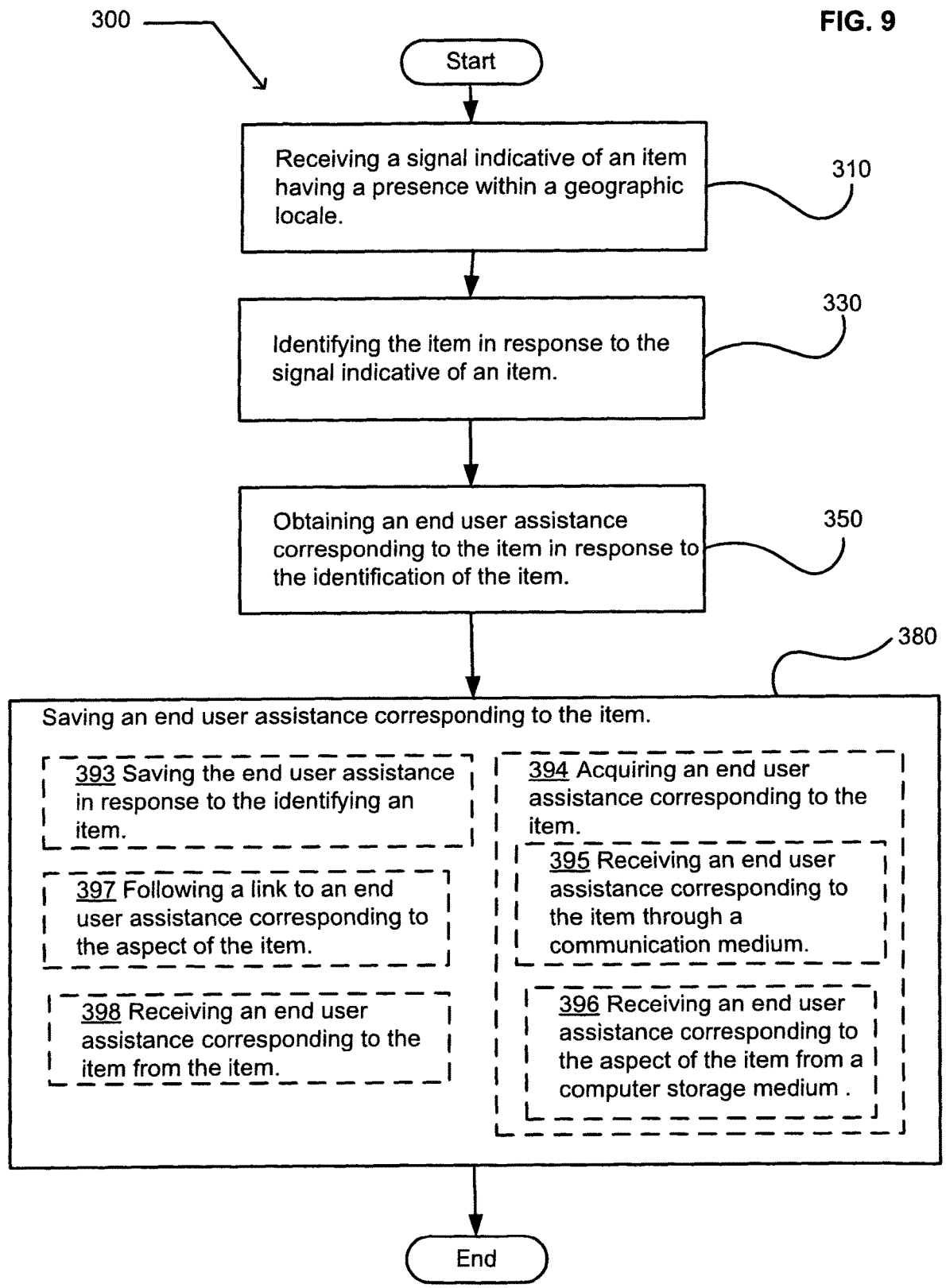
FIG. 9 illustrates an alternative embodiment of the exemplary operational flow of FIGS. 3 and 8.

FIG. 9 illustrates an alternative embodiment of the exemplary operational flow 300 of FIGS. 3 and 8. FIG. 9 illustrates an embodiment where the retention operation 380 may include at least one additional operation. Additional operations may include operations 393 through operation 398. At operation 393, the end user assistance is saved in response to the identifying an item. At operation 394, the saving the end user assistance corresponding to the item includes acquiring an end user assistance corresponding to the item. An alternative embodiment of the operation 394 may include at least one additional operation. Additional operations may include operations 395 and operation 396. At operation 395, an end user assistance corresponding to the item is received through a communication medium. For example, the communications medium may include a modulated data stream, which may be received over a wired and/or wired network connection. At operation 396, an end user assistance corresponding to the aspect of the item is received from a computer storage medium. The computer storage medium may include any medium suitable for conveyance of the end user assistance. For example, the computer storage medium may include a DVD, a CD, a diskette, an external hard drive, and a portable flash memory device. At operation 397, the acquiring an end user assistance corresponding to the item includes following a link to an end user assistance corresponding to the aspect of the item. The link may include a hyperlink. At operation 398, an end user assistance corresponding to the item maybe acquired from the item.

Figure 10:
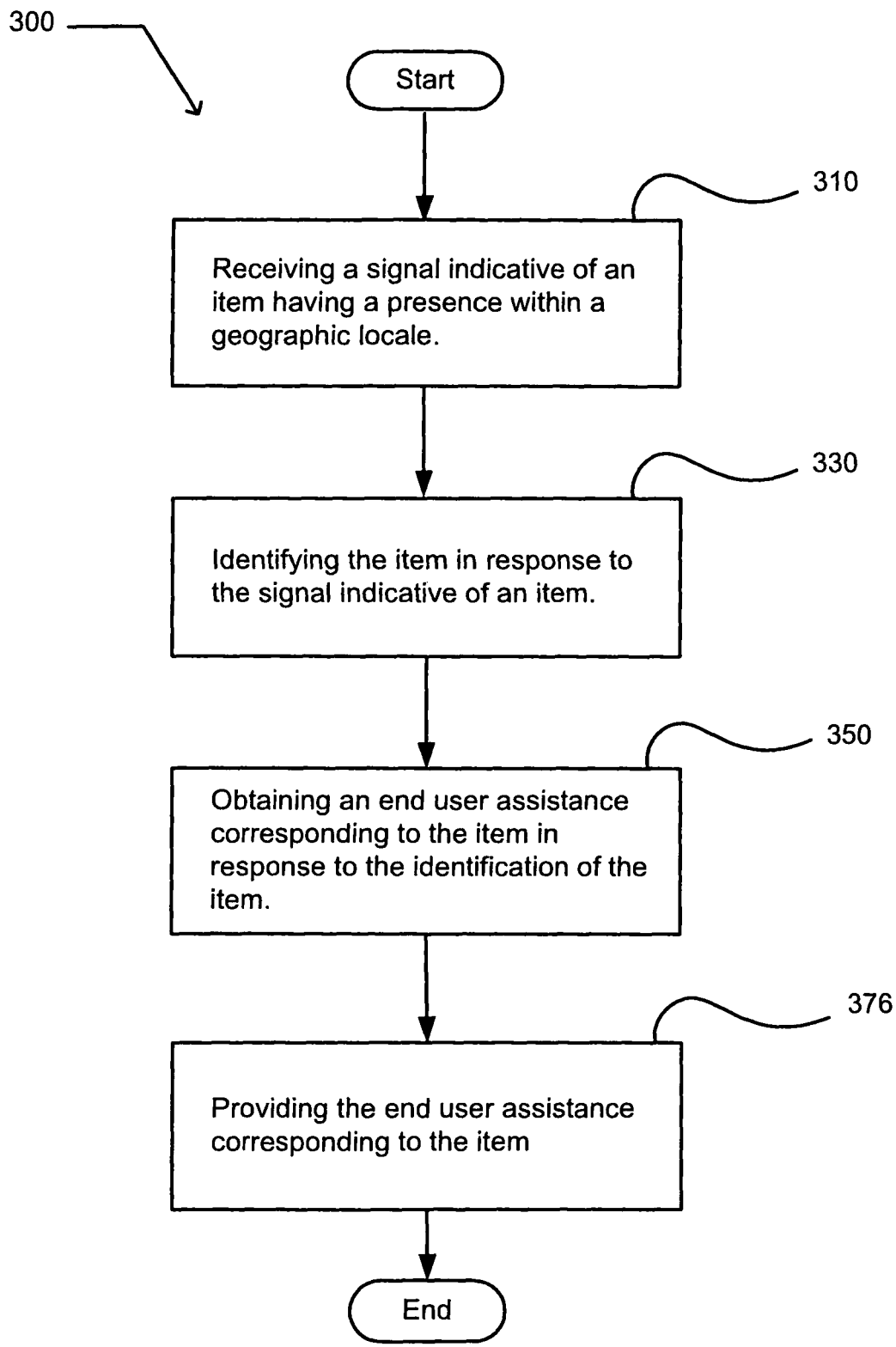
FIG. 10 illustrates an alternative embodiment of the exemplary operational flow of FIG. 3 that includes a broadcast operation.

FIG. 10 illustrates an alternative embodiment of the exemplary operational flow 300 of FIG. 3 that includes a broadcast operation 376. At the operation 376, the end user assistance corresponding to the item is provided.

FIG. 11 illustrates a partial view of an exemplary computer program product 400 that includes a computer program 404 for executing a computer process on a computing device. An embodiment of the exemplary computer program product 400 is provided using a computer-readable medium 402, and includes computer executable instructions. The computer executable instructions encode the computer program 404 for executing on a computing device a process that includes receiving a signal indicative of an item having a presence within a geographic locale, identifying the item in response to the signal indicative of an item, and obtaining an end user assistance corresponding to the item. The computer-readable medium 402 may be carried by a computer-readable carrier (not shown). The computer-readable medium 402 may include a computer storage medium, which may be carried by a computer-readable carrier (not shown). The computer-readable medium 402 may include a communications medium (not shown).

Figure 12:
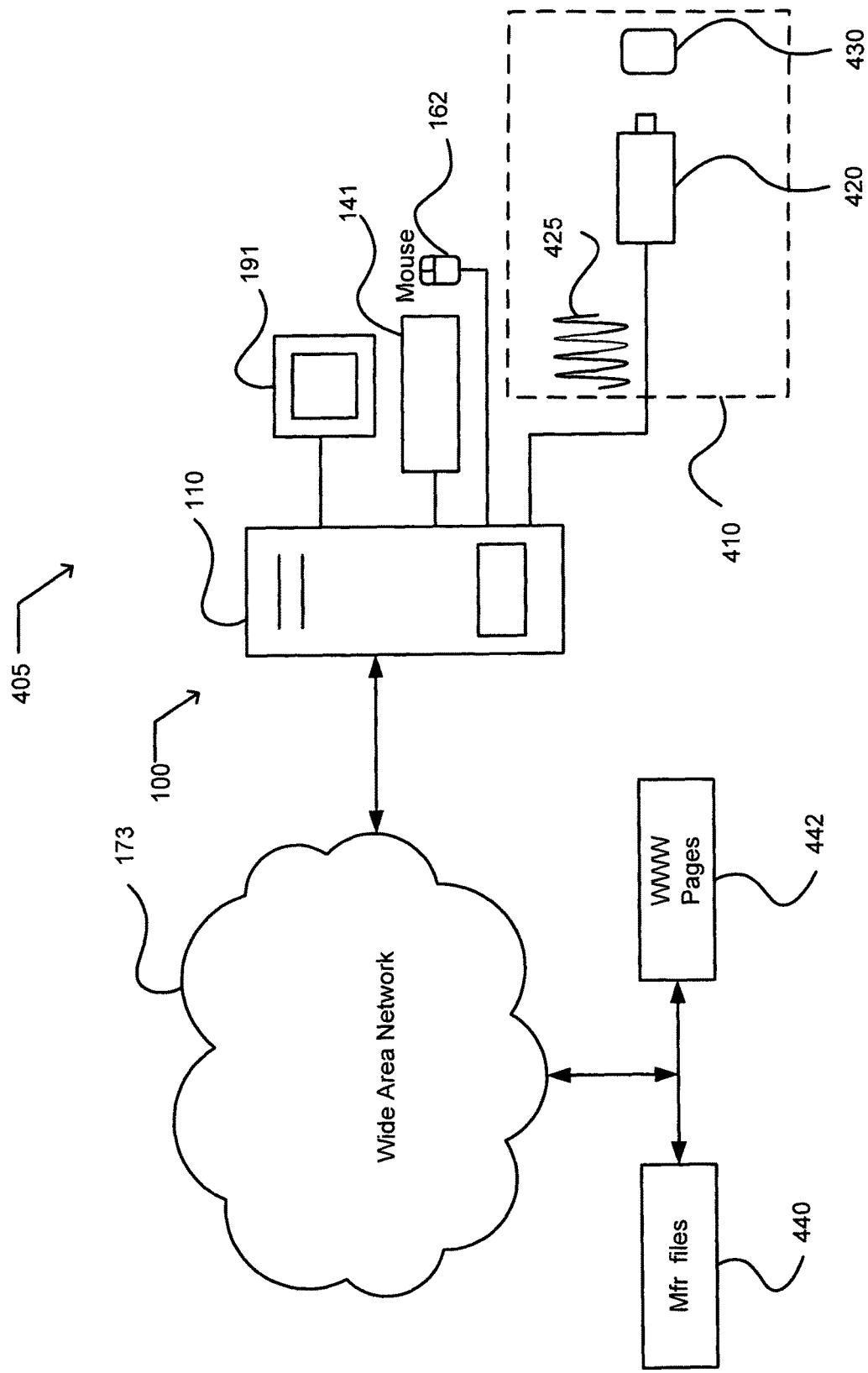
FIG. 12 illustrates an exemplary system in which embodiments may be implemented.
Figure 13:
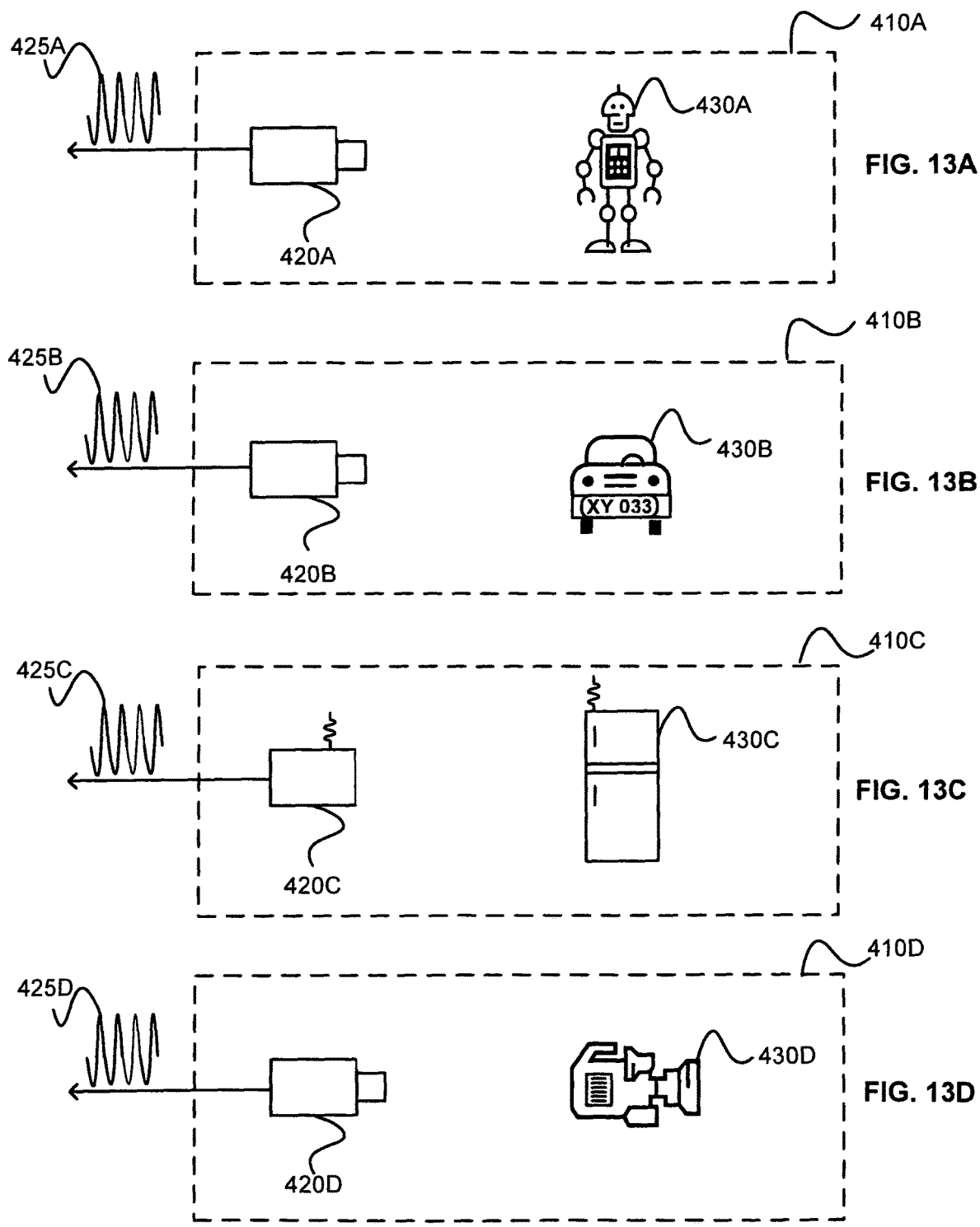
FIGS. 13A-13D illustrate certain alternative embodiments of the sensor and proximate environment of FIG. 12.

FIGS. 12 and 13 illustrate an exemplary system 405 in which embodiments may be implemented. The system 405 includes a computing system environment, illustrated as the computing system environment 100 of FIG. 1. The system 405 also includes a sensor 420 operable to provide a signal 425 indicative of an item 430 having a presence within a geographic locale 410. The computing device 110 includes an operability to receive the signal 425 indicative of an item 430. The system 405 further includes a computer program product encoding a computer program for executing on a computing device a computer process for obtaining an end user assistance, such as the computer program product 400 described in conjunction with FIG. 11. The computer process includes receiving the signal 425 indicative of an item having a presence within a geographic locale 410, and identifying the item in response to the signal indicative of an item. The computer process also includes obtaining an end user assistance corresponding to the item having a presence within a geographic locale.

In an embodiment, the geographic locale may include any environment in which one more items, such as the item 430, may have a presence. The geographic locale may include a bounded environment. For example and without limitation, in certain embodiments, the geographic locale may include a portion of a residential premises or the entire residential premises. The premises may be under control of one or more persons, such as an individual or a family. In other embodiments, the geographic locale may include a portion of a business premises or the entire business premises.

The sensor 420 may include any type of sensor suitable for generating a signal indicative of an item having a presence within its sensing and/or detection range, such as the signal 425 indicative of the item 430. By way of example and without limitation, in an embodiment, the sensor 420 may be positioned in a premises entrance such that items entering and leaving the premises have a presence at some time proximate to the sensor. In another embodiment, the sensor 420 may be physically located within the geographic locale 410. In a further embodiment, the sensor 420 may be proximate to the geographic locale 410 and operable to provide the signal 425 indicative of an item 430 having a presence within the geographic locale.

In an alternative embodiment, the system 405 may include a plurality (not shown) of the sensors 420. The plurality of sensors may include at least two sensors having different sensing parameters, each respectively operable to provide a different signal 425 indicative of the item 430. FIGS. 13A-13D illustrate certain alternative embodiments of the sensor 420 and a proximate environment, illustrated as embodiments 420A-420 D and geographic locales 410A-410D.

FIG. 13A illustrates an alternative embodiment that includes a sensor 420A located within a geographic locale 410A. The sensor 420A includes an optical sensor parameter operable to provide a signal 425A indicative of an optical aspect of an item 430A within the geographic locale, illustrated as a known shape of the robot 3CPO from the movie Star Wars. An optical aspect may include any optical aspect or aspects useful in identifying the item. FIG. 13B illustrates an alternative embodiment that includes a sensor 420B positioned with a geographic locale 410B. The sensor 420B includes an optical sensor parameter operable to provide a signal 425B indicative of an alpha/numeric aspect of the item 430B within the geographic locale, illustrated as a license plate number XY 033 of a car.

FIG. 13C illustrates an alternative embodiment that includes a sensor 420C located within a geographic locale 410C. The sensor 420C includes an identification signal sensor parameter operable to receive an electronically transmitted designator (not shown) associated with the item and provide a signal 425C indicative of item. The item is illustrated as a refrigerator 430C with an associated electronically transmitted designator. For example, the electronically transmitted designator may be transmitted by an RFID device. FIG. 13D illustrates an alternative embodiment that includes a sensor 420D positioned within a geographic locale 410D. The sensor 420D includes an optical code reader parameter operable to provide a signal 425D indicative of an optically readable aspect or aspects useful in identifying the item 430D. The item 430D is illustrated as video camera with an optically readable bar code. The signals 425A-425D are received by the computing device 110 of computing system environment 100 of FIG. 12.

Figure 14:
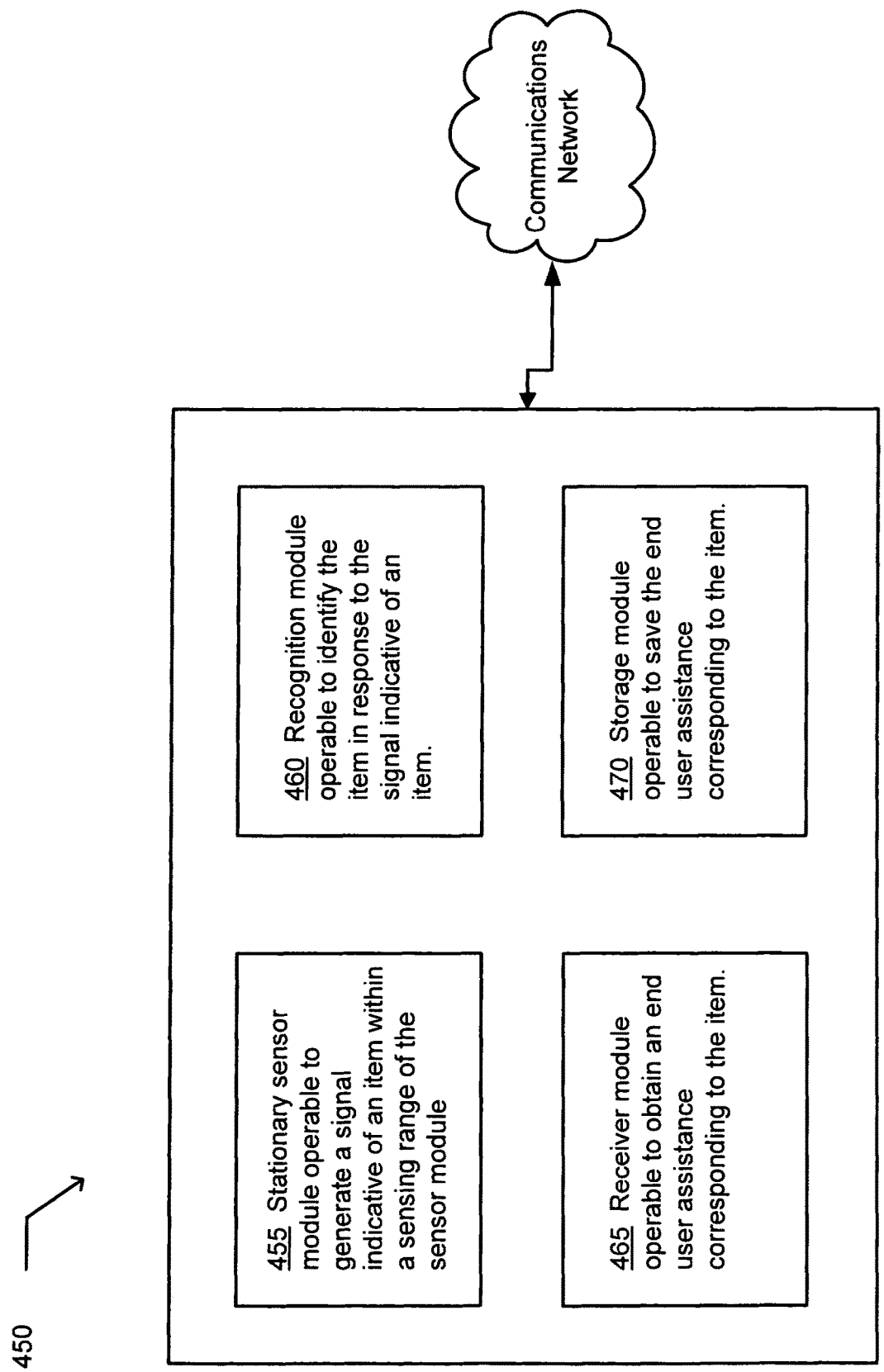
FIG. 14 illustrates an exemplary system in which embodiments may be implemented.

FIG. 14 illustrates an exemplary system 450 in which embodiments may be implemented. The system 450 includes a stationary sensor module 455 operable to generate a signal indicative of an item within a sensing range of the sensor module. In an embodiment, the stationary sensor module 455 is placed in a location selected to sense one or more items that may be under control of a user over time. While the stationary sensor module 455 may be relatively permanently located in an embodiment, another embodiment provides the stationary sensor module 455 being relatively moveable within a premises. The system 450 also includes a recognition module 460 operable to identify the item in response to the signal indicative of an item, and a receiver module 465 operable to obtain an end user assistance corresponding to the identified item. In an alternative embodiment, the system 450 may include a storage module 470 operable to save the end user assistance corresponding to the item.

Figure 15:
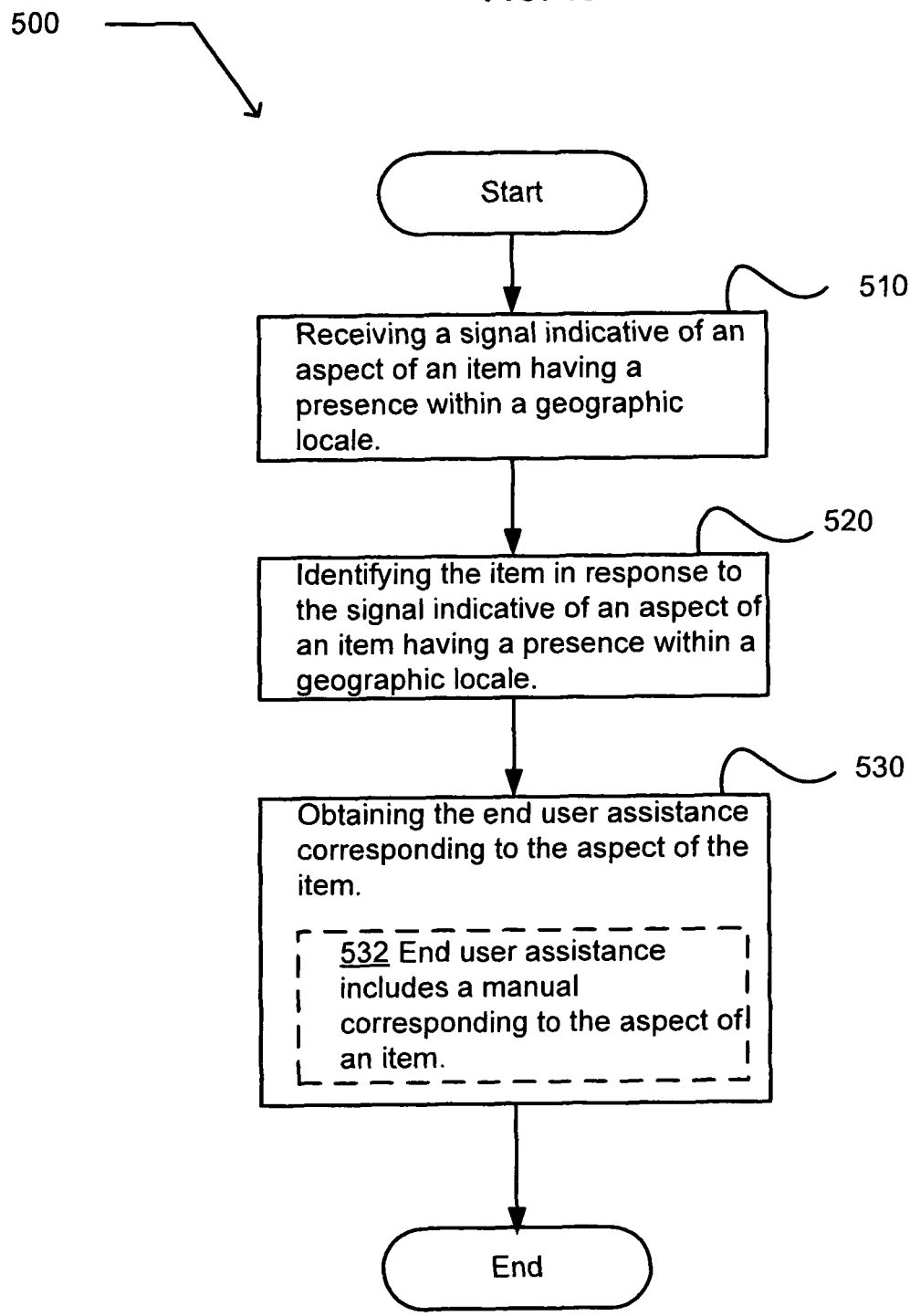
FIG. 15 illustrates an operational flow representing exemplary operations that obtain an assistance corresponding to an item having presence within a geographic locale.

FIG. 15 illustrates an operational flow 500 representing exemplary operations that obtain an assistance corresponding to an item having presence within a geographic locale. After a start operation, the operational flow 500 moves to an acquisition operation 510, wherein a signal indicative of an aspect of an item having a presence within a geographic locale is received, such as the signal 425 indicative of the item 420 with the geographic locale 410 of FIG. 12. At a recognition operation 520, the item is identified in response to the signal indicative of an aspect of an item having a presence within a geographic locale. Operational flow 500 moves to a reception operation 530, where the end user assistance corresponding to the aspect of the item is obtained. In an alternative embodiment, the operation 530 may include an operation 532, wherein the end user assistance corresponding to an aspect of an item includes a manual corresponding to the aspect of an item. In an alternative embodiment, the reception operation may include an operation (not shown) wherein a manual corresponding to the aspect of the item is obtained. The manual may include any content associated with the item, such as assistance information, instructions, and specifications. The operational flow 500 then moves to an end operation.

Figure 16:
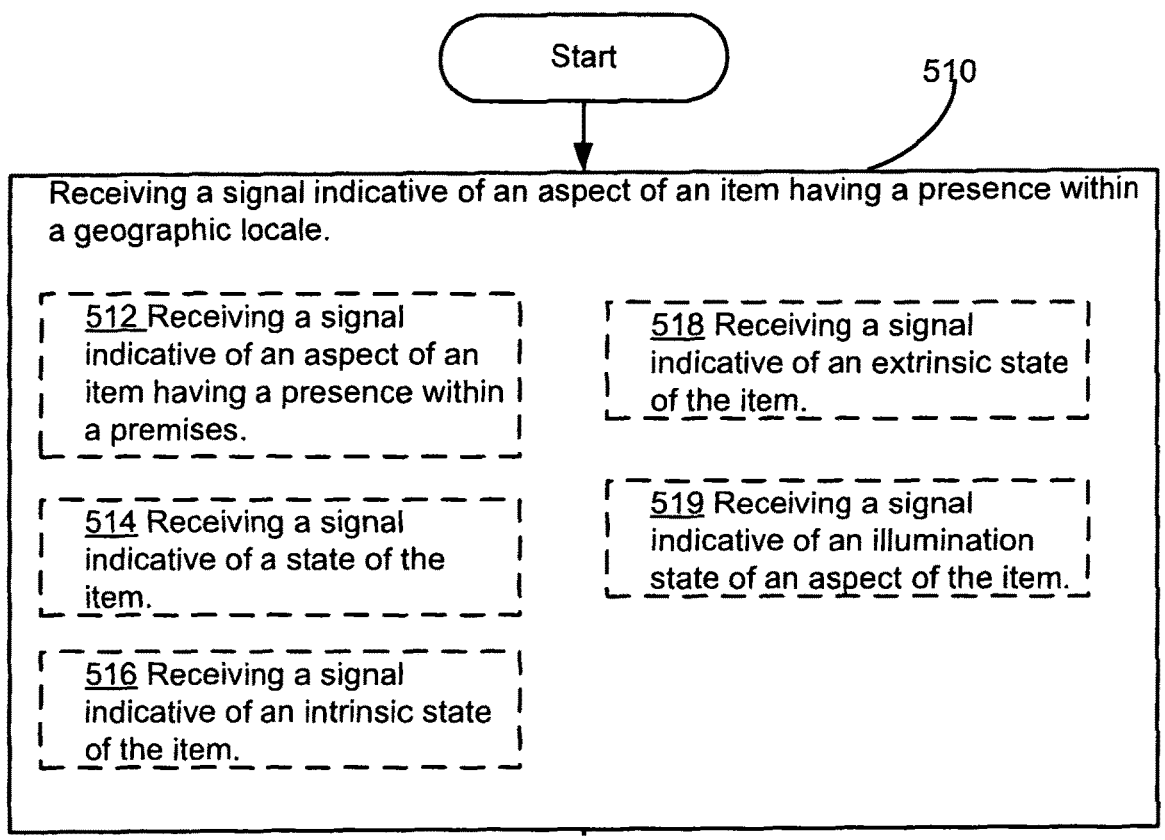
FIG. 16 illustrates an alternative embodiment of the exemplary operational flow of FIG. 15.

FIG. 16 illustrates an alternative embodiment of the exemplary operational flow 500 of FIG. 15. FIG. 16 illustrates an embodiment where the reception operation 510 may include at least one additional operation. The additional operations may include an operation 512, an operation 514, an operation 516, an operation 518, and an operation 519. At operation 512, a signal indicative of an aspect of an item having a presence within a premises is received. At operation 514, a signal indicative of a state of the item is received. At the operation 516, a signal indicative of an intrinsic state of the item is received. At the operation 518, a signal indicative of an extrinsic state of the item is received. At the operation 519, a signal indicative of an illumination state of an aspect of the item is received.

Figure 17:
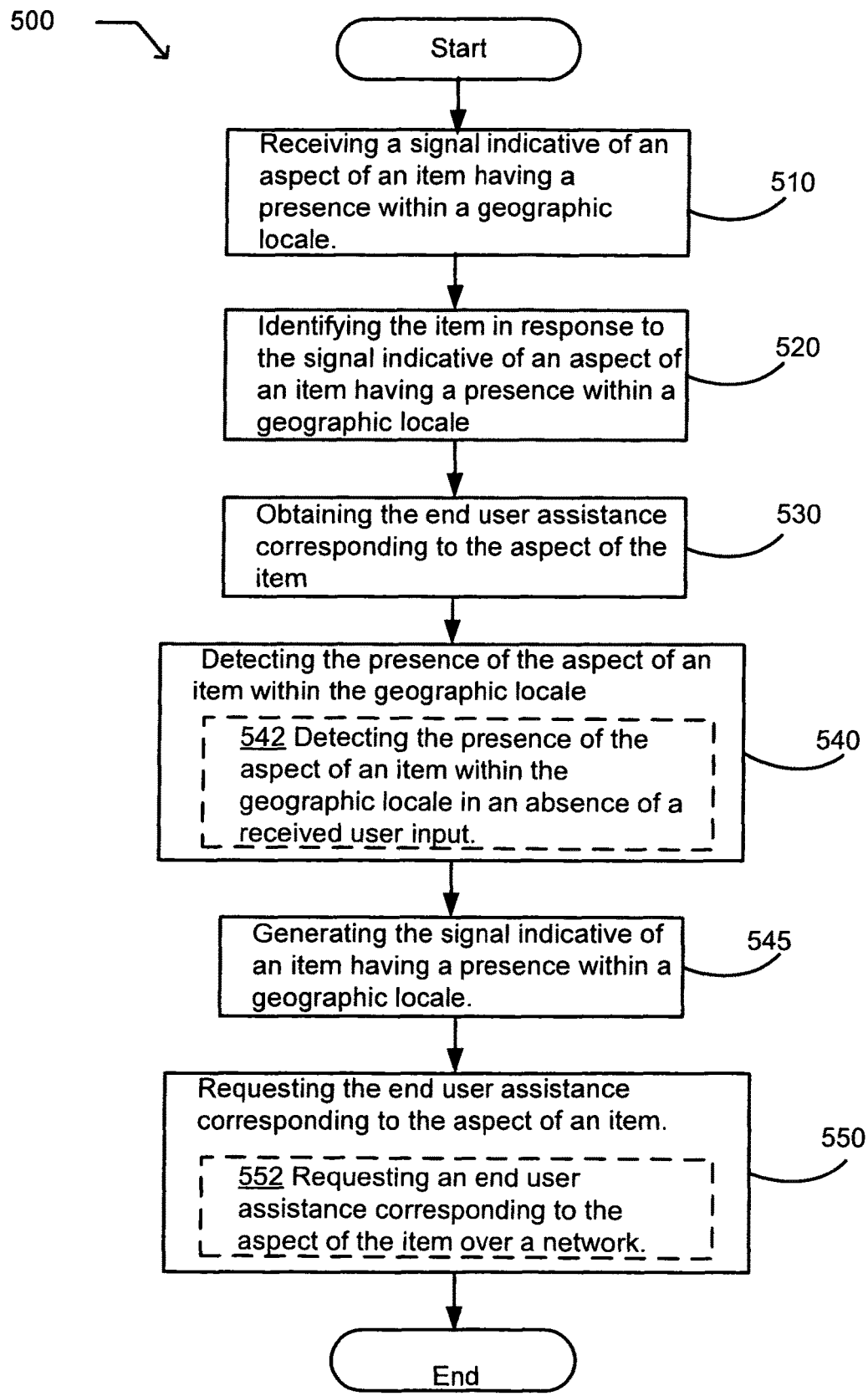
FIG. 17 illustrates another alternative embodiment of the exemplary operational flow of FIG. 15.

FIG. 17 illustrates an alternative embodiment of the exemplary operational flow 500 of FIG. 15. FIG. 17 illustrates an embodiment where the operational flow 500 may include a discovery operation 540, a generating operation 545, and a requesting operation 550. The discovery operation 540 includes detecting the presence of the aspect of an item within the geographic locale. In a further alternative embodiment, the discovery operation 540 may include an operation 542. At operation 542, the presence of the aspect of an item within the geographic locale is detected in an absence of a received user input. At the operation 545, the signal indicative of an item having a presence within a geographic locale is generated. At the request an operation 550, the end user assistance corresponding to the aspect of an item is requested. In a further alternative embodiment, the request operation 550 may include an operation 552. At operation 552, an end user assistance corresponding to the aspect of the item is requested over a network. The requesting an end user assistance over a network may include requesting an end user assistance from a server. The operational flow 500 may in another embodiment include a providing operation (not shown). The providing operation includes providing the end user assistance corresponding to the aspect of the item.

FIG. 18 illustrates a partial view of an exemplary computer program product 560 that includes a computer program 564 for executing a computer process on a computing device. An embodiment of the exemplary computer program product 560 may be provided using a computer-readable medium 562, and includes computer executable instructions. The computer executable instructions encode the computer program 564 for executing on a computing device a process that includes receiving a signal indicative of an aspect of an item having a presence within a geographic locale, and identifying the item in response to the signal indicative of an aspect of an item having a presence within a geographic locale. The computer program 564 also includes obtaining an end user assistance corresponding to the aspect of the item, and saving the end user assistance corresponding to the aspect of the item. In certain embodiments, the computer program 564 may also include at least one additional process, such as a process 568, a process 570, a process 572, and a process 574. The process 568 includes detecting a presence of the item within a geographic locale. The process 570 includes generating a signal indicative of the aspect of an item. The process 572 includes requesting the end user assistance corresponding to aspect of the item. The process 574 includes providing the end user assistance corresponding to the aspect of the item. The computer-readable medium 562 may include a computer storage medium, which may be carried by a computer-readable carrier (not shown). The computer-readable medium 562 may include a communications medium (not shown).

Figure 19:
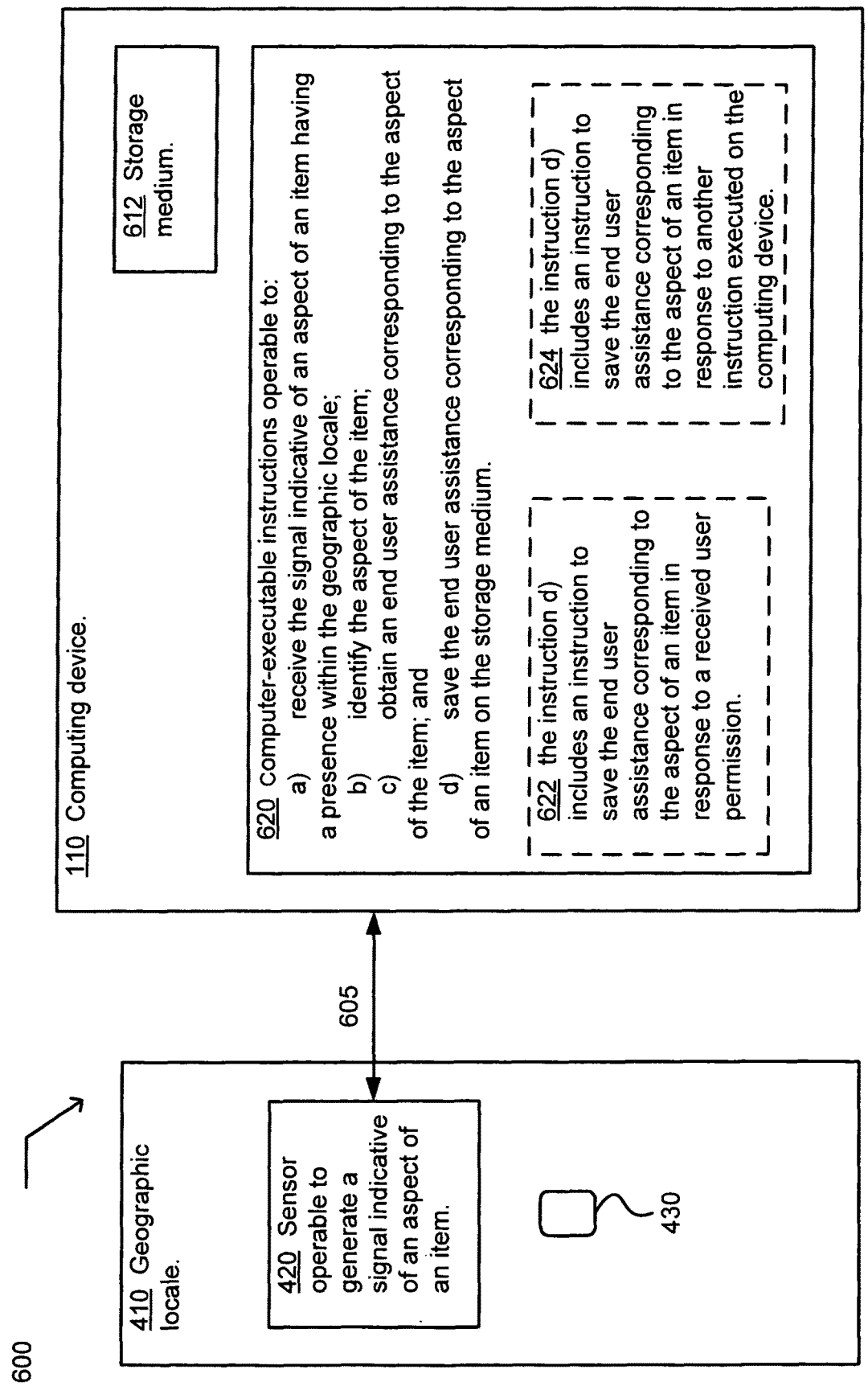
FIG. 19 illustrates an exemplary system in which embodiments may be implemented.

FIG. 19 illustrates an exemplary system 600 in which embodiments may be implemented. The system 600 includes a computing system environment that includes a computing device, illustrated as the computing device 110 of FIG. 1. The system 600 also includes the sensor 420 operable to generate a signal (not shown) indicative of an aspect of the item 430 having a presence within the geographic locale 410. The computing device 110 includes a storage medium 612, and is operable to receive the signal indicative of an aspect of an item through a coupling 605 between the sensor 420 and the computing device 110. The storage medium 612 may be any computer storage media. The system 600 further includes computer executable instructions 620 that when executed on the computing device causes the computing device to receive the signal indicative of an aspect of an item having a presence within the geographic locale, and identify the aspect of the item. The instructions further obtain an end user assistance corresponding to the aspect of the item, and save the end user assistance corresponding to the aspect of an item on the storage medium 612. The computer executable instructions 620 may include at least one additional operation. At operation 622, the instruction d) to save the end user assistance corresponding to the aspect of an item includes an instruction to save the end user assistance corresponding to the aspect of the item in response to a received user permission. At operation 624, the instruction d) to save the end user assistance corresponding to the aspect of an item includes an instruction to save the end user assistance corresponding to the aspect of an item in response to another instruction executed on the computing device 110.

Figure 20:
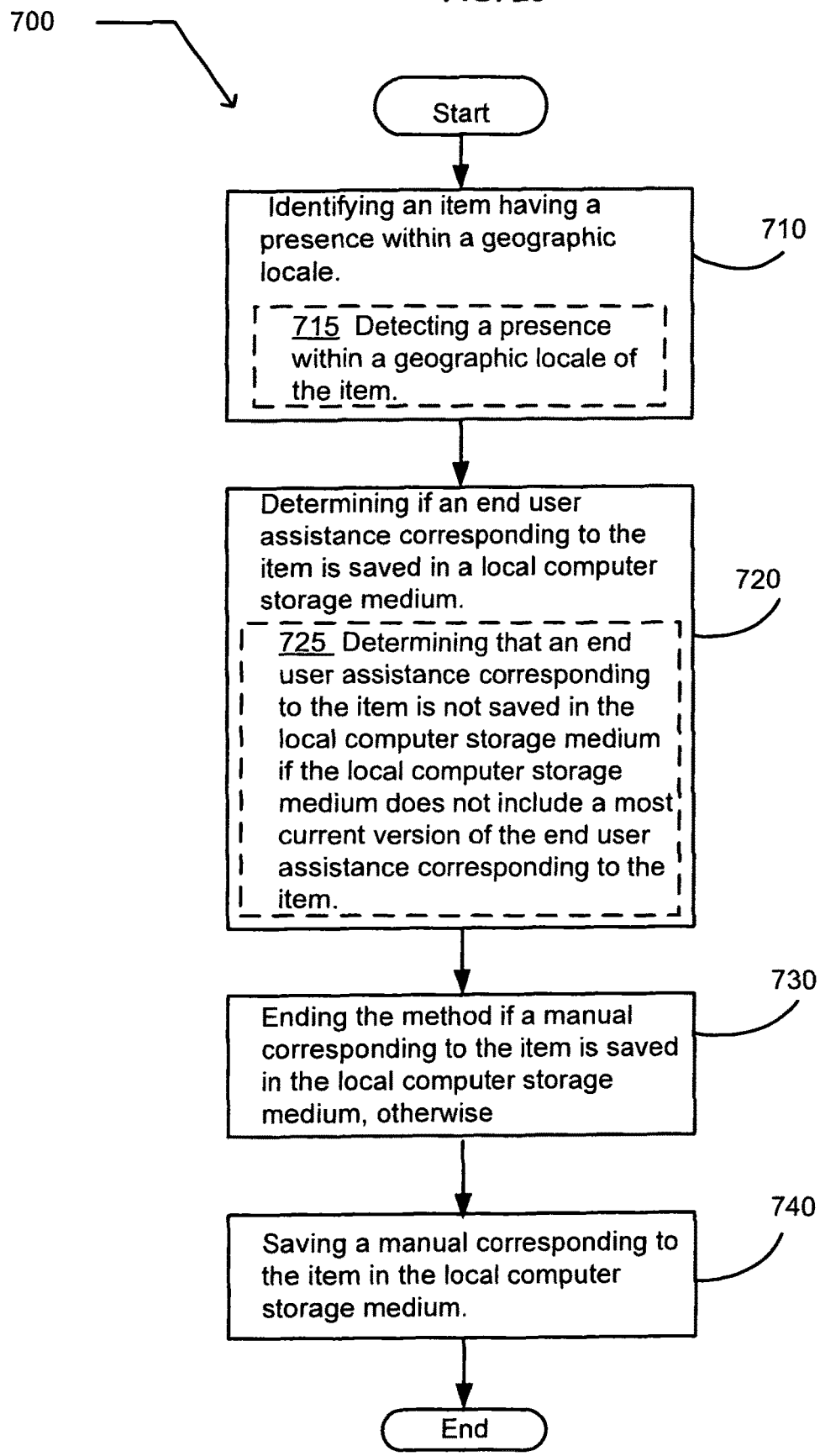
FIG. 20 illustrates an operational flow representing an exemplary operation that saves an end user assistance corresponding to an item having presence within a geographic locale.

FIG. 20 illustrates an operational flow 700 representing exemplary operations that save an end user assistance corresponding to an item having presence within a geographic locale. After a start operation, the operational flow 700 moves to a recognition operation 710 wherein an item having a presence within a geographic locale is identified. At discovery operation 720, a determination is made if an end user assistance corresponding to the item is saved in a computer storage medium local to the geographic locale. At termination operation 730, the operational flow 700 is ended if an end user assistance corresponding to the item is saved in the local computer storage medium. Otherwise, the operation flow 700 moves to retention operation 740, wherein an end user assistance corresponding to the item is saved in the local computer storage medium. The operational flow 700 then moves to an end operation.

In an alternative embodiment, the recognition operation 710 may include a sensing operation 715. At operation 715, a presence of the item within the geographic locale is detected. In another embodiment, the discovery operation 720 may include an operation 725. At the operation 725, a determination is made that an end user assistance corresponding to the item is not saved in the local computer storage medium if the local computer storage medium does not include a most current version of the end user assistance corresponding to the item.

Figure 21:
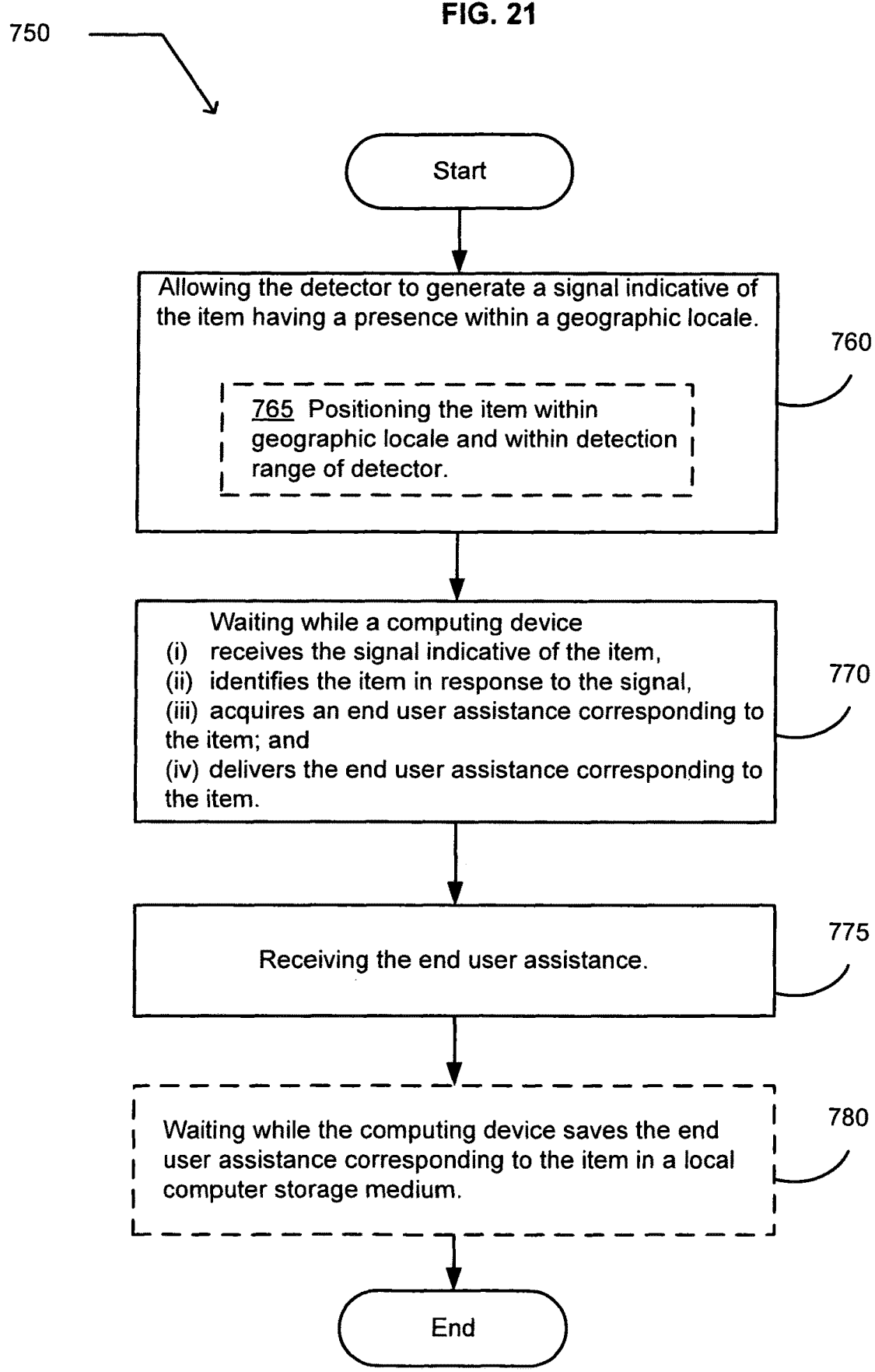
FIG. 21 illustrates an operational flow representing exemplary operations implemented in a computing device for receiving an end user assistance corresponding to an item having presence within a geographic locale.

FIG. 21 illustrates an operational flow 750 representing exemplary operations implemented in a computing device for receiving an end user assistance corresponding to an item having presence within a geographic locale. After a start operation, the operational flow 750 moves to a discovery operation 760 wherein a detector is allowed to generate a signal indicative of an item having a presence within a geographic locale. At operation 770, the operational flow 750 includes waiting while a computing system receives the signal indicative of the item, identifies the item in response to the signal, acquiring an end user assistance corresponding to the item, and delivers the end user assistance corresponding to the item. At operation 775, the end user assistance is received. The operational flow 750 then moves to an end operation. In an alternative embodiment, the discovery operation 760 may include an additional operation, such as an operation 765. At the operation 765, the item and the detector are positioned within a detection range that allows the detector to generate a signal indicative of the item. In a further alternative embodiment, the operational flow 750 may include an additional operation 780. The operation 780 includes a waiting while the computing device saves the end user assistance corresponding to the item in a local computer storage medium.

Figure 22:
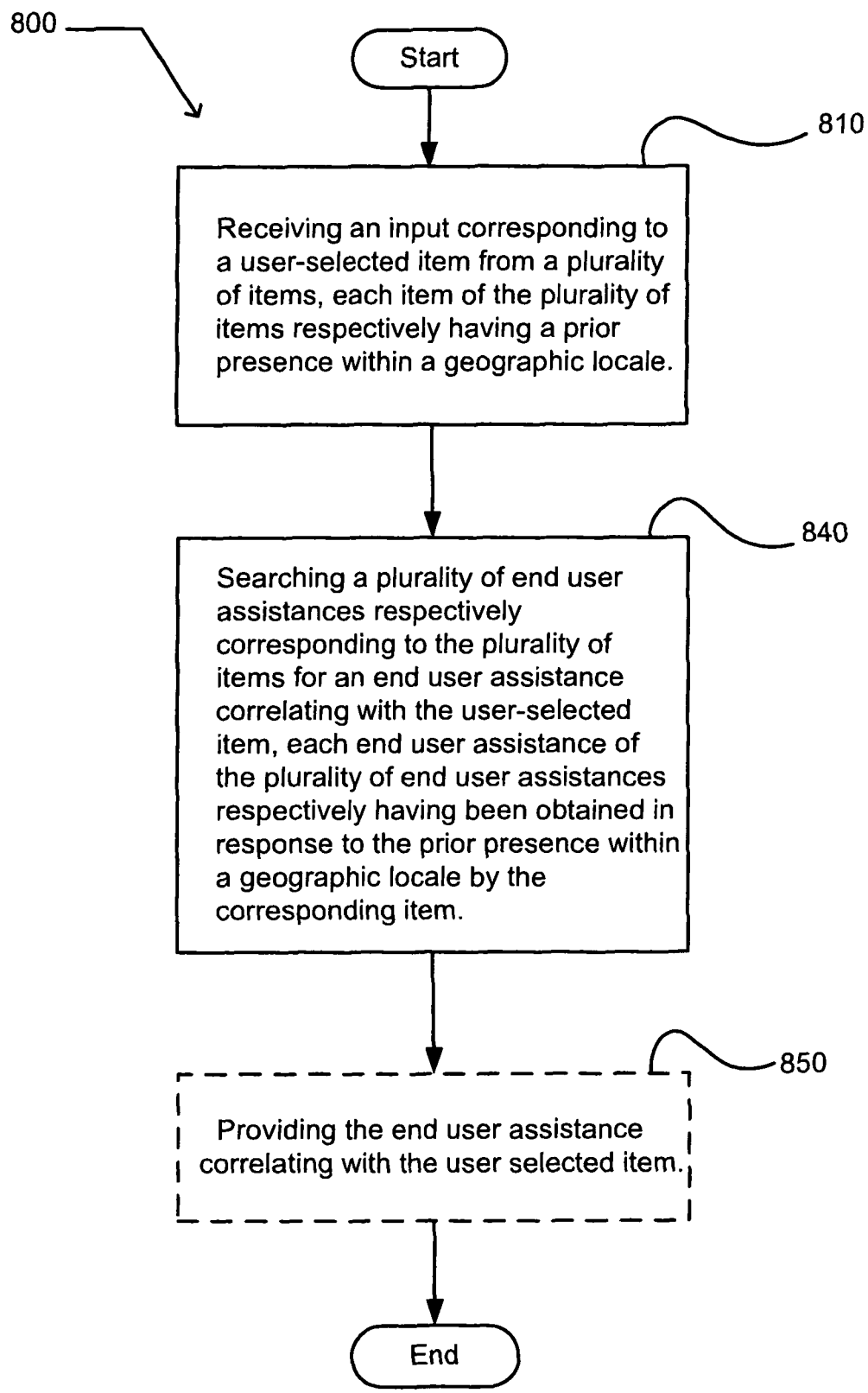
FIG. 22 illustrates an operational flow representing exemplary operations implemented in a computing device that searches a plurality of end user assistances for an end user assistance.

FIG. 22 illustrates an operational flow 800 representing exemplary operations implemented in a computing device that searches a plurality of end user assistances for an end user assistance. After a start operation, the operational flow moves to a user interaction operation 810. At the operation 810, an input is received corresponding to a user-selected item from a plurality of items, each item of the plurality of items respectively having a prior presence within a geographic locale. At a seeking operation 840, a plurality of end user assistances respectively corresponding to the plurality of items are searched for an end user assistance correlating with the user-selected item. Each end user assistance of the plurality of end user assistances respectively having been obtained in response to the prior presence within a geographic locale of the corresponding item. In an alternative embodiment, the process 800 may include additional operations, such as a broadcast operation 850. At the operation 850, the end user assistance correlating with the user-selected item is provided. The operational flow 800 then moves to an end operation.

Figure 23:
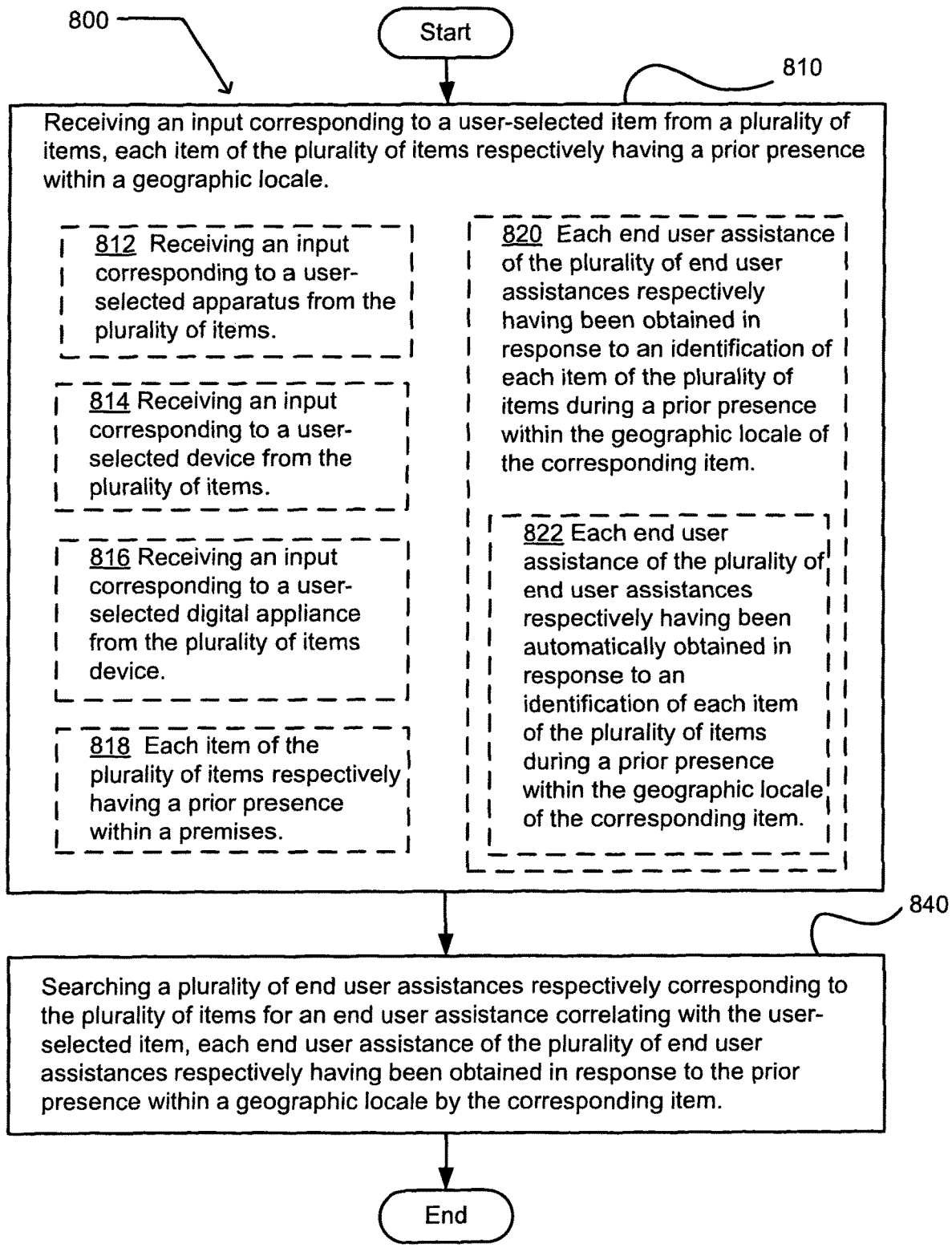
FIG. 23 illustrates an alternative embodiment of the exemplary operational flow of FIG. 22.

FIG. 23 illustrates an alternative embodiment of the exemplary operational flow 800 of FIG. 22. FIG. 23 illustrates an embodiment where the user interaction operation 810 may include at least one additional operation. Additional operations may include an operation 812, an operation 814, an operation 816, an operation 818, and an operation 820. At the operation 812, an input corresponding to a user-selected apparatus from the plurality of items is received. At the operation 814, an input corresponding to a user-selected device from the plurality of items is received. At the operation 816, an input is received corresponding to a user-selected digital appliance from the plurality of items device. At the operation 818, each item of the plurality of items respectively has a prior presence within a premises. At the operation 820, each end user assistance of the plurality of end user assistances respectively has been obtained in response to an identification of each item of the plurality of items during a prior presence within the geographic locale of the corresponding item. The operation 820 may include one or more additional operations, such as the operation 822. At the operation 822, each end user assistance of the plurality of end user assistances respectively has been automatically obtained in response to an identification of each item of the plurality of items during a prior presence within the geographic locale of the corresponding item.

Figure 24:
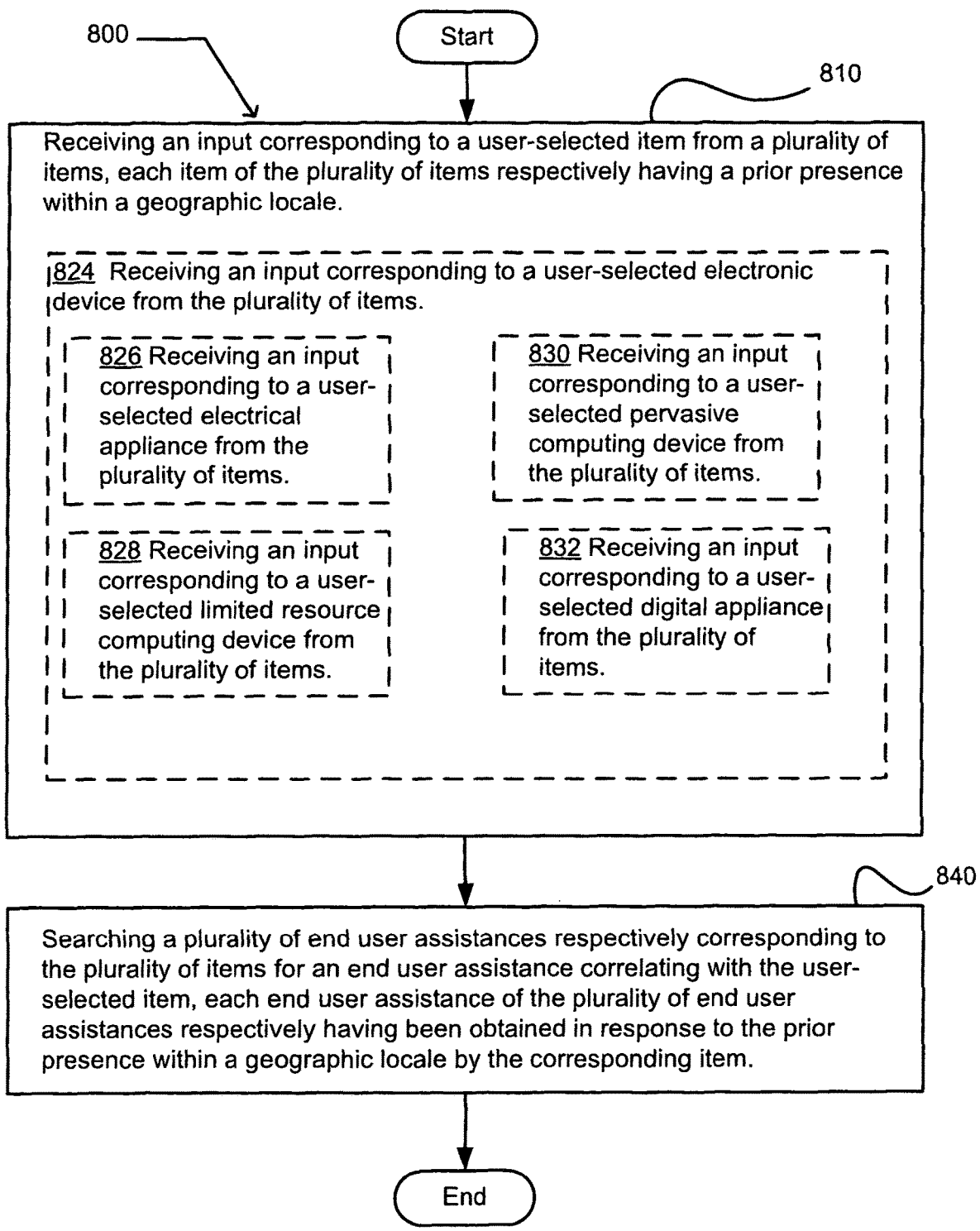
FIG. 24 illustrates another alternative embodiment of the exemplary operational flow of FIG. 22.

FIG. 24 illustrates an alternative embodiment of the exemplary operational flow 800 of FIG. 22. FIG. 24 illustrates an embodiment where the user interaction operation 810 may include at least one additional operation. Additional operations may include an operation 824. At the operation 824, an input is received corresponding to a user-selected electronic device from the plurality of items. The operation 820 may include at least one additional operation. Additional operations may include an operation 826, an operation 828, an operation 830, and an operation 832. At the operation 826, an input is received corresponding to the user-selected electrical appliance from the plurality of items. At the operation 828 an input is received corresponding to a user-selected limited resource computing device from the plurality of items. At the operation 830, an input is received corresponding to a user-selected pervasive computing device from the plurality of items. At the operation 832, an input is received corresponding to a user-selected digital appliance from a plurality of items.

Figure 25:
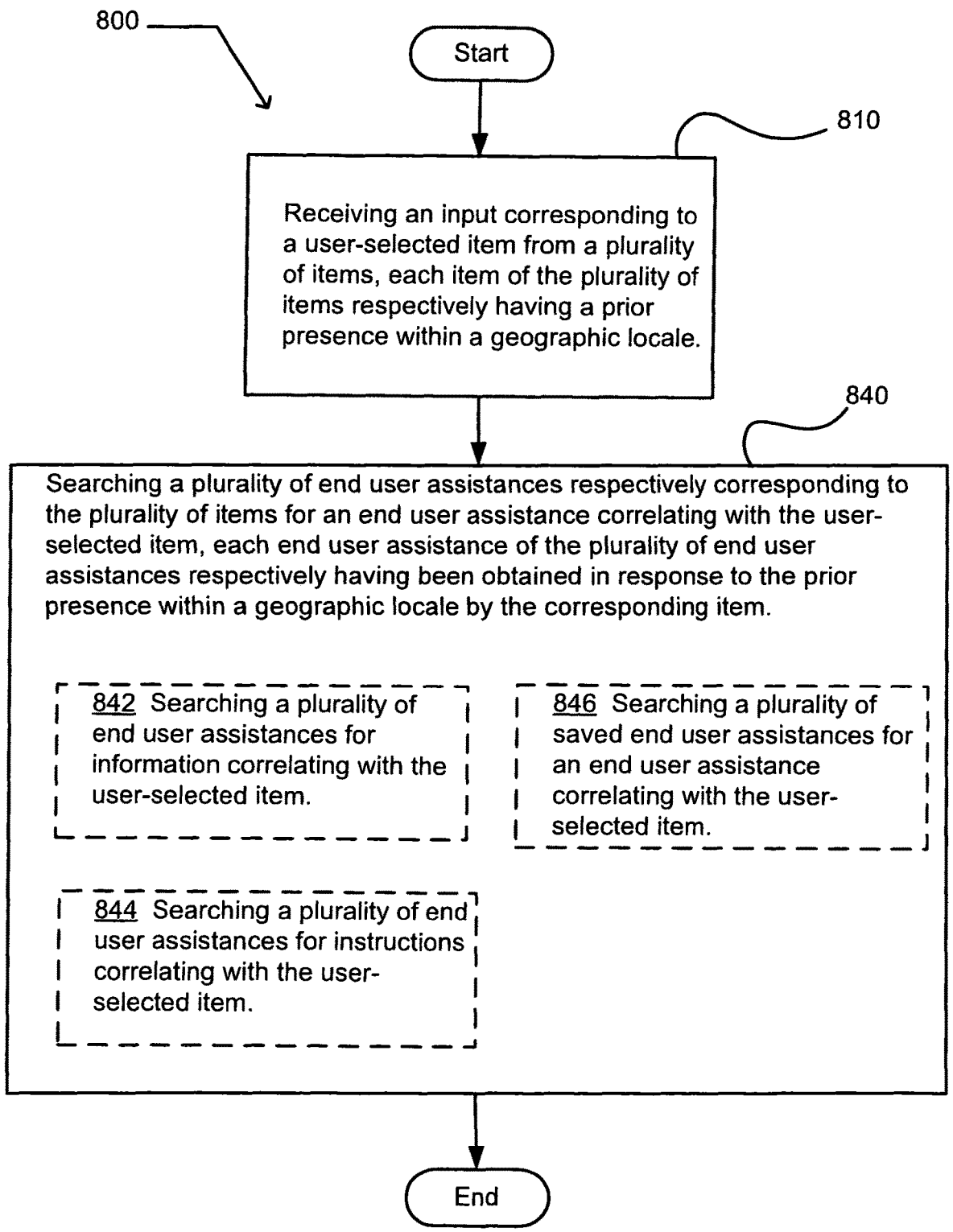
FIG. 25 illustrates a further alternative embodiment of the exemplary operational flow of FIG. 22.

FIG. 25 illustrates an alternative embodiment of the exemplary operational flow 800 of FIG. 22. FIG. 25 illustrates an embodiment where the seeking operation 840 may include at least one additional operation. Additional operations may include an operation 842, an operation 844, and an operation 846. At the operation 842, a plurality of end user assistances are searched for information correlating with the user-selected item. At the operation 844, a plurality of end user assistances are searched for instructions correlating with the user-selected item. At the operation 846, a plurality of saved end user assistances are searched for an end user assistance correlating with the user-selected item.

FIG. 26 illustrates a partial view of an exemplary computer program product 870 that includes a computer program 874 for executing a computer process on a computing device. An embodiment of the exemplary computer program product 870 may be provided using the computer-readable medium 872, and includes computer executable instructions. The computer executable instructions encode the computer program 874 for executing on a computer system a process. The process includes receiving an input corresponding to a user-selected item from a plurality of items. Each item of the plurality of items respectively having a prior presence within a geographic locale. The process further includes searching a plurality of end user assistances respectively corresponding to the plurality of items for an end user assistance correlating with the user-selected item. Each end user assistance of the plurality of end user assistances respectively having been obtained in response to the prior presence within a geographic locale of the corresponding item. In an alternative embodiment, the process may include at least one additional instruction. Additional instructions may include an instruction 876, providing the end user assistance correlating with the user-selected item. The computer-readable medium 872 may include a computer storage medium, which may be carried by a computer-readable carrier (not shown). The computer-readable medium 872 may include a communications medium (not shown).

Figure 27:
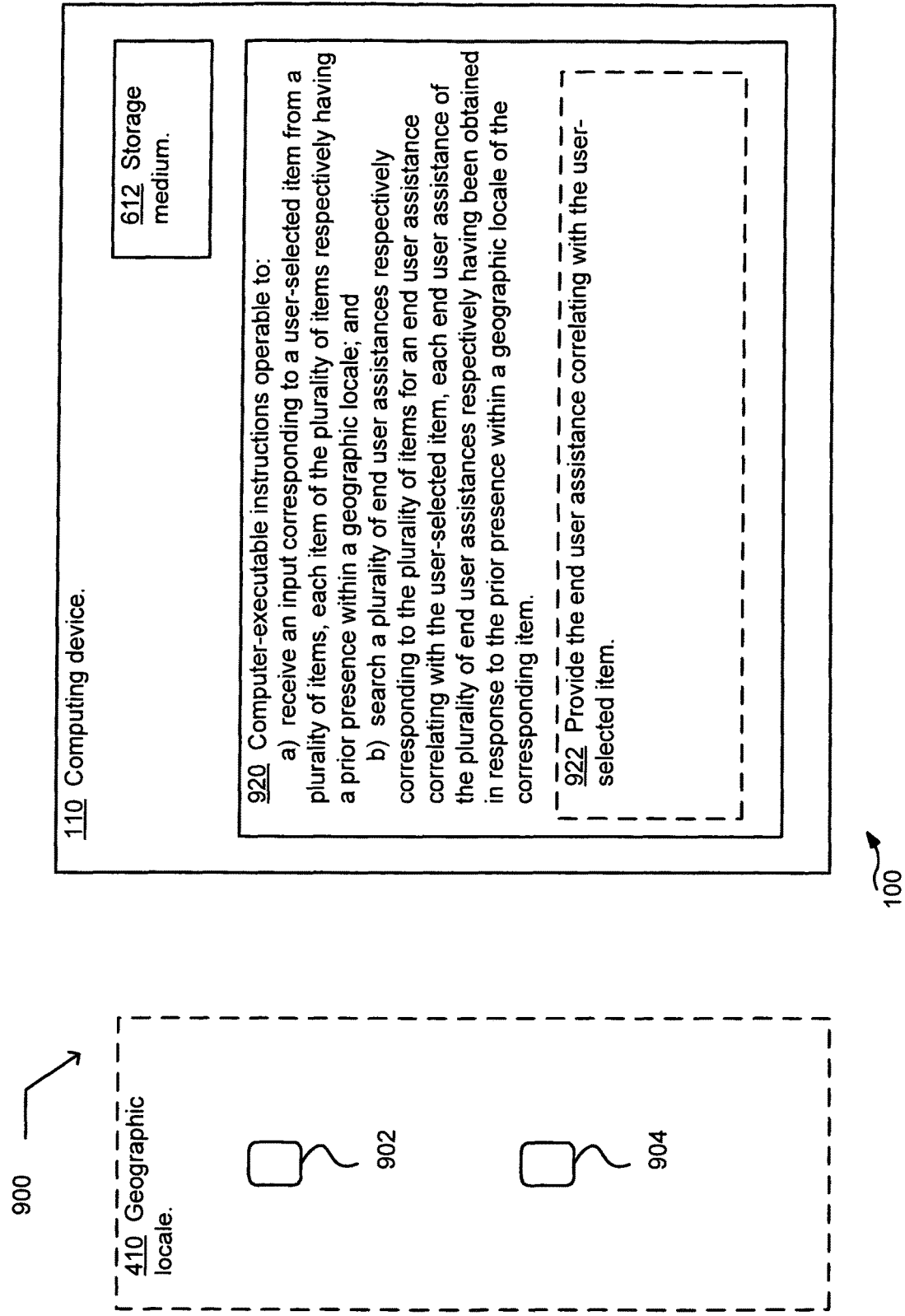
FIG. 27 illustrates an exemplary system in which embodiments may be implemented.

FIG. 27 illustrates an exemplary system 900 in which embodiments may be implemented. The system 900 includes a computing system environment, illustrated as the computing system environment 100 and the computing device 110 of FIG. 2. A plurality of items is illustrated as an item 902 and an item 904 located within a geographic locale, illustrated as the geographic locale 410 of FIGS. 12 and 13. The system 900 further includes a computer program product (not shown) encoding a computer program for executing on the computing device 110 a computer process for obtaining an end user assistance correlating with the user-selected item. The computer process includes instructions 920 that when executed on the computing device cause the computing device to receive an input corresponding to a user-selected item from a plurality of items. Each item of the plurality of items respectively having a prior presence within a geographic locale. The instructions further cause the computing device to search a plurality of end user assistances respectively corresponding to the plurality of items for an end user assistance correlating with the user-selected item. Each end user assistance of the plurality of end user assistances respectively having been obtained in response to the prior presence of the corresponding item within the geographic locale. In an alternative embodiment, the instructions may include an instruction 922 that further causes the computing device to provide the end user assistance correlating with the user-selected item.

Figure 28:
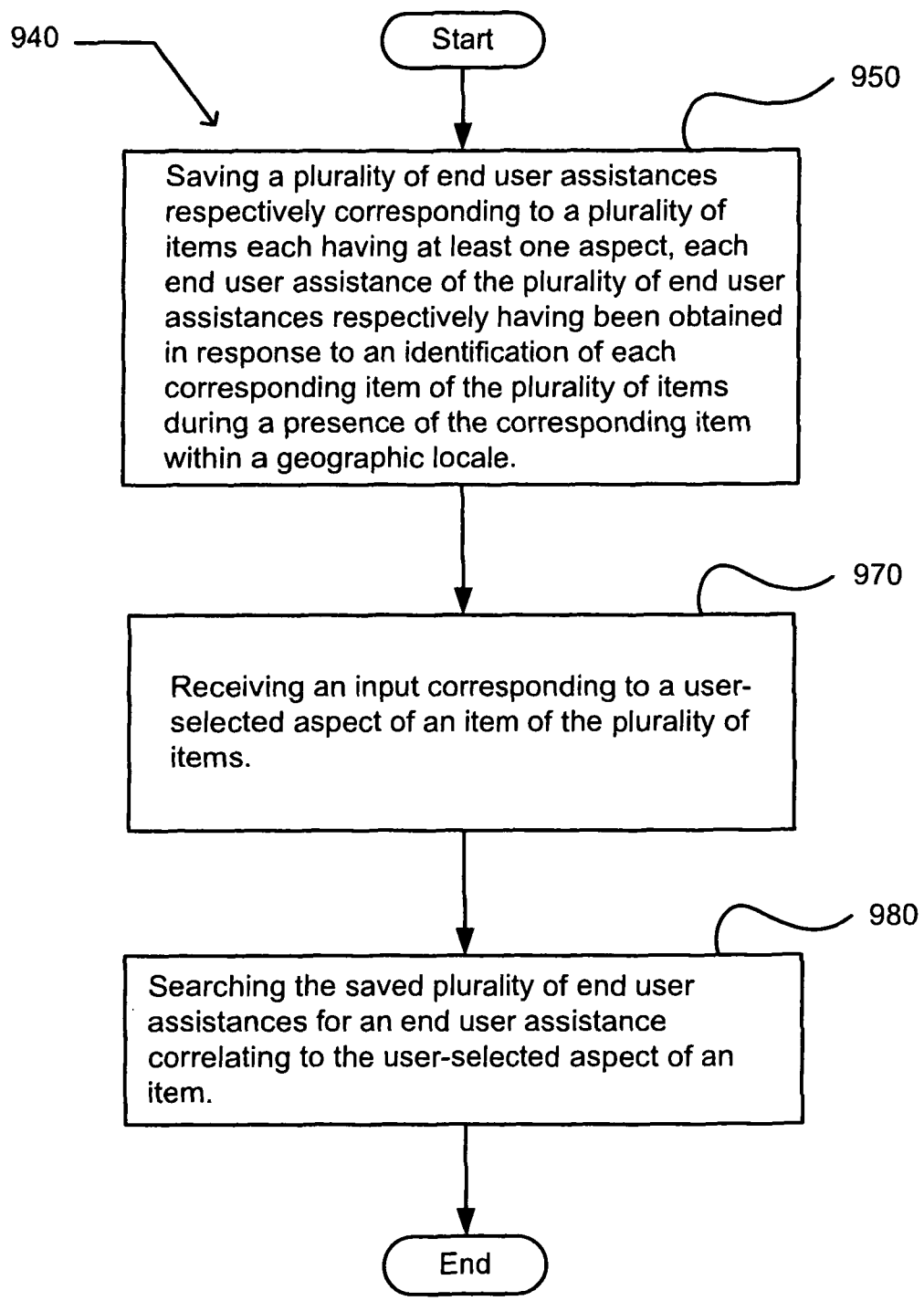
FIG. 28 illustrates an operational flow representing exemplary operations that search for a saved end user assistance.

FIG. 28 illustrates an operational flow 940 representing exemplary operations that searches for a saved end user assistance. After a start operation, the operational flow 940 moves to a storage operation 950. At the storage operation 950, a plurality of end user assistances are saved. The end user assistances respectively correspond to a plurality of items each having at least one aspect. Each end user assistance of the plurality of end user assistances respectively having been obtained in response to an identification of each corresponding item of the plurality of items during a presence within a geographic locale of the corresponding item. At an acquire operation 970, an input is received corresponding to a user-selected aspect of an item of the plurality of items. At a locate operation 980, the saved plurality of end user assistances is searched for an end end user assistance correlating to the user-selected aspect of an item. The operational flow 940 then moves to an end operation.

Figure 29:
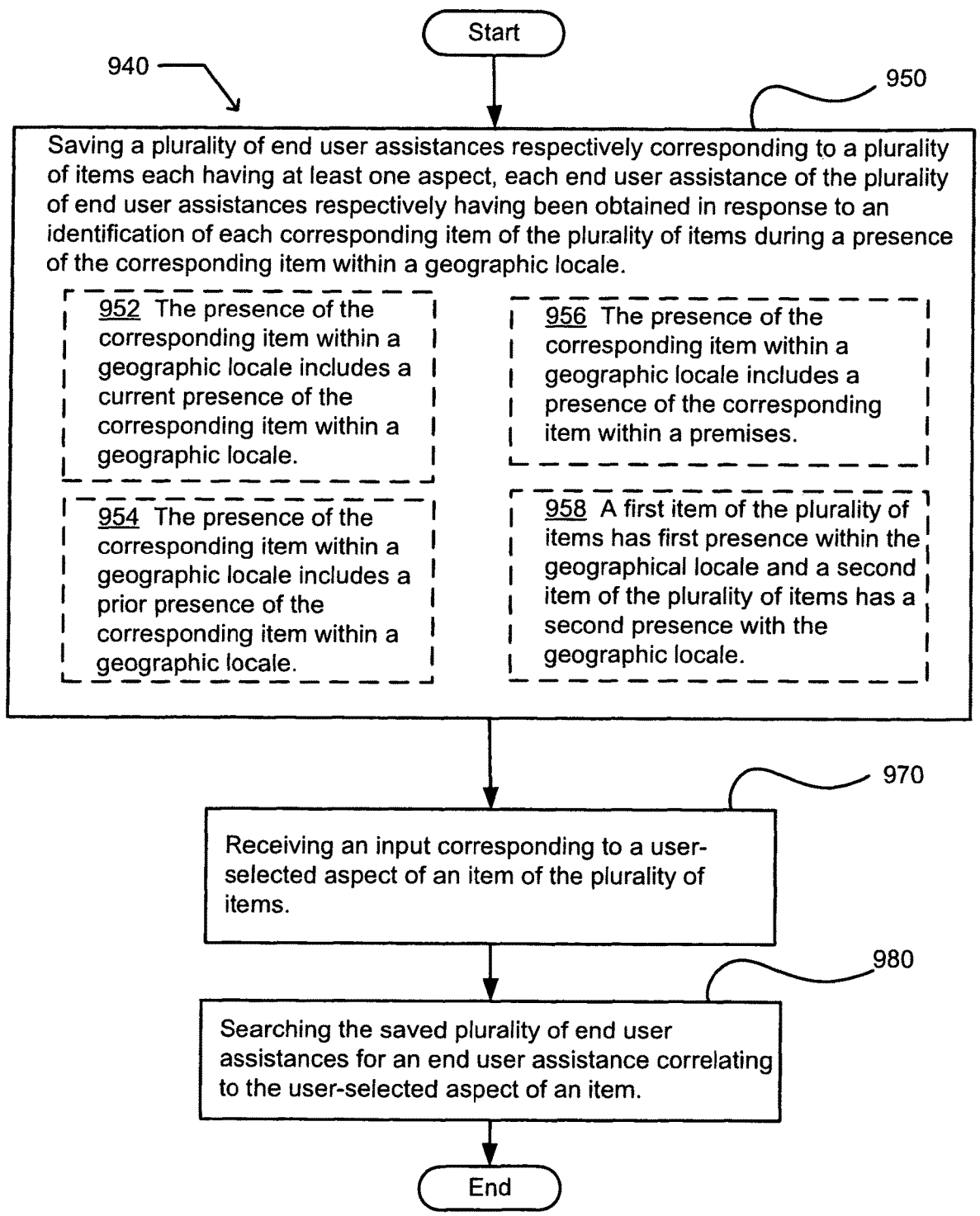
FIG. 29 illustrates a further alternative embodiment of the exemplary operational flow of FIG. 28.

FIG. 29 illustrates a further alternative embodiment of the exemplary operational flow 940 of FIG. 28. FIG. 29 illustrates an embodiment where the storage operation 950 may include at least one additional operation. Additional operations may include an operation 952, an operation 954, an operation 956, and an operation 958. At the operation 952, the presence of the corresponding item within a geographic locale includes a current presence of the corresponding item within a geographic locale. At the operation 954, the presence of the corresponding item within a geographic locale includes a prior presence of the corresponding item within geographic locale. At the operation 956, the presence of the corresponding item within a geographic locale includes a presence of the corresponding item within a premises. At the operation 958, a first item of the plurality of items has first presence within the geographical locale and a second item of the plurality of items has a second presence with the geographic locale.

Figure 30:
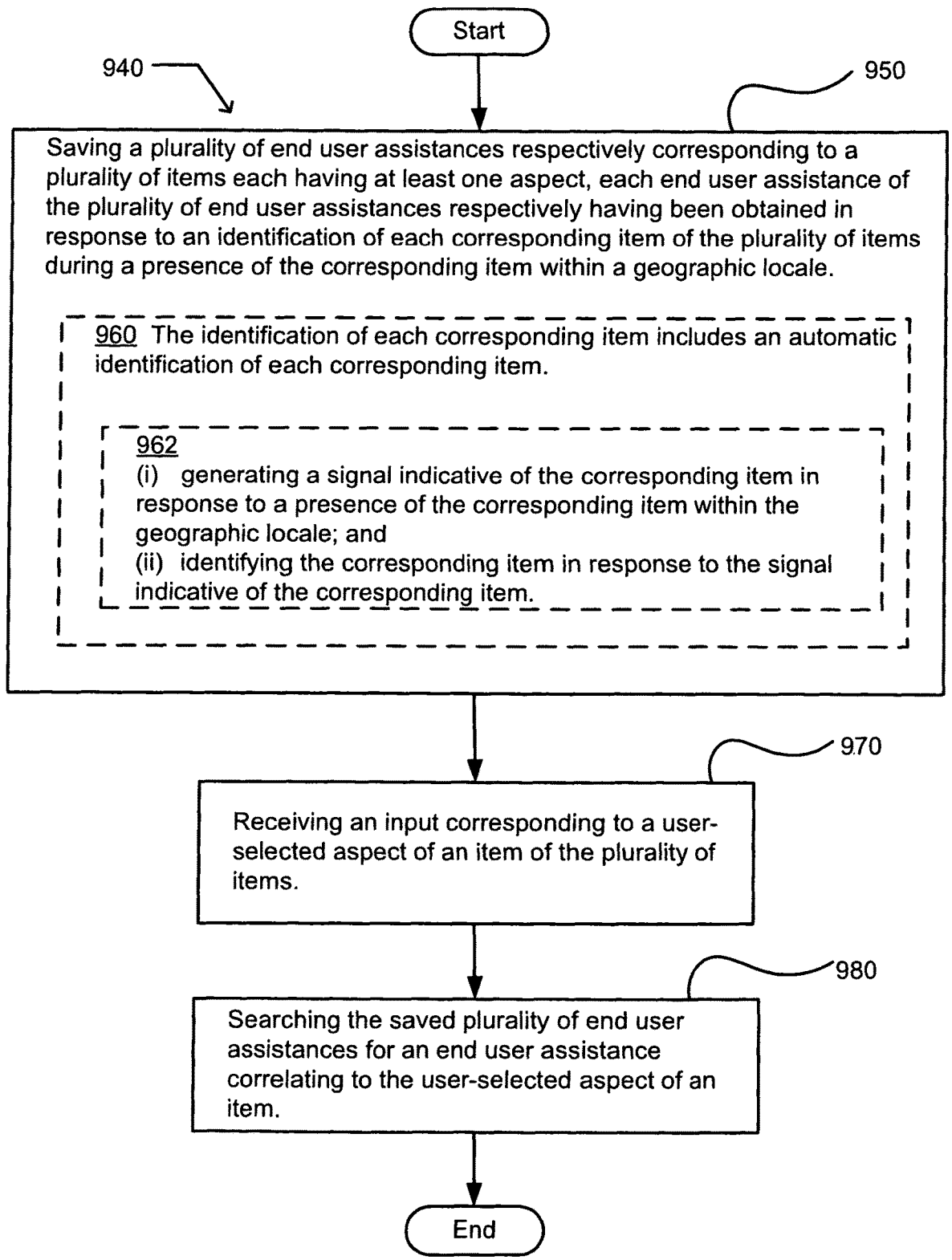
FIG. 30 illustrates another alternative embodiment of the exemplary operational flow of FIG. 28.

FIG. 30 illustrates a further alternative embodiment of the exemplary operational flow 940 of FIG. 28. FIG. 30 illustrates an embodiment where the storage operation 950 may include at least one additional operation. An additional operation may include an operation 960, wherein the identification of each corresponding item includes an automatic identification of each corresponding item. The operation 960 may included least one additional operation, such as an additional operation 962. At the operation 962, the operation 960 further includes generating a signal indicative of the corresponding item in response to a presence of the corresponding item within the geographic locale, and identifying the corresponding item in response to the signal indicative of the corresponding item.

Figure 31:
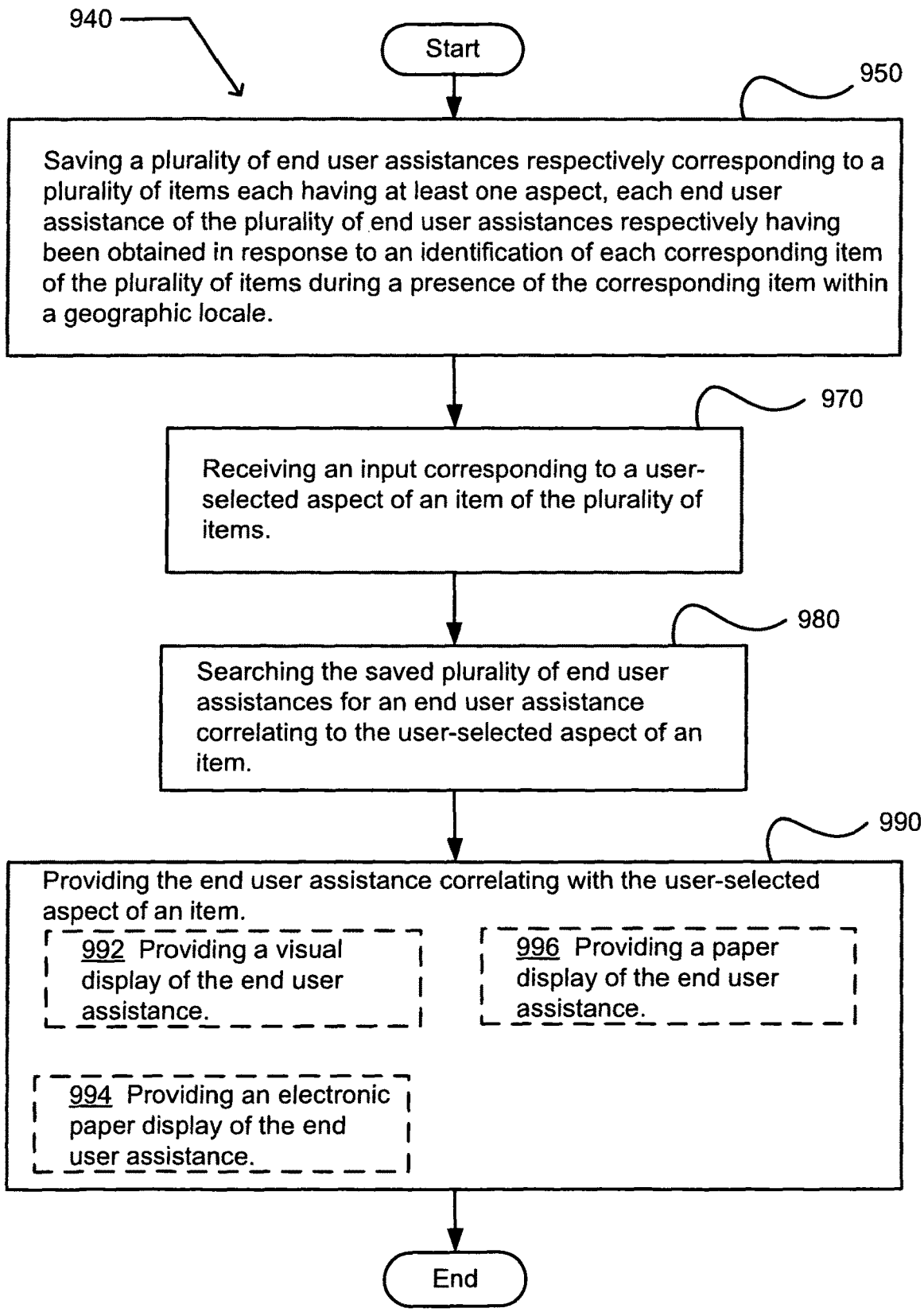
FIG. 31 illustrates a further alternative embodiment of the exemplary operational flow of FIG. 28.

FIG. 31 illustrates a further alternative embodiment of the exemplary operational flow 940 of FIG. 28. FIG. 31 illustrates an embodiment where the operational flow 940 may include at least one additional operation, such as an operation 990. At the operation 990, the end user assistance correlating with the user-selected aspect of an item is provided. The operation 990 may include at least one additional operation. An additional operation may include an operation 992, an operation 994, and an operation 996. At the operation 992, a visual display of the end user assistance is provided. At the operation 994, an electronic paper display of the end user assistance is provided. At the operation 996, a paper display of the end user assistance is provided.

FIG. 32 illustrates a partial view of an exemplary computer program product 1000 that includes a computer program 1004 for executing a computer process on a computing device. An embodiment of the exemplary computer program product 1000 may be provided using the computer-readable medium 1002, and includes computer executable instructions. The computer executable instructions encode the computer program 1004 for executing on a computer system a process that includes saving a plurality of end user assistances respectively corresponding to a plurality of items each having at least one aspect. Each end user assistance of the plurality of end user assistances respectively having been obtained in response to an automatic identification of each corresponding item of the plurality of items during a presence of the corresponding item within a geographic locale. The process further includes receiving an input corresponding to a user-selected aspect of an item of the plurality of items, and searching the saved plurality of end user assistances for an end end user assistance correlating to the user-selected aspect of an item. In an alternative embodiment, the process may include at least one additional instruction. Additional instructions may include an instruction 1006, providing the end user assistance correlating to the user-selected aspect of the item. The computer-readable medium 1002 may include a computer storage medium, which may be carried by a computer-readable carrier (not shown). The computer-readable medium 1002 may include a communications medium (not shown).

FIG. 33 illustrates an exemplary system 1050 in which embodiments may be implemented. The system 1050 includes a computing system environment, illustrated as the computing system environment 100 and the computing device 110 of FIG. 2. A plurality of items, illustrated as an item 902 and an item 904, are located within a geographic locale, such as the geographic locale 410 of FIGS. 12 and 13. The system 1050 further includes the storage medium 612, and computer program product 1060. The computer program product 1060 encodes a computer program for executing on the computing device 110 a computer process for searching for an end user assistance correlating with the user-selected aspect of an item. The computer process includes instructions that when executed on the computing device cause the computing device to save a plurality of end user assistances respectively corresponding to a plurality of items each having at least one aspect. Each end user assistance of the plurality of end user assistances respectively having been obtained in response to an automatic identification of each corresponding item of the plurality of items during a presence within a geographic locale of the corresponding item. The instructions further cause the computing device to receive an input corresponding to a user-selected aspect of an item of the plurality of items, and search the saved plurality of end user assistances for an end user assistance correlating to the user-selected aspect of an item. In an alternative embodiment, the computer program product 1060 may include additional instructions, such as the instruction 1062 that causes the computing device to provide the end user assistance correlating with the user-selected item.

Figure 34:
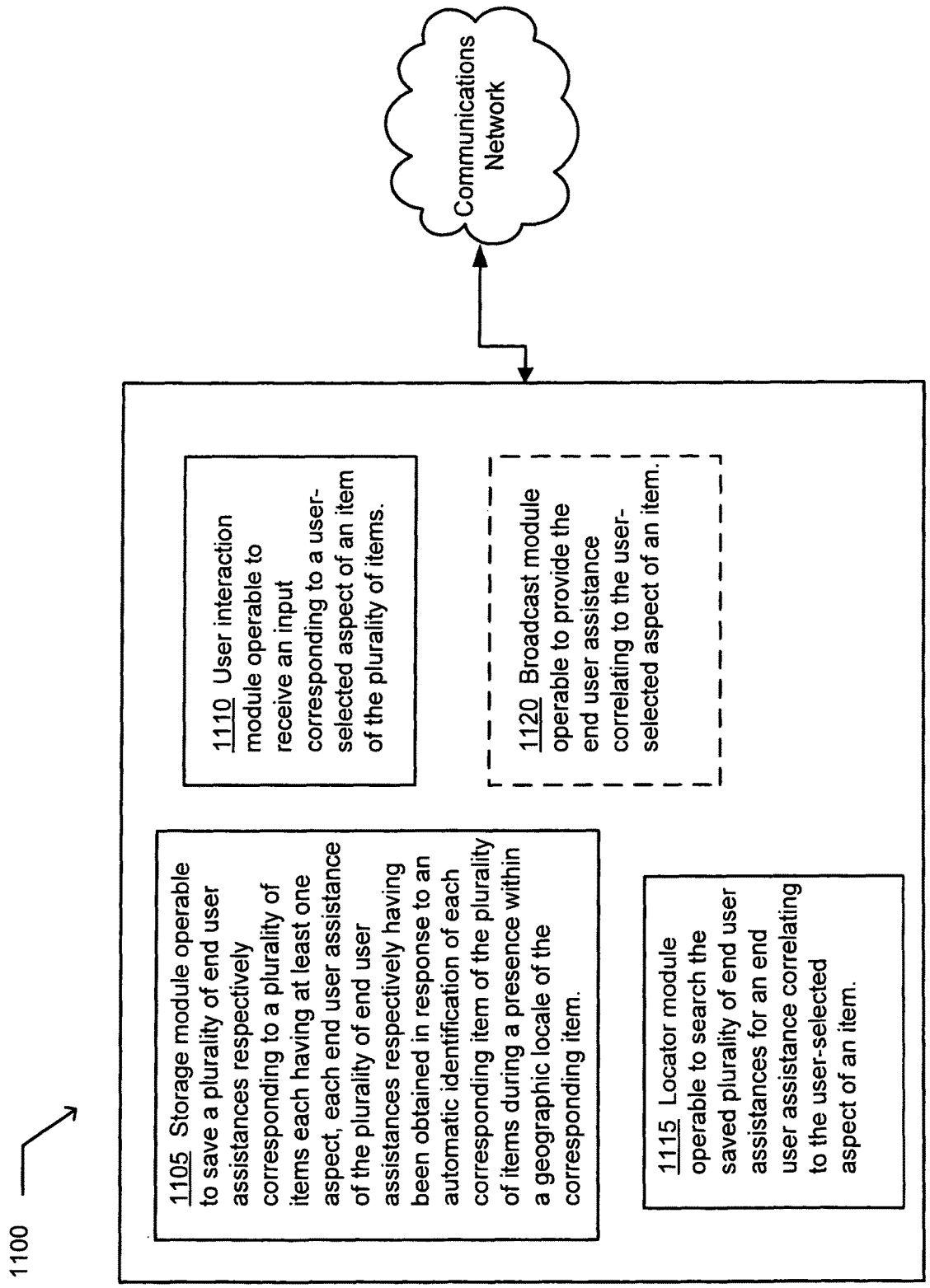
FIG. 34 includes an exemplary system in which embodiments may be implemented.

FIG. 34 includes an exemplary system 1100 in which embodiments may be implemented. The system 1100 includes a storage module 1105, a user interaction module 1110, and a locator module 1115. The storage module 1105 includes an operability to save a plurality of end user assistances respectively corresponding to a plurality of items each having at least one aspect. Each end user assistance of the plurality of end user assistances respectively having been obtained in response to an automatic identification of each corresponding item of the plurality of items during a presence within a geographic locale of the corresponding item. The user interaction module 1110 includes an operability to receive an input corresponding to a user-selected aspect of an item of the plurality of items. The locator module 1115 includes an operability to search the saved plurality of end user assistances for an end user assistance correlating to the user-selected aspect of an item. In an alternative embodiment, the system 1100 may include at least one additional module. An additional module may include a broadcast module 1120 operable to provide the end user assistance correlating to the user-selected aspect of an item.

Figure 35:
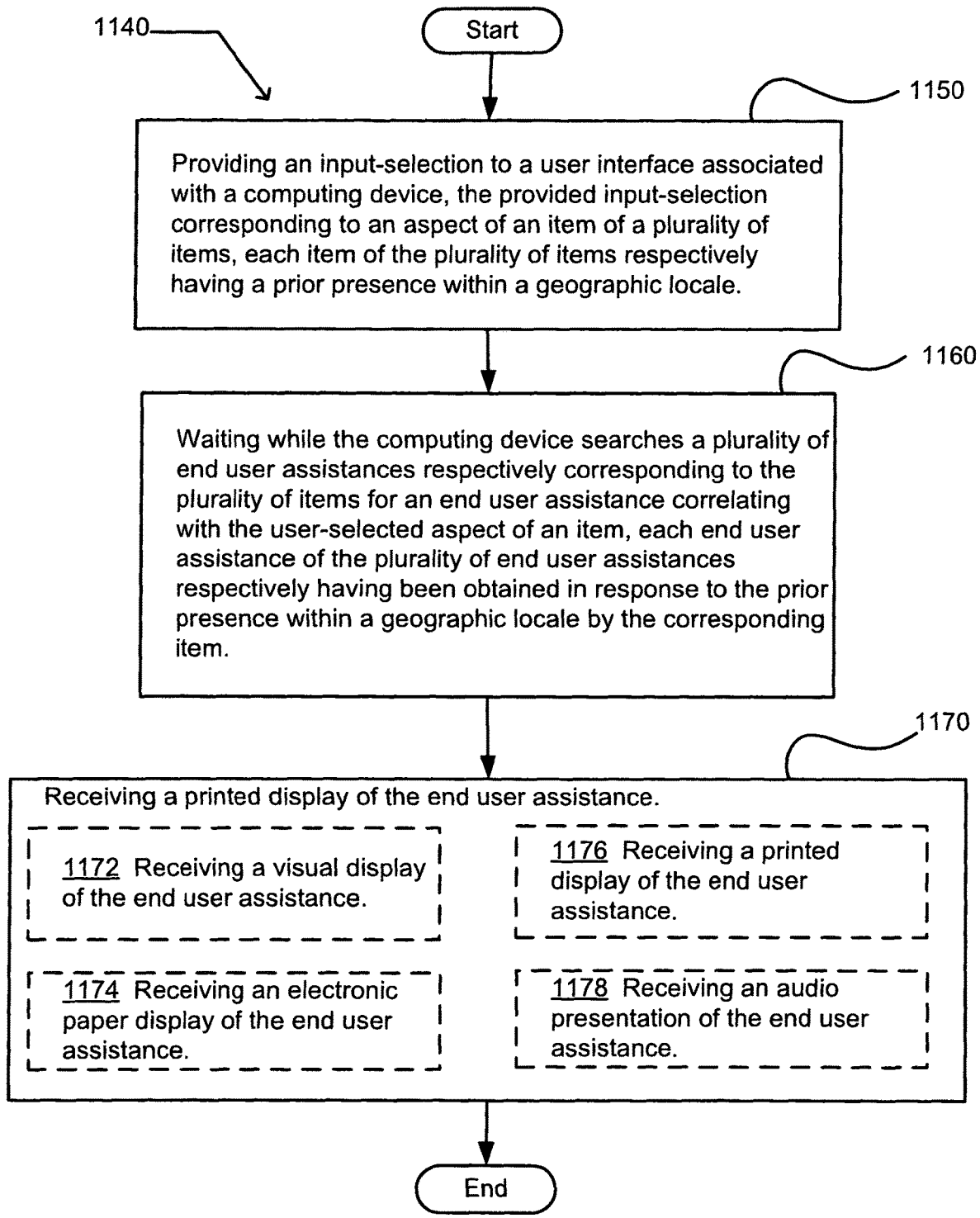
FIG. 35 illustrates an operational flow representing exemplary operations that receive an end user assistance.

FIG. 35 illustrates an operational flow 1140 representing exemplary operations that receive an end user assistance. After a start operation, the operation flow 1140 moves to an input-selection operation 1150. At the input-selection operation 1150, an input-selection is provided to a user interface associated with a computing device. The provided input-selection corresponds to an aspect of an item of a plurality of items. Each item of the plurality of items respectively having a prior presence within a geographic locale. At a waiting operation 1160, the computing device searches a plurality of end user assistances respectively corresponding to the plurality of items for an end user assistance correlating with the user-selected aspect of an item. Each end user assistance of the plurality of end user assistances respectively having been obtained in response to the prior presence within a geographic locale of the corresponding item. At a reception operation 1170, an end user assistance is received correlating to the input-selection. In an alternative embodiment, the reception operation 1170 may include at least one additional operation. Additional operations may include an operation 1172, an operation 1174, an operation 1176, and an operation 1178. At the operation 1172, a visual display of the end user assistance is received. At the operation 1174, an electronic paper display of the end user assistance is received. The operation 1176, a printed display of the end user assistance is received. At operation 1178, an audio presentation of the end user assistance is received.

Figure 36:
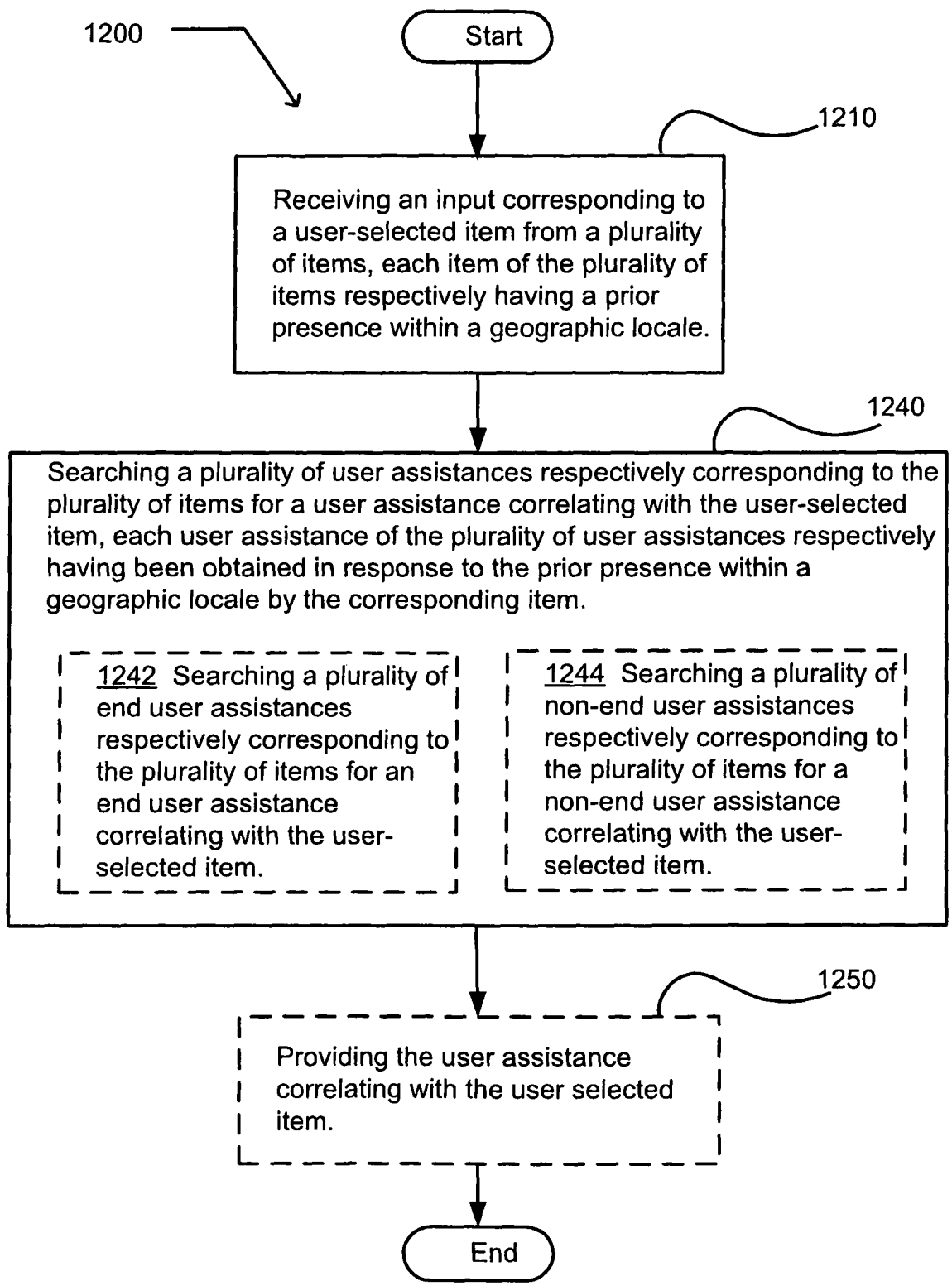
FIG. 36 illustrates an operational flow representing exemplary operations implemented in a computing device that searches a plurality of user assistances for a user assistance.

FIG. 36 illustrates an operational flow 1200 representing exemplary operations implemented in a computing device that searches a plurality of user assistances for a user assistance. After a start operation, the operational flow moves to a user interaction operation 1210. At the operation 1210, an input is received corresponding to a user-selected item from a plurality of items, each item of the plurality of items respectively having a prior presence within a geographic locale. At a seeking operation 1240, a plurality of user assistances respectively corresponding to the plurality of items are searched for a user assistance correlating with the user-selected item. Each user assistance of the plurality of user assistances respectively having been obtained in response to the prior presence within a geographic locale of the corresponding item. In an alternative embodiment, the process 1200 may include additional operations, such as a broadcast operation 850. At the operation 850, the user assistance correlating with the user-selected item is provided. The operational flow 1200 then moves to an end operation. In another alternative embodiment, the seeking operation 1240 may include at least one additional operation. Additional operations may include an operation 1242 and an operation 1244. At the operation 1242, a plurality of end user assistances respectively corresponding to the plurality of items are searched for an end user assistance correlating with the user-selected item. At the operation 1244, a plurality of non-end user assistances respectively corresponding to the plurality of items are searched for a non-end user assistance correlating with the user-selected item.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/ or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

What is claimed is:

1. A system comprising:
    at least one processor; and
    at least one memory operatively coupled to the at least one processor, the at least one memory bearing one or more instructions that, when executed by the at least one processor perform operations including at least:
        automatically identifying a plurality of items having a presence within a geographic locale, including at least: i) receiving, from a plurality of sensors comprising at least two sensors having different sensing parameters respectively operable to provide a different signal, a plurality of signals associated with each item of the plurality of items comprising an embedded device, wherein the receiving the plurality of signals indicates that the each item is within the geographic locale; and (ii) identifying the each item of the plurality of items in response to the plurality of signals;
        automatically obtaining a plurality of end-user assistances associated with the plurality of items in response to the automatically identifying of the plurality of items, wherein (i) an end-user assistance of the plurality of end-user assistances includes at least one manual corresponding to the plurality of items, the at least one manual including at least one of assistance information, one or more assistance instructions, or one or more item specifications;
        automatically saving the plurality of end-user assistances associated with the plurality of items;
        receiving a user input requesting at least one end-user assistance in operating at least one user-selected item from among the plurality of items;
        searching for at least one saved end user assistance that correlates with the user input requesting at least one end-user assistance in operating the at least one user-selected item;
        obtaining at least one saved end user assistance that correlates with the user input requesting at least one end-user assistance in operating the at least one user-selected item; and
        presenting the obtained at least one end user assistance that correlates with the user input requesting at least one end-user assistance in operating the at least one user-selected item.

2. The system of claim 1, wherein the different sensing parameters comprises an identification signal sensor parameter operable to receive an electronically transmitted designator associated with an item and provide a signal indicative that the item is within the geographic locale.

3. A method comprising:
    automatically identifying a plurality of items having a presence within a geographic locale, including at least:
        i) receiving, from a plurality of sensors comprising at least two sensors having different sensing parameters respectively operable to provide a different signal, a plurality of signals associated with each item of the plurality of items comprising an embedded device, wherein the receiving the plurality of signals indicates that the each item is within the geographic locale; and (ii) identifying the each item of the plurality of items in response to the plurality of signals;
    automatically obtaining a plurality of end-user assistances associated with the plurality of items in response to the automatically identifying of the plurality of items, wherein (i) an end-user assistance of the plurality of end-user assistances includes at least one manual corresponding to the plurality of items, the at least one manual including at least one of assistance information, one or more assistance instructions, or one or more item specifications;
    automatically saving the plurality of end-user assistances associated with the plurality of items;
    receiving a user input requesting at least one end-user assistance in operating at least one user-selected item from among the plurality of items;

searching for at least one saved end user that correlates with the user input requesting at least one end-user assistance in operating the at least one user-selected item;

obtaining at least one saved end user assistance that correlates with the user input requesting at least one end-user assistance in operating the at least one user-selected item; and presenting the obtained at least one end user assistance that correlates with the user input requesting at least one end-user assistance in operating the at least one user-selected item.

4. A system comprising:

at least one electronic device including at least:

circuitry configured for automatically identifying a plurality of items having a presence within a geographic locale, including at least: i) receiving, from a plurality of sensors comprising at least two sensors having different sensing parameters respectively operable to provide a different signal, a plurality of signals associated with each item of the plurality of items comprising an embedded device, wherein the receiving the signal indicates that the item is within the geographic locale; and (ii) identifying the each item of the plurality of items in response to the plurality of signals;

circuitry configured for automatically obtaining a plurality of end-user assistances associated with the plurality of items in response to the automatically identifying of the plurality of items, wherein (i) an end-user assistance of the plurality of end-user assistances includes at least one manual corresponding to the plurality of items, the at least one manual including at least one of assistance information, one or more assistance instructions, or one or more item specifications;

circuitry configured for automatically saving the plurality of end-user assistances associated with the plurality of items;

circuitry configured for receiving a user input requesting at least one end-user assistance in operating at least one user-selected item from among the plurality of items;

circuitry configured for searching for at least one saved end user assistance that correlates with the user input requesting at least one end-user assistance in operating the at least one user-selected item;

circuitry configured for obtaining at least one saved end user assistance that correlates with the user input requesting at least one end-user assistance in operating the at least one user-selected item; and circuitry configured for presenting the obtained at least one end user assistance that correlates with the user input requesting at least one end-user assistance in operating the at least one user-selected item.

5. The system of claim 4, wherein the circuitry configured for searching for at least one saved end user assistance including at least one manual that correlates with the user input requesting at least one end-user assistance in operating the at least one user-selected item includes:

circuitry configured for searching for user assistance information for operation of the at least one user-selected item.

6. The system of claim 4, wherein the circuitry configured for searching for at least one saved end user assistance including at least one manual that correlates with the user input requesting at least one end-user assistance in operating the at least one user-selected item includes:

circuitry configured for searching for user assistance instructions for operation of the at least one user-selected item.

7. The system of claim 4, wherein the circuitry configured for searching for at least one saved end user assistance including at least one manual that correlates with the user input requesting at least one end-user assistance in operating the at least one user-selected item includes:

circuitry configured for searching a plurality of saved end user assistances for an end user assistance for operation of the at least one user-selected item.

8. The system of claim 4, wherein the circuitry configured for searching for at least one saved end user assistance including at least one manual that correlates with the user input requesting at least one end-user assistance in operating the at least one user-selected item includes:

circuitry configured for searching for at least one of: an end user information corresponding to a user-selected item, an end user instruction corresponding to a user-selected item, an end user education corresponding to a user-selected item, and/or an end user operation information corresponding to a user-selected item.

9. The system of claim 4, wherein the circuitry configured for presenting the obtained at least one end user assistance including at least one manual that correlates with the user input requesting at least one end-user assistance in operating the at least one user-selected item:

presenting the obtained at least one end user assistance including at least one manual including at least one of assistance information, assistance instructions, or item specifications that correlates with operation of the at least one user-selected item.

10. The system of claim 4, wherein the circuitry configured for presenting the obtained at least one end user assistance including at least one manual that correlates with the user input requesting at least one end-user assistance in operating the at least one user-selected item:

circuitry configured for presenting the obtained at least one end user assistance associated with at least one of firmware associated with the at least one user-selected item, one or more programs associated with the at least one user-selected item, or one or more data files associated with the at least one user-selected item.

11. The system of claim 4, wherein the at least one user-selected item includes:

at least one appliance connected to a network.

12. The system of claim 4, wherein the at least one user-selected item includes:

at least one home entertainment device connected to a network.

13. The system of claim 4, wherein the at least one user-selected item includes:

at least one vehicle connected to a network.

14. The system of claim 4, wherein the circuitry configured for receiving a user input requesting at least one end-user assistance in operating at least one user-selected item from among the plurality of items includes:

circuitry configured for receiving an identifier of at least one item.

15. The system of claim 4, wherein the circuitry configured for obtaining at least one saved end user assistance that correlates with the user input requesting at least one end-user assistance in operating the at least one user-selected item includes:

circuitry configured for obtaining at least one saved end user assistance that correlates with the user input requesting at least one end-user assistance in operating the at least one user-selected item over a network.

16. The system of claim 4, wherein the circuitry configured for obtaining at least one saved end user assistance that correlates with the user input requesting at least one end-user assistance in operating the at least one user-selected item include:

circuitry configured for obtaining at least one saved end user assistance that correlates with the user input requesting at least one end-user assistance in operating the at least one user-selected item from one or more server devices.

17. The system of claim 4, wherein the different sensing parameters comprises an identification signal sensor parameter operable to receive an electronically transmitted designator associated with an item and provide a signal indicative that the item is within the geographic locale.

18. The system of claim 4, wherein the at least one user-selected item includes: at least one camera connected to a network.

* * * * *